United States Patent
Itabashi et al.

(10) Patent No.: US 10,991,983 B2
(45) Date of Patent: Apr. 27, 2021

(54) NONAQUEOUS ELECTROLYTIC SOLUTION AND NONAQUEOUS ELECTROLYTIC SOLUTION SECONDARY BATTERY

(71) Applicant: Central Glass Company Limited, Ube (JP)

(72) Inventors: Saori Itabashi, Saitama (JP); Katsutoshi Suzuki, Saitama (JP); Mikihiro Takahashi, Yamaguchi (JP); Kazunari Takeda, Tokyo (JP)

(73) Assignee: Central Glass Company Limited, Ube (JP)

( * ) Notice: Subject to any disclaimer, the term of this patent is extended or adjusted under 35 U.S.C. 154(b) by 355 days.

(21) Appl. No.: 16/305,808

(22) PCT Filed: May 24, 2017

(86) PCT No.: PCT/JP2017/019434
§ 371 (c)(1),
(2) Date: Nov. 29, 2018

(87) PCT Pub. No.: WO2017/208944
PCT Pub. Date: Dec. 7, 2017

(65) Prior Publication Data
US 2020/0328474 A1    Oct. 15, 2020

(30) Foreign Application Priority Data
May 30, 2016 (JP) .............................. JP2016-106911

(51) Int. Cl.
*H01M 10/0568* (2010.01)
*H01M 10/0525* (2010.01)

(52) U.S. Cl.
CPC ... *H01M 10/0568* (2013.01); *H01M 10/0525* (2013.01); *H01M 2300/0025* (2013.01)

(58) Field of Classification Search
CPC ........... H01M 10/0567; H01M 10/052; H01M 10/0525; H01M 10/0568; H01M 10/0569;
(Continued)

(56) References Cited

U.S. PATENT DOCUMENTS

| 5,626,981 A | 5/1997 | Simon et al. |
| 6,693,212 B1 | 2/2004 | Wietelmann et al. |

(Continued)

FOREIGN PATENT DOCUMENTS

| EP | 2 523 237 A1 | 11/2012 |
| EP | 3 166 170 A1 | 5/2017 |

(Continued)

OTHER PUBLICATIONS

Partial Supplementary European Search Report issued in counterpart European Application No. 17806501.7 dated May 23, 2019 (15 pages).
(Continued)

*Primary Examiner* — Osei K Amponsah
(74) *Attorney, Agent, or Firm* — Crowell & Moring LLP

(57) ABSTRACT

An object of the present invention is to provide a nonaqueous electrolytic solution and a nonaqueous electrolytic solution secondary battery capable of showing high output characteristics at a low temperature even after the battery is used to some extent, and capable of showing good high-rate properties, and further capable of showing sufficient performance again at low temperature even after stored at a high temperature. The nonaqueous electrolytic solution includes a nonaqueous solvent, an electrolyte dissolved in the nonaqueous solvent, (I) a difluoro ionic complex (1) represented by the general formula (1), and (II) at least one compound selected from the group consisting of a difluorophosphate salt, a monofluorophosphate salt, a specific salt having an
(Continued)

imide anion, and a specific silane compound, and 95 mol % or more of the difluoro ionic complex (1) is a difluoro ionic complex (1-Cis) in a cis configuration represented by the general formula (1-Cis).

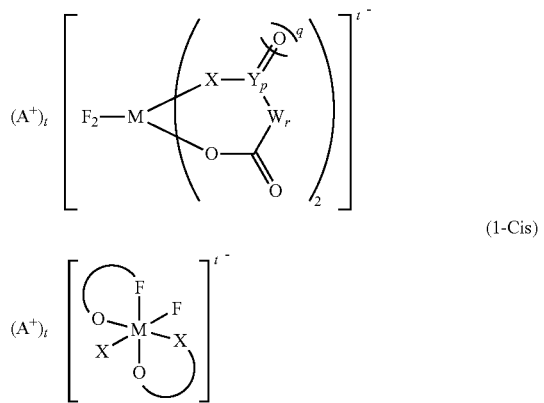

20 Claims, 1 Drawing Sheet

(58) Field of Classification Search
CPC .......... H01M 4/48; H01M 4/587; H01M 2/16; H01M 2300/0028; H01M 2300/0037; Y02E 60/122; Y02T 10/7011
See application file for complete search history.

(56) References Cited

U.S. PATENT DOCUMENTS

| | | |
|---|---|---|
| 6,919,145 B1 | 7/2005 | Kotato et al. |
| 2002/0081496 A1 | 6/2002 | Tsujioka et al. |
| 2003/0100761 A1 | 5/2003 | Tsujioka et al. |
| 2012/0288751 A1* | 11/2012 | Kako .................... H01M 4/366 429/188 |
| 2013/0022880 A1* | 1/2013 | Tsujioka ........... H01M 10/0567 429/345 |
| 2014/0193706 A1* | 7/2014 | Morinaka ......... H01M 10/0567 429/200 |
| 2014/0342243 A1 | 11/2014 | Park et al. |
| 2015/0147643 A1* | 5/2015 | Morinaka .............. H01G 11/54 429/199 |
| 2018/0062204 A1 | 3/2018 | Takahashi et al. |
| 2018/0241082 A1 | 8/2018 | Suzuki et al. |

FOREIGN PATENT DOCUMENTS

| | | | |
|---|---|---|---|
| EP | | 3 333 962 A1 | 6/2018 |
| JP | | 8-45545 A | 2/1996 |
| JP | | 2001-6729 A | 1/2001 |
| JP | | 2002-110235 A | 4/2002 |
| JP | | 2003-137890 A | 5/2003 |
| JP | | 2007-165125 A | 6/2007 |
| JP | | 4695802 B2 | 6/2011 |
| JP | | 2011-222193 A | 11/2011 |
| JP | | 2013-30465 A | 2/2013 |
| JP | | 2013-51122 A | 3/2013 |
| JP | | 2016-35820 A | 3/2016 |
| WO | WO 2016/056181 A1 | | 4/2016 |
| WO | WO 2016/117279 A1 | | 7/2016 |
| WO | WO 2016/117280 A1 | | 7/2016 |
| WO | WO 2017/026181 A1 | | 2/2017 |

OTHER PUBLICATIONS

Dean P. et al., "Spectroscopic Studies of Inorganic Fluoro-complexes, Part III. Fluorine-19 Nuclear Magnetic Resonance Studies of Silicon (iv) Germanium (iv), and Titanium (iv) Fluoro-complexes", Journal of American Chem. Society, Apr. 1, 1970, pp. 2569-2574, vol. 15, (six (6) pages).
International Search Report (PCT/ISA/210) issued in PCT Application No. PCT/JP2017/019434 dated Jul. 25, 2017 with English translation (seven (7) pages).
Japanese-language Written Opinion (PCT/ISA/237) issued in PCT Application No. PCT/JP2017/019434 dated Jul. 25, 2017 (five (5) pages).

* cited by examiner

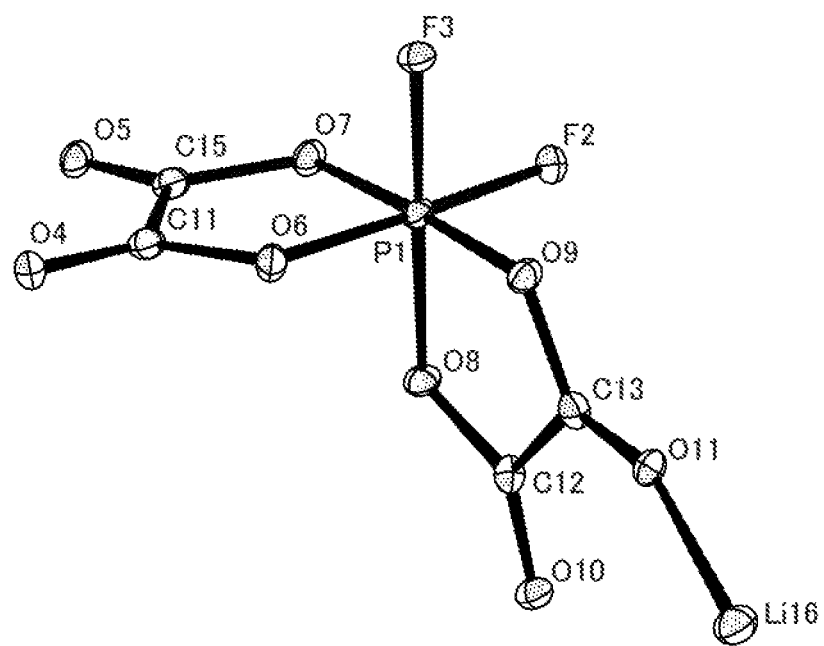

NONAQUEOUS ELECTROLYTIC SOLUTION AND NONAQUEOUS ELECTROLYTIC SOLUTION SECONDARY BATTERY

TECHNICAL FIELD

The present invention relates to a nonaqueous electrolytic solution having excellent output characteristics at low temperature, and a battery such as a lithium secondary battery using the nonaqueous electrolytic solution. Further, the present invention relates to an additive useful for the nonaqueous electrolytic solution.

BACKGROUND ART

In recent years, there have been rapidly increasing demands for not only electricity storage systems for small-sized and high energy density applications, for example, information-related apparatus, communication apparatus, i.e., personal computers, video cameras, digital cameras, portable telephones, and smartphones; but also batteries with large capacity, high output and high energy density which can be used for electric vehicles, hybrid vehicles, and auxiliary power systems of fuel-cell vehicles. Moreover, there have been increasing demands for batteries which can be used for a long time even in electricity storage systems for large-sized and high power applications, for example, electric power storages. As one of the candidates for such electricity storage systems, nonaqueous electrolytic solution batteries have been under active development, such as lithium ion batteries, lithium batteries, and lithium ion capacitors.

Lithium secondary batteries mainly include a positive electrode, a nonaqueous electrolytic solution, and a negative electrode. As negative electrodes for lithium secondary batteries, known are, for example, metal lithium, metal compounds (for example, elemental metals, oxides, alloys with lithium, and the like) capable of occluding and releasing lithium, carbon materials, and the like. In particular, lithium secondary batteries where carbon materials capable of occluding and releasing lithium such as corks, artificial graphite, natural graphite, and the like are used have been put into wide practical use. For example, it is reported that in a lithium secondary battery where a highly crystallized carbon material such as natural graphite and artificial graphite is used as a negative electrode material, a nonaqueous solvent in a nonaqueous electrolytic solution may be reductively decomposed on the surface of a negative electrode upon charging, resulting in generation of decomposition products or gases. This may interfere with the desired electrochemical reactions of the battery, which in turn, may decrease cycle characteristics.

Further, in a lithium secondary battery where metal lithium or an alloy thereof, an elemental metal such as silicon and tin, or an oxide is used as a negative electrode material, pulverization of the negative electrode material is promoted during cycles although it has a high initial capacity. Therefore, a nonaqueous solvent is more susceptible to reductive decomposition as compared with a negative electrode made of a carbon material. As a result, the charge/discharge efficiency at the first cycle is known to be decreased due to an increased initial irreversible capacity of the battery. It is also known that this may significantly decrease battery performances such as battery capacity and cycle characteristics. A negative electrode may react with lithium cations or a solvent of an electrolytic solution when lithium cations are intercalated into the negative electrode upon charging at the first cycle. This may form a film containing lithium oxide, lithium carbonate, and lithium alkylcarbonate as the main components on the surface of the negative electrode. This film on the surface of the electrode which is called a Solid Electrolyte Interface (SEI) may, in nature, have significant impacts on battery performance. For example, it may reduce reductive decomposition of a solvent to prevent deterioration of battery performance. As described above, one of the disadvantages is that lithium may not be smoothly occluded into and released from a negative electrode due to adverse effects such as accumulation of decomposition products and generation of gases from a nonaqueous solvent, and pulverization of a negative electrode material, resulting in significant deterioration of battery characteristics such as cycle characteristics.

Meanwhile, as a positive electrode, known are, for example, $LiCoO_2$, $LiMn_2O_4$, $LiNiO_2$, $LiFePO_4$, and the like. It is reported that in lithium secondary batteries where these materials are used, a nonaqueous solvent in a nonaqueous electrolytic solution may partly undergo local oxidative decomposition at the interface between a positive electrode material and the nonaqueous electrolytic solution when the temperature is increased during charging. This results in generation of decomposition products and gases. As a result, the desired electrochemical reaction of the battery may be interfered with, which in turn, may decrease battery performances such as cycle characteristics. As in the negative electrode, a film may also be formed on the surface of the positive electrode due to oxidatively decomposed products. This film is also known to play an important role. For example, oxidative decomposition of a solvent may be prevented, and the battery gas yield may be reduced.

As described above, conventional lithium secondary batteries have a problem in that decomposition products and gases generated when a nonaqueous electrolytic solution decomposes on a positive electrode and a negative electrode may interfere with the movement of lithium ions, and may cause the expansion of a battery. These may be responsible for decreased battery performance.

In order to overcome the above problems and further improve battery performance such as long term durability and output characteristics, it is important to form an SEI having a high ion conductivity, a low electron conductivity, and a long-term stability. To this end, attempts have been widely made for intentionally forming a good SEI by adding a small amount (usually 0.01 mass % or more and 10 mass % or less) of a compound called an additive to an electrolytic solution.

For example, in a secondary battery where a graphite-based negative electrode with a high degree of crystallinity is used, a nonaqueous electrolytic solution containing, for example, vinylene carbonate, vinylethylene carbonate, and/or the like has been used to minimize decomposition of the nonaqueous electrolytic solution to obtain a high capacity. Further, attempts have been made for improving storage properties and cycle characteristics at high temperature (Patent Documents 1 and 2). However, these are still less than satisfactory. For example, use of a nonaqueous electrolytic solution including ethylene carbonate as the main solvent and containing 0.01 to 10.0 mass % of vinylene carbonate relative to ethylene carbonate can not sufficiently prevent an increased internal resistance of a battery when stored at high temperature.

A nonaqueous electrolytic solution is disclosed containing a phosphorus-boron complex and the like as an additive for forming an effective SEI, such as a lithium difluoro(oxalato)borate (Patent Document 3). Further, adding to an electrolytic solution a salt having a phosphoryl group or sulfonyl group is considered. Proposed are, for example, a method for improving high-temperature cycle characteristics and high-temperature storage properties by combining a specific sulfonimide salt or phosphoryl imide salt and an oxalato complex (Patent Document 4), and a method for improving cycle characteristics and output characteristics by combining a specific fluorophosphate and sulfonimide salt (Patent Document 5).

Patent Document 6 discloses an electrolytic solution which can improve a low-temperature property (the ratio of discharge capacities of −20° C./25° C.) at 0° C. or below as well as cycle characteristics and high-temperature storage properties, the electrolytic solution including both a difluoro(bisoxalato)phosphate salt and a tetrafluoro(oxalato)phosphate salt.

Further, Patent Document 7 discloses a method of manufacturing lithium tris(oxalato)phosphate.

It is noted that Patent Document 8 discloses a method of manufacturing a phosphorus-boron complex such as lithium difluorooxalatoborate used as an electrolyte for electrochemical devices.

Nonpatent Document 1 discloses a method of manufacturing a fluoro complex having silicon or the like in the complex center.

Patent Document 1: Japanese Unexamined Patent Application, Publication No. H08-045545
Patent Document 2: Japanese Unexamined Patent Application, Publication No. 2001-006729
Patent Document 3: Japanese Unexamined Patent Application, Publication No. 2002-110235
Patent Document 4: Japanese Unexamined Patent Application, Publication No. 2013-051122
Patent Document 5: Japanese Unexamined Patent Application, Publication No. 2013-030465
Patent Document 6: Japanese Unexamined Patent Application, Publication No. 2011-22193
Patent Document 7: Japanese Unexamined Patent Application (Translation of PCT Application), Publication No. 2003-505464 (Japanese Patent No. 4695802)
Patent Document 8: Japanese Unexamined Patent Application, Publication No. 2003-137890
Non-Patent Document 1: J. Chem. Soc. (A), 1970, 15, 2569-2574

Disclosure of the Invention

Problems to be Solved by the Invention

Nonetheless, further improvements have been desired because the aforementioned nonaqueous electrolytic solutions cannot be said to have sufficient high-temperature storage properties or do not satisfy recent demands for high-performance batteries. That is, although not a small number of practical nonaqueous electrolytic solution batteries, which are typically lithium ion batteries, are already available, an electrolytic solution having sufficient properties has not yet been obtained for applications where batteries may potentially be used under more harsh environments, including in-vehicle ones.

Specifically, high output characteristics at a low temperature are strongly desired to allow a nonaqueous electrolytic solution battery to operate at a high output without aid of thermal insulation and heating even in cold climate areas. In order to achieve this, various electrolytic solutions have been proposed to date. However, the majority of them remain unsatisfactory in that the output characteristics are significantly decreased after batteries are used to some extent (charge-discharge cycles have been performed for certain times; or storage history at a high temperature is long) although the initial output characteristics are improved. Therefore, an electrolytic solution is strongly desired which shows high output characteristics at low temperature even after a certain number of charge-discharge cycles or after stored at high temperature. Moreover, good high-rate properties are required even after a certain number of charge-discharge cycles have been performed in order to enable high-speed charging and high-power discharging. That is, an object of the present invention is to provide a nonaqueous electrolytic solution and a nonaqueous electrolytic solution battery capable of showing high output characteristics at a low temperature even after the battery is used to some extent, and capable of showing good high-rate properties, and further capable of showing sufficient performance again at low temperature even after stored at a high temperature.

Means for Solving the Problems

The present inventors conducted extensive studies in order to solve the above problem. Consequently, after comparing effects of separate addition of the cis- and trans-isomer difluoro ionic complexes, the present inventors found that a cis isomer shows a higher effect for improving output characteristics at low temperature after cycle durability tests. Further, an object of the present invention is to provide a nonaqueous electrolytic solution and a nonaqueous electrolytic solution battery capable of showing high output characteristics at a low temperature of 0° C. or less even after the battery is used to some extent, and capable of showing large charge and discharge capacities at a high rate under ordinary temperature, and further capable of showing sufficient performance again at low temperature even after stored at a high temperature of 60° C. or more, by producing an electrolytic solution for nonaqueous electrolytic solution batteries including both the aforementioned six-coordinate ionic complex in the cis configuration and a specific compound shown in group II.

That is, the present invention provides a nonaqueous electrolytic solution for nonaqueous electrolytic solution batteries, the nonaqueous electrolytic solution including a nonaqueous solvent, an electrolyte dissolved in the nonaqueous solvent, (I) a difluoro ionic complex (1) represented by the general formula (1), and (II) at least one compound selected from the group consisting of a difluorophosphate salt, a monofluorophosphate salt, a salt having an imide anion represented by each of the general formulas (II-1) to (II-8) below, and a silane compound represented by the general formula (II-9) below, wherein 95 mol % or more of the difluoro ionic complex (1) is a difluoro ionic complex (1-Cis) in a cis configuration represented by the general formula (1-Cis).

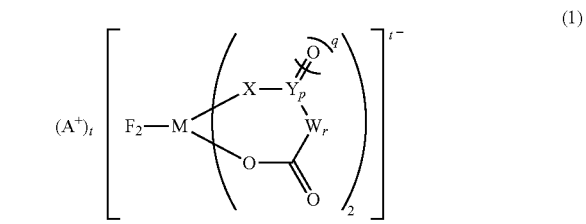

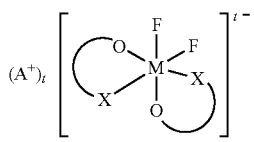 (1-Cis)

wherein in (1-Cis),

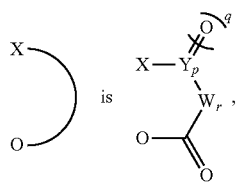

In the general formula (1) and the general formula (1-Cis), $A^+$ is any one selected from the group consisting of a metal ion, a proton, and an onium ion, and M is any one selected from the group consisting of Si, P, As, and Sb.

F is a fluorine atom, and O is an oxygen atom.

t is 2 when M is Si, and t is 1 when M is P, As, or Sb.

X is an oxygen atom or —N($R^1$)—. N is a nitrogen atom, and $R^1$ is a hydrocarbon group having 1 to 10 carbon atoms and optionally having a hetero atom and/or a halogen atom (the hydrocarbon group optionally having a branched-chain or ring structure when the number of carbon atoms is 3 or more).

When X is —N($R^1$)—, and p is 0, X and W are bonded directly and optionally form a structure as shown in at least one selected from the general formulas (1-Cis-1) to (1-Cis-3) below. In the case of the general formula (1-Cis-2) below where the direct bond is a double bond, R' is not present.

Y is a carbon atom or a sulfur atom. q is 1 when Y is a carbon atom. q is 1 or 2 when Y is a sulfur atom.

W represents a hydrocarbon group having 1 to 10 carbon atoms and optionally having a hetero atom and/or a halogen atom (the hydrocarbon group optionally having a branched-chain or ring structure when the number of carbon atoms is 3 or more), or —N($R^2$)—. Here, $R^2$ represents a hydrogen atom, an alkaline metal, or a hydrocarbon group having 1 to 10 carbon atoms and optionally having a hetero atom and/or a halogen atom. When the number of carbon atoms is 3 or more, $R^2$ may have a branched-chain or ring structure.

p is 0 or 1, and q is an integer of 0 to 2, and r is an integer of 0 to 2. Further, $p+r \geq 1$.

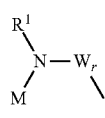 (1-Cis-1)

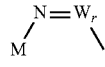 (1-Cis-2)

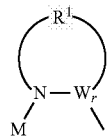 (1-Cis-3)

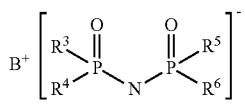 (II-1)

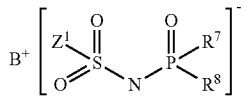 (II-2)

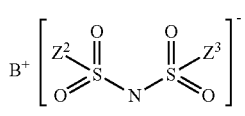 (II-3)

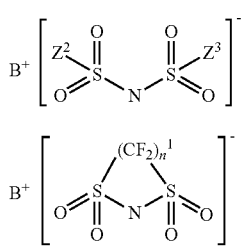 (II-4)

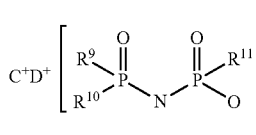 (II-5)

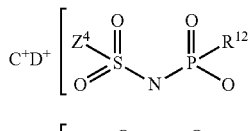 (II-6)

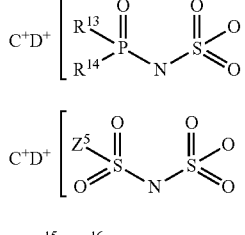 (II-7)

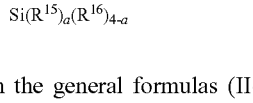 (II-8)

$Si(R^{15})_a(R^{16})_{4-a}$ (II-9)

In the general formulas (II-1) to (II-8), $R^3$ and $R^{14}$ are each independently a fluorine atom or an organic group selected from a straight chain or branched alkoxy group having 1 to 10 carbon atoms, an alkenyloxy group, an alkynyloxy group, a cycloalkoxy group having 3 to 10 carbon atoms, a cycloalkenyloxy group, and an aryloxy group having 6 to 10 carbon atoms, and at least one of a fluorine atom, an oxygen atom, and an unsaturated bond is optionally present in the organic group. $Z^1$ and $Z^5$ are each independently a fluorine atom or an organic group selected from a straight chain or branched alkyl group having 1 to 10 carbon atoms, an alkenyl group, an alkynyl group, a cycloalkyl group having 3 to 10 carbon atoms, a cycloalkenyl group, an aryl group having 6 to 10 carbon atoms, a straight chain or branched alkoxy group having 1 to 10 carbon atoms, an alkenyloxy group, an alkynyloxy group, a cycloalkoxy group having 3 to 10 carbon atoms, a cycloalkenyloxy group, and an aryloxy group having 6 to 10 carbon atoms, and at least one of a fluorine atom, an oxygen atom, and an unsaturated bond is optionally present in the organic group. $n^1$ represents an integer of 1 to 8; and $B^+$, $C^+$, and $D^+$ each independently represent any one selected from the group consisting of a metal ion, a proton, and an onium ion, and $C^+$ and $D^+$ are optionally identical.

In the general formula (II-9), $R^{15}$ each independently represent a group having a carbon-carbon unsaturated bond.

$R^{16}$ are each independently selected from a fluorine atom and a straight chain or branched alkyl group having 1 to 10 carbon atoms, and the alkyl group optionally has a fluorine atom and/or an oxygen atom. a is 2 to 4.

Further, the present invention provides a nonaqueous electrolytic solution battery including the aforementioned nonaqueous electrolytic solution, a positive electrode, a negative electrode, and a separator.

Effects of the Invention

The present invention can provide a nonaqueous electrolytic solution and a nonaqueous electrolytic solution battery capable of showing high output characteristics at a low temperature even after the battery is used to some extent, and capable of showing good high-rate properties, and further capable of showing sufficient performance again at low temperature even after stored at a high temperature.

BRIEF DESCRIPTION OF THE DRAWINGS

FIG. 1 shows an analysis result from the single crystal X-ray structural analysis of (1a-Cis) according to Synthesis Example 1.

PREFERRED MODE FOR CARRYING OUT THE INVENTION

<1. Nonaqueous Electrolytic Solution>

The nonaqueous electrolytic solution according to the present invention includes a nonaqueous solvent, an electrolyte dissolved in the nonaqueous solvent, (I) a difluoro ionic complex (1) represented by the general formula (1), and (II) at least one compound selected from the group consisting of a difluorophosphate salt, a monofluorophosphate salt, a salt having an imide anion represented by each of the general formulas (II-1) to (II-8) below, and a silane compound represented by the general formula (II-9) below, wherein 95 mol % or more of the difluoro ionic complex (1) is a difluoro ionic complex (1-Cis) in a cis configuration represented by the general formula (1-Cis).

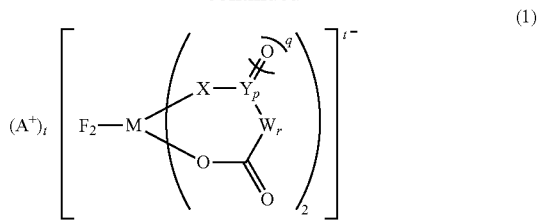

wherein in (1-Cis) and (1-Trans),

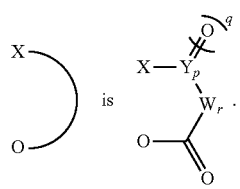

is

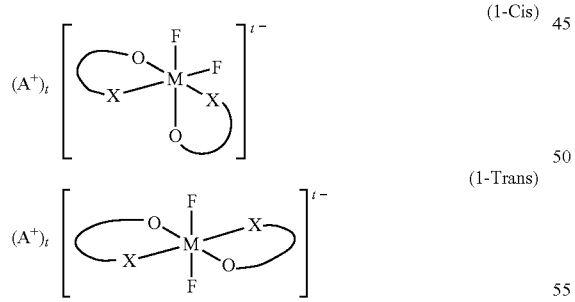

In the general formula (1) and the general formulas (1-Cis) and (1-Trans), $A^+$ is any one selected from the group consisting of a metal ion, a proton, and an onium ion, and M is any one selected from the group consisting of Si, P, As, and Sb. F is a fluorine atom, and O is an oxygen atom. t is 2 when M is Si, and t is 1 when M is P, As, or Sb.

X is an oxygen atom or —N($R^1$)—. N is a nitrogen atom, and $R^1$ is a hydrocarbon group having 1 to 10 carbon atoms and optionally having a hetero atom and/or a halogen atom (the hydrocarbon group optionally having a branched-chain or ring structure when the number of carbon atoms is 3 or more).

When X is —N($R^1$)—, and p is 0, X and W are directly bonded and may form a structure as shown in at least one selected from the general formulas (2) to (4) below. In the case of the general formula (3) below where the direct bond is a double bond, $R^1$ is not present.

Y is a carbon atom or a sulfur atom. q is 1 when Y is a carbon atom. q is 1 or 2 when Y is a sulfur atom.

W represents a hydrocarbon group having 1 to 10 carbon atoms and optionally having a hetero atom and/or a halogen atom (the hydrocarbon group optionally having a branched-chain or ring structure when the number of carbon atoms is 3 or more), or —N($R^2$)—. Here, $R^2$ represents a hydrogen atom, an alkaline metal, or a hydrocarbon group having 1 to 10 carbon atoms and optionally having a hetero atom and/or a halogen atom. When the number of carbon atoms is 3 or more, $R^2$ may have a branched-chain or ring structure.

p is 0 or 1, and q is an integer of 0 to 2, and r is an integer of 0 to 2. Further, $p+r≥1$.

The difluoro ionic complex (1) is a six-coordinate complex in which bidentate ligands are bidentately coordinated to the central element M, and fluorine atom (hereinafter, referred to as F) is further bidentately coordinated. A complex in which a ligand is coordinated to the central element M (Si, P, As, Sb) through oxygen atom or nitrogen atom is stable, and very slowly undergoes isomerization due to exchange of the ligand in the absence of a catalyst. This can allow for separation of two conformational isomers: a cis isomer (1-Cis) in which two fluorine atoms are bonded in the same side when viewed from the central element and a trans isomer (1-Trans) in which they are bonded in the opposite sides.

A cis/trans mixture will be obtained when concentrating a reaction liquid of the difluoro ionic complex (1) obtained after excessively promoting the reaction under a modified version of the conditions described in Patent Document 8, or a reaction liquid of the difluoro ionic complex (1) obtained by fluorinating a three-molecule coordination product synthesized in accordance with Patent Document 7. When the mixture are repeatedly crystallized in a mixed solvent of a carbonate ester and a chlorinated solvent (both in the filtrate and the mother liquor), (1-Cis) and (1-Trans) each with a purity of 99.9 mol % or more can be obtained separately. Further, (1-Cis) and (1-Trans) may be each obtained by selective synthesis. (1-Cis) and (1-Trans) each preferably have a purity of 95 mol % or more, more preferably 98 mol % or more, and even more preferably 99 mol % or more.

A difluoro ionic complex (1) to be added to the electrolytic solution for nonaqueous electrolytic solution batteries according to the present invention is not a mixture of the equal amount of cis/trans, but the percentage of (1-Cis) in the difluoro ionic complex (1) to be included in the electrolytic solution for nonaqueous electrolytic solution batteries is 95 mol % or more, preferably 98 mol % or more, and more preferably 99 mol % or more. That is, the mass ratio (1-Trans)/(1-Cis) of (1-Trans) to (1-Cis) is preferably 0.05 or less even when (1-Trans) is included in the electrolytic solution for nonaqueous electrolytic solution batteries.

No matter whether the difluoro ionic complex is a cis isomer or a trans isomer, a combination of M, X, Y, W, p, q, r, and t in an anion moiety of the difluoro ionic complex (1) is preferably at least one in any of the following combinations selected from (1a) to (1d) below.

(1a) M=P; X=O; Y=C; p=q=t=1; and r=0
(1b) M=P; X=O; W=C(CF$_3$)$_2$; p=q=0; and r=t=1;
(1c) M=Si; X=O; Y=C; p=q=1; t=2; and r=0
(1d) M=P; X=N(R$^1$); Y=C; R$^1$=CH$_3$; p=q=t=1; and r=0

Further, there is no particular limitation for A$^+$ as a cation of the difluoro ionic complex (1), where A$^+$ is any one selected from the group consisting of a metal ion, a proton, and an onium ion, as long as it does not impair the performance of the nonaqueous electrolytic solution and the nonaqueous electrolytic solution battery according to the present invention, but a lithium ion, a sodium ion, a potassium ion, a quaternary alkylammonium ion, or a combination of at least two thereof is preferred in view of helping ionic conductance in a nonaqueous electrolytic solution battery. There is no particular limitation for the quaternary alkylammonium ion, but examples include trimethylpropylammonium and 1-butyl-1-methylpyrrolidinium.

For example, the difluoro ionic complexes (1a-Cis) and (1a-Trans) in which A=Li; M=P; X=O; Y=C; p=q=t=1; and r=0 are not readily isomerized under neutral conditions. The ratio of (1a-Cis) and (1a-Trans) does not change at 40° C. after 4 hours in solutions of ethylmethyl carbonate where (1a-Cis) and (1a-Trans) are mixed in 1:9 or 5:5.

The nonaqueous electrolytic solution according to the present invention preferably contains an electrolyte, a nonaqueous solvent or a polymer mixture, and one or more ionic complexes selected from the cis-coordinated ionic complexes represented by the general formula (1-Cis) in an amount of 0.001 mass % or more and 20 mass % or less. Inclusion of (1-Cis) can significantly improve output characteristics (in particular, output characteristics at low temperature after charge and discharge are repeated). The content of (1-Cis) in the nonaqueous electrolytic solution is preferably 0.01 mass % or more and 10 mass % or less. More preferably, the content is 0.1 mass % or more and 3.0 mass % or less. A content of less than 0.001 mass % may result in an insufficient effect for improving output characteristics of a nonaqueous electrolytic solution battery at low temperature. On the other hand, a content of more than 20 mass % may excessively increase the viscosity of an electrolytic solution to interfere with movement of cations in a nonaqueous electrolytic solution battery, resulting in decreased battery performance.

Further, output characteristics at low temperature after storage at high temperature can be improved by adding a certain amount of (1-Trans) relative to (1-Cis). At this time, the difluoro ionic complex (1-Trans)/the difluoro ionic complex (1-Cis) (mass ratio) is in a range of 0.0001 to 0.05, preferably 0.001 to 0.03, and more preferably 0.002 or more and 0.01 or less.

In the present invention, methods of quantifying the mass ratio (1-Trans)/(1-Cis) of (1-Trans) to (1-Cis) in an electrolytic solution include NMR analysis, liquid chromatography-mass spectrometry (LC-MS), and the like. In NMR analysis, (1-Trans) and (1-Cis) each have a peak in different positions in NMR, and thus the mass ratio can be quantified by measuring the areas of their identified peaks. In LC-MS, the peaks of (1-Trans) and (1-Cis) can be separated using a column, and thus the mass ratio can be quantified by measuring their peak areas.

Further, addition of the tetrafluoro ionic complex (1-Tetra) having tetradentate F atoms to a nonaqueous electrolytic solution containing (1-Cis) or (1-Cis)+(1-Trans) can lead to suppression of an increase in the pressure inside a container when the nonaqueous electrolytic solution is subjected to long-term storage. At this time, the tetrafluoro ionic complex (1-Tetra)/the difluoro ionic complex (1-Cis) (mass ratio) is in a range of preferably 0.02 to 0.25, more preferably 0.05 to 0.22, and even more preferably 0.07 to 0.20.

Further, the group (II) compound above is preferably at least one compound selected from the group consisting of a difluorophosphate salt, a monofluorophosphate salt, a salt having an imide anion represented by each of the general formulas (II-1) to (II-8) below, and a silane compound represented by the general formula (II-9) below. A cation in the difluorophosphate salt and a monofluorophosphate salt is a metal ion, proton, or onium ion, and, for example, LiPO$_2$F$_2$ and Li$_2$PO$_3$F, respectively, can be used. These may be used alone, or may be used by appropriately combining two or more.

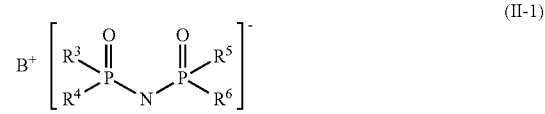

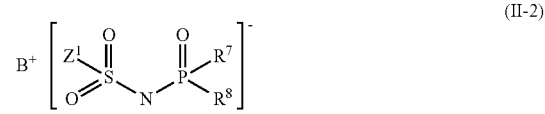

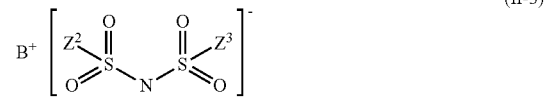

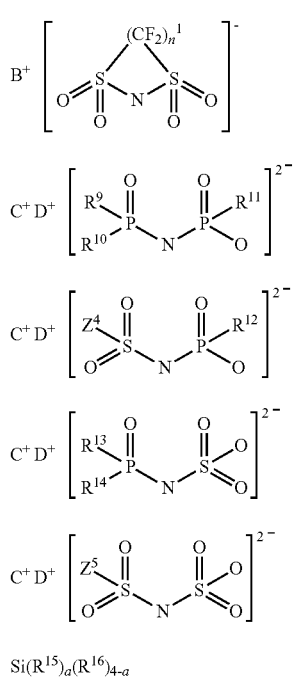

[In the general formulas (II-1) to (II-8), $R^3$ and $R^4$ are each independently a fluorine atom or an organic group selected from a straight chain or branched alkoxy group having 1 to 10 carbon atoms, an alkenyloxy group, an alkynyloxy group, a cycloalkoxy group having 3 to 10 carbon atoms, a cycloalkenyloxy group, and an aryloxy group having 6 to 10 carbon atoms, and at least one of a fluorine atom, an oxygen atom, and an unsaturated bond is optionally present in the organic group; $Z^1$ and $Z^5$ are each independently a fluorine atom or an organic group selected from a straight chain or branched alkyl group having 1 to 10 carbon atoms, an alkenyl group, an alkynyl group, a cycloalkyl group having 3 to 10 carbon atoms, a cycloalkenyl group, an aryl group having 6 to 10 carbon atoms, a straight chain or branched alkoxy group having 1 to 10 carbon atoms, an alkenyloxy group, an alkynyloxy group, a cycloalkoxy group having 3 to 10 carbon atoms, a cycloalkenyloxy group, and an aryloxy group having 6 to 10 carbon atoms, and at least one of a fluorine atom, an oxygen atom, and an unsaturated bond is optionally present in the organic group; $n^1$ represents an integer of 1 to 8; and $B^+$, $C^+$, and $D^+$ each independently represent any one selected from the group consisting of a metal ion, a proton, and an onium ion, and $C^+$ and $D^+$ are optionally identical; and in the general formula (II-9), $R^{15}$ each independently represent a group having a carbon-carbon unsaturated bond; $R^{16}$ are each independently selected from a fluorine atom and a straight chain or branched alkyl group having 1 to 10 carbon atoms, and the alkyl group optionally has a fluorine atom and/or an oxygen atom; and a is 2 to 4.]

The content of the group (II) compound is preferably in the range of 0.01 mass % or more and 25 mass % or less relative to the nonaqueous electrolytic solution. In the case where the group (II) compound comprises the difluorophosphate salt, the content of the difluorophosphate salt is preferably in the range of 0.01 mass % or more and 3 mass % or less relative to the nonaqueous electrolytic solution. In the case where the group (II) compound comprises the monofluorophosphate salt, the content of the monofluorophosphate salt is preferably in the range of 0.01 mass % or more and 3 mass % or less relative to the nonaqueous electrolytic solution. In the case where the group (II) compound comprises the salt having the imide anion represented by each of the general formulas (II-1) to (II-8), the content of the salt having the imide anion represented by each of the general formulas (II-1) to (II-8) above is preferably in the range of 0.01 mass % or more and 10 mass % or less relative to the nonaqueous electrolytic solution. In the case where the group (II) compound comprises the silane compound represented by the general formula (II-9) above, the content of the silane compound represented by the general formula (II-9) above is preferably in the range of 0.001 mass % or more and 10 mass % or less relative to the nonaqueous electrolytic solution.

Examples of the salts having the imide anion represented by the general formula (II-1) above include the following compounds. However, the salts having the imide anion used in the present invention are not at all limited by the following examples.

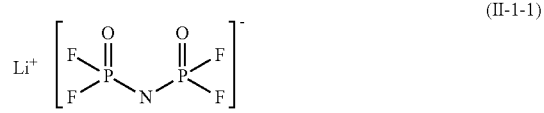

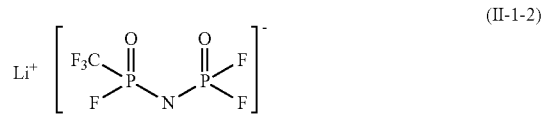

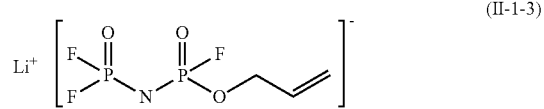

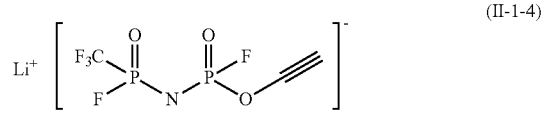

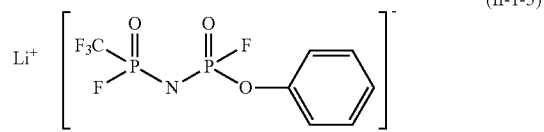

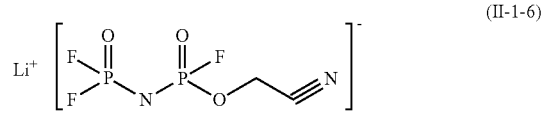

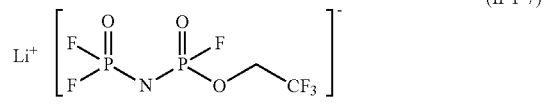

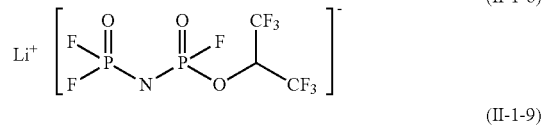

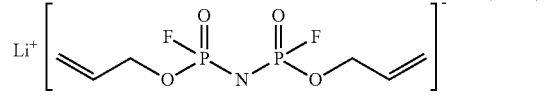

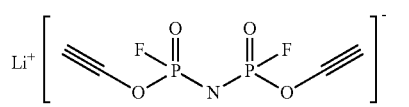 (II-1-10)

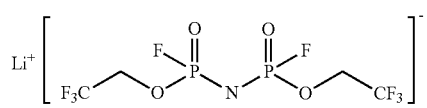 (II-1-11)

Examples of the salts having the imide anion represented by the general formula (II-2) above include the following compounds.

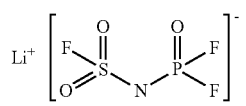 (II-2-1)

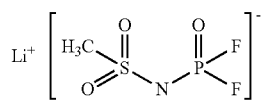 (II-2-2)

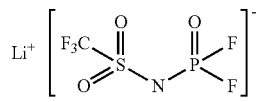 (II-2-3)

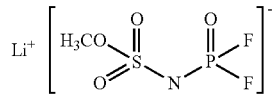 (II-2-4)

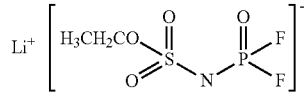 (II-2-5)

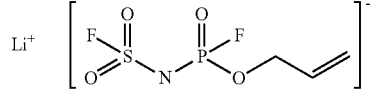 (II-2-6)

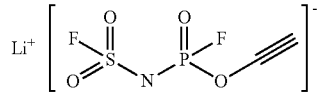 (II-2-7)

Examples of the salts having the imide anion represented by the general formula (II-3) above include the following compounds.

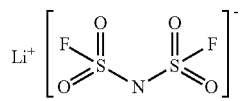 (II-3-1)

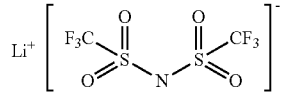 (II-3-2)

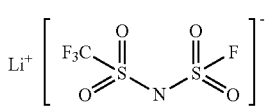 (II-3-3)

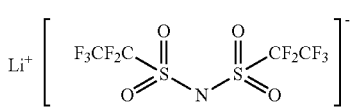 (II-3-4)

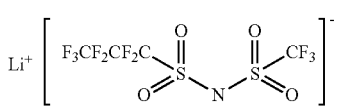 (II-3-5)

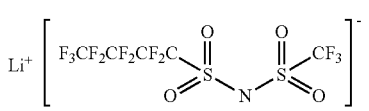 (II-3-6)

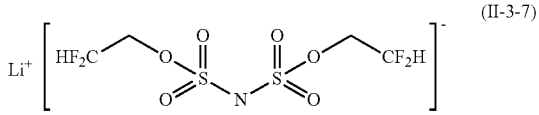 (II-3-7)

Examples of the salts having the imide anion represented by the general formula (II-4) above include the following compounds.

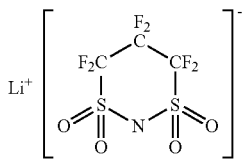 (II-4-1)

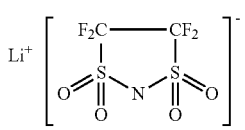 (II-4-2)

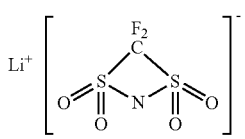 (II-4-3)

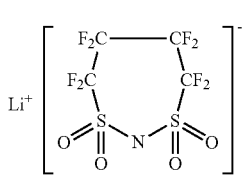 (II-4-4)

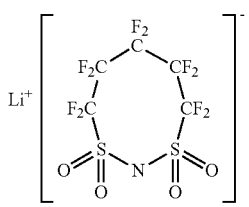 (II-4-5)

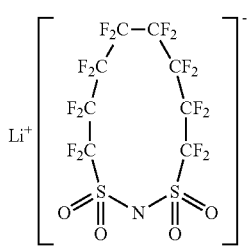
(II-4-6)

Examples of the salts having the imide anion represented by the general formula (II-5) above include the following compounds.

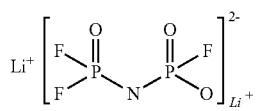
(II-5-1)

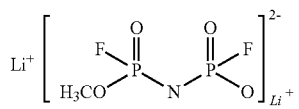
(II-5-2)

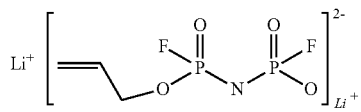
(II-5-3)

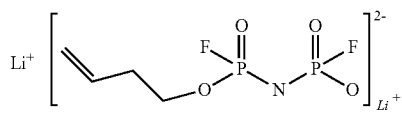
(II-5-4)

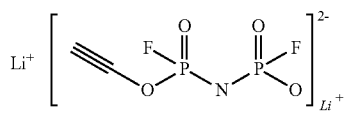
(II-5-6)

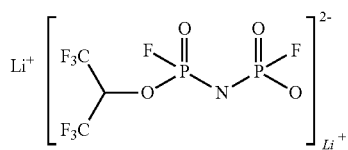
(II-5-5)

Examples of the salts having the imide anion represented by the general formula (II-6) above include the following compounds.

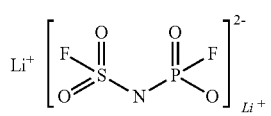
(II-6-1)

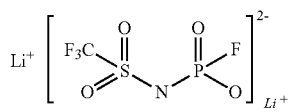
(II-6-2)

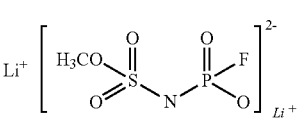
(II-6-3)

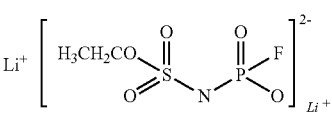
(II-6-4)

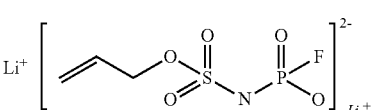
(II-6-5)

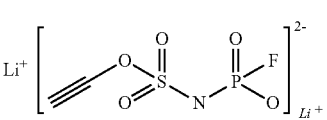
(II-6-6)

Examples of the salts having the imide anion represented by the general formula (II-7) above include the following compounds.

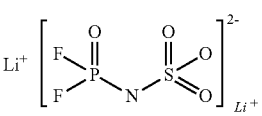
(II-7-1)

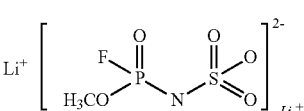
(II-7-2)

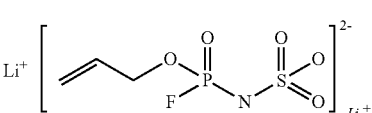
(II-7-3)

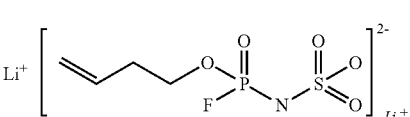
(II-7-4)

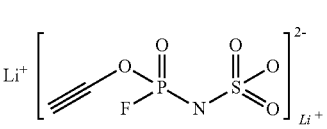
(II-7-5)

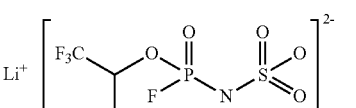
(II-7-6)

Examples of the salts having the imide anion represented by the general formula (II-8) above include the following compounds.

(II-8-1) 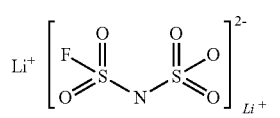
(II-8-2) 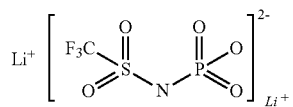
(II-8-3) 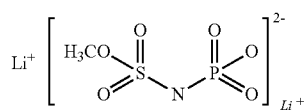
(II-8-4) 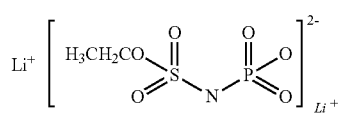
(II-8-5) 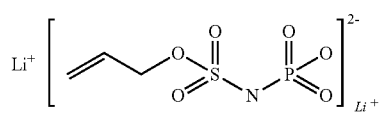
(II-8-6) 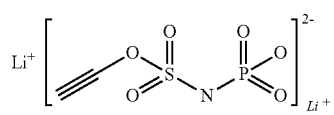
Examples of the silane compounds represented by the general formula (II-9) above include the following compounds.
(II-9-1) 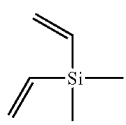
(II-9-2) 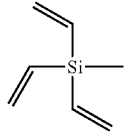
(II-9-3) 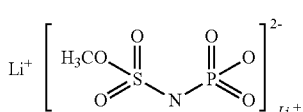
(II-9-4) 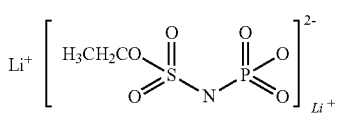
(II-9-5) 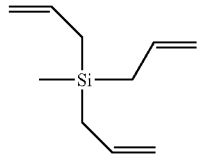
(II-9-6) 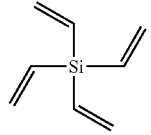
(II-9-7) 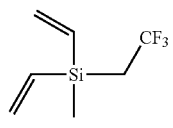
(II-9-8) 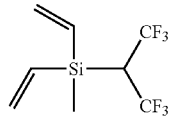
(II-9-9) 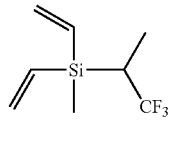
(II-9-10) 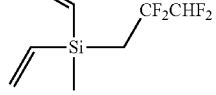
(II-9-11) 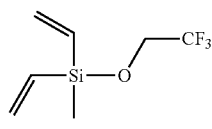
(II-9-12) 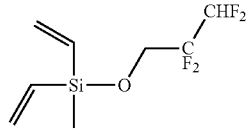
(II-9-13) 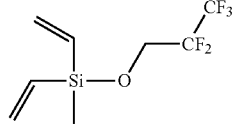
(II-9-14) 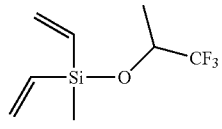
(II-9-15) 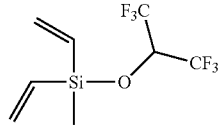

-continued (II-9-16) 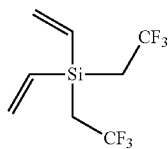

(II-9-17) 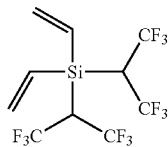

(II-9-18) 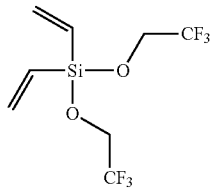

(II-9-19) 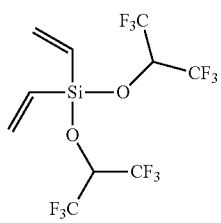

(II-9-20) 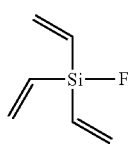

(II-9-21) 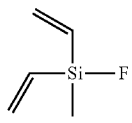

(II-9-22) 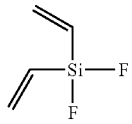

(II-9-23) 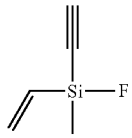

(II-9-24) 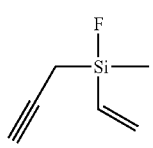

(II-9-25) 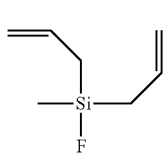

The salt having the imide anion represented by the general formula (II-1) above can be produced by various methods. There is no limitation on the production method. The production can be performed, for example, by reacting a corresponding phosphoryl chloride (P(=O)R$^3$R$^4$Cl) and a phosphoric amide (H$_2$NP(=O)R$^5$R$^6$) in the presence of an organic base or an inorganic base.

The salt having the imide anion represented by the general formula (II-2) above can be produced by various methods. There is no limitation on the production method. The production can be performed, for example, by reacting a corresponding phosphoryl chloride (P(=O)R$^7$R$^8$Cl) and a sulfonamide (H$_2$NSO$_2$Z$^1$) in the presence of an organic base or an inorganic base.

The salt having the imide anion represented by the general formula (II-3) above can be produced by various methods. There is no limitation on the production method. The production can be performed, for example, by reacting a corresponding sulfonyl chloride (Z$^2$SO$_2$Cl) and a corresponding sulfonamide (H$_2$NSO$_2$Z$^3$) in the presence of an organic base or an inorganic base.

The salt having the imide anion represented by the general formula (II-4) above can be produced by various methods. There is no limitation on the production method. The production can be performed, for example, by reacting a corresponding fluoroalkane disulfonyl chloride (ClSO$_2$(CF$_2$)$_n$SO$_2$Cl) and a corresponding ammonia (NH$_3$) in the presence of an organic base or an inorganic base.

The salt having the imide anion represented by the general formula (II-5) above can be produced by various methods. There is no limitation on the production method. The production can be performed, for example, by reacting a corresponding phosphoryl chloride (P(=O)R$^9$R$^{10}$Cl) and a corresponding phosphoric amide (H$_2$NP(=O)R$^{11}$O$^-$) in the presence of an organic base or an inorganic base.

The salt having the imide anion represented by the general formula (II-6) above can be produced by various methods. There is no limitation on the production method. The production can be performed, for example, by reacting a corresponding sulfonyl chloride (Z$^4$SO$_2$Cl) and a corresponding phosphoric amide (H$_2$NP(=O)R$^{12}$O$^-$) in the presence of an organic base or an inorganic base.

The salt having the imide anion represented by the general formula (II-7) above can be produced by various methods. There is no limitation on the production method. The production can be performed, for example, by reacting a corresponding phosphoryl chloride (P(=O)R$^{13}$R$^{14}$Cl) and a sulfamic acid (H$_2$NSO$_3$$^-$) in the presence of an organic base or an inorganic base.

The salt having the imide anion represented by the general formula (II-8) above can be produced by various methods. There is no limitation on the production method. The production can be performed, for example, by reacting a corresponding sulfonyl chloride (Z$^3$SO$_2$Cl) and a corresponding sulfamic acid (H$_2$NSO$_3$$^-$) in the presence of an organic base or an inorganic base.

Further, cation exchange may appropriately be performed in the methods for producing the salts of the general formulas (II-1) to (II-8) as describe above.

The silane compound represented by the general formula (II-9) above can be produced, for example, by a method for producing a carbon-carbon unsaturated bond-containing silicon compound by reacting a silanol group or hydrolyzable group-containing silicon compound and a carbon-carbon unsaturated bond-containing organic metal reagent and replacing the silanol group or hydrolyzable group in the silicon compound with a carbon-carbon unsaturated bond group.

The concentration of (II-9) relative to the nonaqueous electrolytic solution has a lower limit of preferably 0.001 mass % or more, more preferably 0.01 mass % or more, and even more preferably 0.1 mass % or more and has an upper limit of preferably 10.0 mass % or less, more preferably 5.0 mass % or less, and even more preferably 2.0 mass % or less. It is not preferable that the concentration of (II-9) is less than 0.001 mass % because it is difficult to obtain sufficient effects of improving high-temperature cycle characteristics and high-temperature storage properties of nonaqueous electrolytic solution batteries using the nonaqueous electrolytic solution. On the other hand, it is not preferable that the concentration of (II-9) is more than 10.0 mass % because, owing to high viscosity of the nonaqueous electrolytic solution, it is difficult to obtain sufficient effects of improving high-temperature cycle characteristics of nonaqueous electrolytic solution batteries using the nonaqueous electrolytic solution. As long as (II-9) is in a range not exceeding 10.0 mass %, one kind of silane compound may be used alone or two or more kinds of silane compounds may be used in the form of mixture with any combination or proportion along with applications.

Further, addition of the tetrafluoro ionic complex (1-Tetra) having tetradentate F atoms to a nonaqueous electrolytic solution containing (1-Cis) or (1-Cis)+(1-Trans) can lead to suppression of an increase in the pressure inside a container when the nonaqueous electrolytic solution is subjected to long-term storage. At this time, the tetrafluoro ionic complex (1-Tetra)/the difluoro ionic complex (1-Cis) (mass ratio) is in a range of preferably 0.02 to 0.25, more preferably 0.05 to 0.22, and even more preferably 0.07 to 0.20.

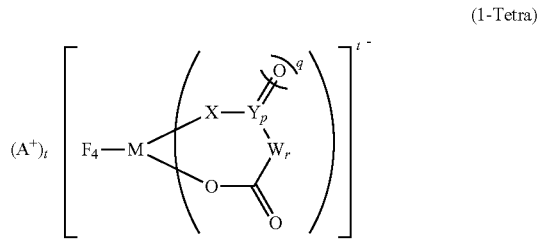

(1-Tetra)

In the general formula (1-Tetra), $A^+$, M, F, O, X, Y, W, p, q, r, and t are as described in the general formula (1).

A combination of M, X, Y, W, p, q, r, and t in the anion moiety of the tetrafluoro ionic complex (1-Tetra) is preferably at least one combination selected from (Tetra-a), (Tetra-b), (Tetra-c), and (Tetra-d) below.
(Tetra-a) M=P; X=O; Y=C; p=q=t=1; and r=0
(Tetra-b) M=P; X=O; W=C(CF$_3$)$_2$; p=q=0; and r=t=1
(Tetra-c) M=Si; X=O; Y=C; p=q=1; t=2; and r=0
(Tetra-d) M=P; X=N(R$^1$); Y=C; R$^1$=CH$_3$; p=q=t=1; and r=0

It is noted that a low-temperature property (the ratio of discharge capacities of −20° C./25° C.) at 0° C. or below as well as cycle characteristics and high-temperature storage properties is improved when an electrolytic solution including both an ionic complex (1-Tetra) where the anion moiety is (Tetra-a) and A=Li (hereinafter referred to as (5a-Tetra)) and an ionic complex (1-Cis) where the anion moiety is (Cis-a) and A=Li (hereinafter referred to as (1a-Cis)) is used.

Further, the tetrafluoro ionic complex (1-Tetra) does not have conformational isomers.

Although a six-coordinate ionic complex having two types of ligands (one of them is F) which can be present as its cis- or trans-isomer as shown in the difluoro ionic complex (1) has been used as described in Patent Document 8, the effects of the cis isomer alone and the trans isomer alone have not closely studied separately. In the present application, a cis isomer alone or a trans isomer alone was separately added to compare their individual effects. Results revealed that the cis isomer showed a better effect for improving output characteristics at low temperature after cycle durability tests.

When voltage is applied to a nonaqueous electrolytic solution containing a difluorophosphate complex having P as the central element selected from the difluoro ionic complexes (1), the difluorophosphate complex is reductively decomposed to generate a reduction-reaction decomposition product (intermediate) with a very short life time in the system. It may react with a functional group present on the surface of a negative electrode to form a SEI on the negative electrode. The SEI mainly includes a derivative of difluorophosphoric acid and a derivative of carbonic acid.

Reduction-reaction decomposition products from reduction reactions are likely different between the cis isomer and the trans isomer due to steric and electronic factors, resulting in different selectivities and rates for a reaction with a functional group on the surface of an electrode.

First, steric factors will be discussed with regard to the initiation of a reduction reaction between a negative electrode and difluorophosphate complexes (cis, trans). A difluorophosphate complex receives an electron from a negative electrode at a portion of a ligand other than F (for example, a carbon atom on the carbonyl group in the case of 1a) where the reduction reaction is initiated. Accordingly, the electron needs to approach the negative electrode from a side where F is not bonded to initiate the reduction reaction. The trans isomer has F atoms bonded at the upper and lower sides of the molecule. Consequently, the reduction reaction is initiated only when an electron approaches an electrode from either right or left, i.e., from a range of total 180° in the horizontal direction except for 180° in the vertical direction. In contrast, the cis isomer has F atoms only in the same side, and thus an electron can approach from a range of 200° to 250° in the opposite side. This increases the probability of initiation of the reduction reaction as compared with the trans isomer.

Next, electronic factors will be discussed. The LUMO level is slightly lower for the cis isomer than for the trans isomer. Therefore, the cis isomer more readily receives an electron from an electrode, leading to a more rapidly proceeding reduction reaction.

Further, the difluorophosphate complex before decomposition is a six-coordinate phosphorus compound while the difluoro phosphoric acid derivative as the main component of SEI after decomposition is a five-coordinate phosphorus compound. It undergoes transform from six-coordination to five-coordination when the difluorophosphate complex decomposes to generate a highly active intermediate, and the intermediate reacts with a functional group on the surface of a negative electrode. For the trans isomer, the bond angle of F-P-F before decomposition (six-coordination) is 180° while the bond angle of F-P-F after decomposition (five-coordination) is about 100°. Therefore, a large structural change is required. On the other hand, the cis isomer shows only a small change of from 90° (before decomposition, six-coordination) to about 100° (after decomposition, five-coordination). As clearly understood from the above, the energy required for the transition state of the reductive decomposition reaction is smaller in the cis isomer without a large structural change, and thus the reductive decomposition of the cis isomer is more favored than that of the trans isomer. This is not limited to a complex having phosphorus as the central element, but also can be applied to arsenic, antimony, and silicon.

Considering that the reductive decomposition reaction proceeds in different rates between the cis isomer and the trans isomer, the difference in the performance of SEI formed therefrom will be discussed.

The reductive decomposition reaction rapidly proceeds in the cis isomer to rapidly form an SEI which mainly contains a derivative of difluorophosphoric acid and a derivative of carbonic acid. To date, it has been revealed that an SEI consisting of a derivative of difluorophosphoric acid has an excellent effect for improving the cycle characteristics, high-temperature storage properties, and output characteristics of a battery while an SEI consisting of a derivative of carbonic acid has an excellent effect for improving the cycle characteristics and high-temperature storage properties. The reductive decomposition reaction of the trans isomer is slower as compared with that of the cis isomer, and thus prompt formation of an SEI consisting only of a derivative of difluorophosphoric acid and a derivative of carbonic acid is difficult to obtain. Due to this, the reduction reaction of a solvent also proceeds concomitantly with it, resulting in formation of an SEI mainly containing a mixture of a derivative of difluorophosphoric acid and a derivative of carbonic acid from the difluorophosphate complex, and carbonic acid and an alkyl carbonate salt from a solvent. (the difluorophosphate complex is much more susceptible to decomposition than a solvent, but the number of solvent molecules is enormously large, and thus decomposition of a solvent also proceeds although it is very little.)

An SEI consisting of an alkyl carbonate salt included therein can improve cycle characteristics and high-temperature storage properties, but may decrease cation conductivity as compared with an SEI consisting of a derivative of carbonic acid due to a reduced ratio of oxygen. Therefore, output characteristics may be improved only marginally, or may even be decreased.

As described above, the different rates of the reductive decomposition reaction between the cis isomer and the trans isomer may alter the selectivity of the reductive decomposition reaction (the presence or absence of solvent decomposition), resulting in different main components in SEIs formed therefrom. This is likely responsible for the difference in the effects of SEIs for improving the battery performance in the end.

As described above, output characteristics at low temperature after high-temperature storage can be improved by adding (1-Trans) in a certain amount relative to (1-Cis). The reasons of this will be discussed similarly in terms of the different properties of SEIs between the cis isomer and the trans isomer. In a lithium battery, lithium is gradually released from a negative electrode in a fully charged condition to react with a solvent during high-temperature storage as oxidative decomposition of the solvent proceeds on the surface of a positive electrode maintained at a high potential. Due to this, highly resistive decomposition products accumulate on the positive and negative electrodes. Further, reversibly available lithium is decreased, resulting in decreased battery performance (the charge-and-discharge rate and capacity are decreased). A negative-electrode SEI consisting of an alkyl carbonate salt has a low ionic conductivity, and thus is disadvantageous for output characteristics. However, it can reduce the release of lithium from the negative electrode during high-temperature storage to prevent a decreased capacity after high-temperature storage. As a result, a high capacity is maintained after high-temperature storage. When high-rate discharge capacities (output characteristics) at low temperature are compared after high-temperature storage, the amount of electricity obtained at high-rate discharge as compared with low-rate discharge is lower as compared with an electrolytic solution of (1-Cis) only. However, the absolute values of the amount of electricity obtained at high-rate discharge is higher for an electrolytic solution having a certain amount of (1-Trans) relative to (1-Cis) than an electrolytic solution having (1-Cis) only because the starting capacity is higher.

In the tetrafluoro ionic complex (1-Tetra) having tetradentate F atoms, a ligand other than F has lower electron density as compared with the difluoro ionic complex (1) having bidentate F atoms because of the strong electron-withdrawing effect of F. This makes the ligand more susceptible to a nucleophilic attack. Therefore, if a trace amount of water is present in an electrolytic solution, (1-Tetra) is selectively hydrolyzed instead of (1). For example, when the central element M is P, the moiety of tetrafluorophosphoric acid of (1-Tetra) is converted into a salt of hexafluorophosphoric acid by hydrolysis (a ligand other than F is disproportioned after leaving). The ligand moiety other than F leaves from the central element P, and is decomposed to release carbon dioxide and carbon monoxide. The amount of carbon dioxide and carbon monoxide released at this time is ½ mol equivalent relative to (1). This can significantly reduce the yield of carbon dioxide and carbon monoxide which otherwise may increase the internal pressure.

In general, a nonaqueous electrolytic solution is called a nonaqueous electrolyte when a nonaqueous solvent is used, and called a polymeric solid electrolyte when a polymer is used. Polymeric solid electrolytes include those containing a nonaqueous solvent as a plasticizing agent. It is noted that an electrochemical device is referred to as a nonaqueous electrolytic solution battery, the device including the present nonaqueous electrolytic solution; a negative-electrode material enabling reversible insertion and desorption of an alkali metal ion such as a lithium ion and a sodium ion or an alkaline earth metal ion; and a positive-electrode material enabling reversible insertion and desorption of an alkali metal ion such as a lithium ion and a sodium ion or an alkaline earth metal ion.

There is no particular limitation for the electrolyte, and salts of any cations and any anions can be used. As specific examples, cations include alkali metal ions such as a lithium ion and a sodium ion; alkaline earth metal ions; quaternary alkylammonium ions; and the like. Anions include anions of hexafluorophosphoric acid, tetrafluoroboric acid, perchloric acid, hexafluoroarsenic acid, hexafluoroantimonic acid, trifluoromethanesulfonic acid, bis(trifluoromethanesulfonyl)imide, bis(pentafluoroethanesulfonyl)imide, (trifluoromethanesulfonyl)(pentafluoroethanesulfonyl)imide, bis(fluorosulfonyl)imide, (trifluoromethanesulfonyl)(fluorosulfonyl)imide, (pentafluoroethanesulfonyl)(fluorosulfonyl)imide, tris(trifluoromethanesulfonyl)methide, bis(difluorophosphonyl)imide, and the like. These electrolytes may be used alone, or may be used in a mixture in any combination or ratio of two or more depending on applications. Among these, cations of lithium, sodium, magnesium, and quaternary alkylammonium are preferred as cations, and anions of hexafluorophosphoric acid, tetrafluoroboric acid, bis(trifluoromethane sulfonyl)imide, bis(fluorosulfonyl)imide, and bis(difluoro phosphonyl)imide are preferred as anions in view of energy density, output characteristics, lifetime, and the like of a battery.

There is no particular limitation for the nonaqueous solvent as long as it is an aprotic solvent in which the ionic complex according to the present invention can be dissolved. For example, carbonates, esters, ethers, lactones, nitriles, imides, sulfones, and the like can be used. Further, they may be used alone or as a mixed solvent of two or more. Specific examples can include ethylmethyl carbonate, dimethyl carbonate, diethyl carbonate, methylpropyl carbonate, ethylpropyl carbonate, methylbutyl carbonate, ethylene carbonate, propylene carbonate, butylene carbonate, methyl acetate, ethyl acetate, methyl propionate, ethyl propionate, diethyl ether, acetonitrile, propionitrile, tetrahydrofuran, 2-methyltetrahydrofuran, furan, tetrahydropyran, 1,3-dioxane, 1,4-dioxane, dibutyl ether, diisopropyl ether, 1,2-dimethoxyethane, N,N-dimethylformamide, dimethyl sulfoxide, sulfolane, γ-butyrolactone, γ-valerolactone, and the like.

Further, the nonaqueous solvent preferably contains at least one selected from the group consisting of cyclic carbonates and chain carbonates. Examples of cyclic carbonates can include ethylene carbonate and propylene carbonate, and examples of chain carbonates can include ethylmethyl carbonate, dimethyl carbonate, diethyl carbonate, and methylpropyl carbonate.

Further, in addition to carbonates, the nonaqueous solvent may further contain at least one selected from the group consisting of esters, ethers, lactones, nitriles, amides, and sulfones.

Further, the nonaqueous solvent may further contain at least one compound selected from the group consisting of vinylene carbonate, vinylethylene carbonate, ethynylethylene carbonate, and fluoroethylene carbonate.

There is no particular limitation for the polymer which can be used to obtain a polymeric solid electrolyte including the ionic complex according to the present invention as long as it is an aprotic polymer in which the aforementioned ionic complexes and the aforementioned electrolyte can be solved. Examples can include polymers having polyethylene oxide in their main chains or side chains, homopolymers or copolymers of polyvinylidene fluoride, methacrylate ester polymers, polyacrylonitrile, and the like. When a plasticizing agent is added to these polymers, the above aprotic nonaqueous solvents may be used.

In the present invention, there is no particular limitation for the concentration of a electrolyte in these ion conductors, but the lower limit is preferably 0.5 mol/L or more, more preferably 0.7 mol/L or more, and even more preferably 0.9 mol/L or more, and the upper limit is preferably 5.0 mol/L or less, more preferably 4.0 mol/L or less, and even more preferably 2.0 mol/L or less. A concentration of less than 0.5 mol/L may decrease cycle characteristics and output characteristics of a nonaqueous electrolytic solution battery due to decreased ion conductivity. On the other hand, a concentration of more than 5.0 mol/L may increase the viscosity of a nonaqueous electrolytic solution, decreasing cycle characteristics and output characteristics of a nonaqueous electrolytic solution battery again due to decreased ion conductivity.

When a lithium salt is dissolved in manufacture of a nonaqueous electrolytic solution, the solution temperature of the nonaqueous electrolytic solution is controlled at 40° C. or below. This can prevent generation of free acid such as hydrogen fluoride (HF) which may be produced when a lithium salt in a nonaqueous electrolytic solution reacts with water in the system to undergo decomposition. As a result, decomposition of a nonaqueous solvent can also be prevented. Therefore, deterioration of the nonaqueous electrolytic solution can be prevented effectively. Further, in the step of dissolving a lithium salt, the lithium salt is added in small portions until the concentration of the entire lithium salt becomes 0.5 to 4.0 mol/L to prepare a solution. This can prevent generation of free acids such as HF in a similar manner.

For example, the following are preferably performed to maintain the solution temperature at 40° C. or below. A portion in a range of 10 to 35 mass % of the entire lithium salt is first added and dissolved in a nonaqueous solvent, and another portion in a range of 10 to 35 mass % of the entire lithium salt is then added and dissolved. This operation is repeated for 2 to 9 times, and then finally the remaining lithium salt is gradually added and dissolved.

In particular, when the nonaqueous electrolytic solution according to the present invention is prepared, an increased solution temperature of the nonaqueous electrolytic solution during preparation may promote the aforementioned side reactions. Therefore, deterioration of the nonaqueous electrolytic solution can be prevented by preventing an increase in temperature so that the solution temperature of the nonaqueous electrolytic solution is controlled at 40° C. or below. This can assure the quality of the nonaqueous electrolytic solution.

Further, a common additive may be added in any ratio to the nonaqueous electrolytic solution according to the present invention unless the spirit of the present invention is impaired. Specific examples can include compounds having effects for preventing overcharging, for forming a film on a negative-electrode, and for protecting a positive electrode such as cyclohexylbenzene, biphenyl, tert-butylbenzene, tert-amylbenzene, biphenyl, o-terphenyl, 4-fluorobiphenyl, fluorobenzene, 2,4-difluorobenzene, difluoroanisole, 1,3-propanesultone, 1,3-propenesultone, methylenemethane disulfonate, dimethylenemethane disulfonate, and trimethylenemethane disulfonate. Further, the nonaqueous electrolytic solution can be used after solidified with a gelatinizing agent or a crosslinked polymer as used in a nonaqueous electrolytic solution battery called a polymer battery.

<2. Nonaqueous Electrolytic Solution Battery>

The nonaqueous electrolytic solution battery according to the present invention includes (a) the present nonaqueous electrolytic solution, (b) a positive electrode, (c) a negative electrode, and (d) a separator and is particularly preferably a secondary battery.

[(a) Present Nonaqueous Electrolytic Solution]

The nonaqueous electrolytic solution battery according to the present invention includes the nonaqueous electrolytic solution as described in <1. Nonaqueous electrolytic solution>.

[(b) Positive Electrode]

(b) the positive electrode preferably includes at least one of oxide and polyanion compound as a positive-electrode active material.

[Positive-Electrode Active Material]

For a lithium-ion secondary battery in which cations in an nonaqueous electrolytic solution are mostly lithium ions, there is no particular limitation for the positive-electrode active material for a positive electrode as long as it is capable of charge and discharge, but examples of it include at least one selected from the group consisting of (A) a lithium-transition metal composite oxide having a layer structure and containing at least one metal of nickel, manganese, and cobalt; (B) a lithium-manganese composite oxide having the spinel structure; (C) a lithium-containing olivine-type phosphate salt; and (D) a lithium-rich layered transition metal oxide having the stratified rock-salt structure.

((A) Lithium-Transition Metal Composite Oxide)

Examples of (A) the lithium-transition metal composite oxide having a layer structure and containing at least one metal of nickel, manganese, and cobalt include lithium-cobalt composite oxides, lithium-nickel composite oxides, lithium-nickel-cobalt composite oxides, lithium-nickel-cobalt-aluminum composite oxides, lithium-cobalt-manganese composite oxides, lithium-nickel-manganese composite oxides, lithium-nickel-manganese-cobalt composite oxides, and the like. Those in which some of the main transition metal atoms of these lithium-transition metal composite oxides are replaced with other elements such as Al, Ti, V, Cr, Fe, Cu, Zn, Mg, Ga, Zr, Si, B, Ba, Y, and Sn can also be used.

Specific examples of lithium-cobalt composite oxides and lithium-nickel composite oxides can include $LiCoO_2$, $LiNiO_2$, and lithium cobalt oxides having a hetero element such as Mg, Zr, Al, and Ti ($LiCo_{0.98}$ $Mg_{0.01}$ $Zr_{0.01}O_2$, $LiCo_{0.98}$ $Mg_{0.01}Al_{0.01}O_2$, $LiCo_{0.975}$ $Mg_{0.01}$ $Zr_{0.005}Al_{0.01}O_2$, and the like). Lithium cobalt oxides having a rare earth compound adhered on the surface as described in WO2014/034043 may also be used. Further, those in which a portion of the particle surface of $LiCoO_2$ particulate powder is coated with aluminum oxide as described in Japanese Unexamined Patent Application, Publication No. 2002-151077 and others may be used.

Lithium-nickel-cobalt composite oxides and lithium-nickel-cobalt-aluminum composite oxides may be represented by the general formula (1-1).

$$Li_aN_{1-b-c}Co_bM^1_cO_2 \quad (1-1)$$

In the formula (1-1), $M^1$ is at least one element selected from Al, Fe, Mg, Zr, Ti, and B, and a is $0.9 \leq a \leq 1.2$, and b and c satisfy the requirements of $0.1 \leq b \leq 0.3$ and $0 \leq c \leq 0.1$, respectively.

These can be prepared in accordance with, for example, the method of manufacture as described in Japanese Unexamined Patent Application, Publication No. 2009-137834 and others. Specific examples include $LiNi_{0.8}Co_{0.2}O_2$, $LiNi_{0.85}Co_{0.10}Al_{0.05}O_2$, $LiNi_{0.87}Co_{0.10}Al_{0.03}O_2$, $LiNi_{0.6}Co_{0.3}Al_{0.1}O_2$, and the like.

Specific examples of lithium-cobalt-manganese composite oxides and lithium-nickel-manganese composite oxides include $LiNi_{0.5}Mn_{0.5}O_2$, $LiCo_{0.5}Mn_{0.5}O_2$, and the like.

Lithium-nickel-manganese-cobalt composite oxides include lithium-containing composite oxides represented by the general formula (1-2).

$$Li_dNi_eMn_fCo_gM^2_hO_2 \quad (1-2)$$

In the formula (1-2), $M^2$ is at least one element selected from Al, Fe, Mg, Zr, Ti, B, and Sn, and d is $0.9 \leq d \leq 1.2$, and e, f, g, and h satisfy the requirements of $e+f+g+h=1$, $0 \leq e \leq 0.7$, $0 \leq f \leq 0.5$, $0 \leq g \leq 0.5$, and $h \geq 0$.

Preferred are lithium-nickel-manganese-cobalt composite oxides containing manganese in the range specified in the general formula (1-2) in order to improve structural stability and high-temperature safety of a lithium secondary battery. In particular, more preferred is those further containing cobalt in the range specified in the general formula (1-2) in order to improve high-rate properties of a lithium-ion secondary battery.

Specific examples include $Li[Ni_{1/3}Mn_{1/3}Co_{1/3}]O_2$, $Li[Ni_{0.45}Mn_{0.35}Co_{0.2}]O_2$, $Li[Ni_{0.5}Mn_{0.3}Co_{0.2}]O_2$, $Li[Ni_{0.6}Mn_{0.2}Co_{0.2}]O_2$, $Li[Ni_{0.49}Mn_{0.3}Co_{0.2}$ $Zr_{0.01}]O_2$, $Li[Ni_{0.49}Mn_{0.3}Co_{0.2}$ $Mg_{0.01}]O_2$, and the like, which have a charge-discharge range, for example, at 4.3 V or above.

((B) Lithium-Manganese Composite Oxide Having the Spinel Structure)

Examples of (B) the lithium-manganese composite oxide having the spinel structure include a spinel-type lithium-manganese composite oxide represented by the general formula (1-3).

$$Li_j(Mn_{2-k}M^3_k)O_4 \quad (1-3)$$

In the formula (1-3), $M^3$ is at least one metal element selected from Ni, Co, Fe, Mg, Cr, Cu, Al, and Ti, and j is $1.05 \leq j \leq 1.15$, and k is $0 \leq k \leq 0.20$.

Specific examples include $LiMn_2O_4$, $LiMn_{1.95}Al_{0.05}O_4$, $LiMn_{1.9}Al_{0.1}O_4$, $LiMn_{1.9}$ $Ni_{0.1}O_4$, and $LiMn_{1.5}Ni_{0.5}O_4$, and the like.

((C) Lithium-Containing Olivine-Type Phosphate Salt)

Examples of (C) the lithium-containing olivine-type phosphate salt include those represented by the general formula (1-4). $LiFe_{1-n}M^4_nPO_4$ (1-4)

In the formula (1-4), $M^4$ is at least one selected from Co, Ni, Mn, Cu, Zn, Nb, Mg, Al, Ti, W, Zr, and Cd, and n is $0 \leq n \leq 1$.

Specific example include $LiFePO_4$, $LiCoPO_4$, $LiNiPO_4$, $LiMnPO_4$, and the like. Among these, $LiFePO_4$ and/or $LiMnPO_4$ are preferred.

((D) Lithium-Rich Layered Transition-Metal Oxide)

Examples of (D) the lithium-rich layered transition-metal oxide having the stratified rock-salt structure include those represented by the general formula (1-5).

$$xLiM^5O_2 \cdot (1-x)Li_2M^6O_3 \quad (1-5)$$

In the formula (1-5), x is a number satisfying $0 < x < 1$, and $M^5$ is at least one metal element having a mean oxidation number of $3^+$, and $M^6$ is at least one metal element having a mean oxidation number of $4^+$. In the formula (1-5), $M^5$ is at least one metal element selected from Mn, Ni, Co, Fe, V, and Cr preferably having a valence of 3. That valence may be a mean oxidation number of 3 where a metal with a valence of 2 and a metal with a valence of 4 are used in the equivalent amount.

Further, in the formula (1-5), $M^6$ is preferably one or more metal elements selected from Mn, Zr, and Ti. Specific examples include $0.5[LiNi_{0.5}Mn_{0.5}O_2] \cdot 0.5[Li_2MnO_3]$, $0.5 [LiNi_{1/3}Co_{1/3}Mn_{1/3}O_2] \cdot 0.5[Li_2MnO_3]$, $0.5 [LiNi_{0.375}Co_{0.25}Mn_{0.375}O_2] \cdot 0.5[Li_2MnO_3]$, $0.5 [LiNi_{0.375}Co_{0.125}$ $Fe_{0.125}Mn_{0.375}O_2] \cdot 0.5$ $[Li_2MnO_3]$, $0.45 [LiNi_{0.375}Co_{0.25}Mn_{0.375}O_2] \cdot 0.10[Li_2TiO_3] \cdot 0.45[Li_2MnO_3]$, and the like.

The positive-electrode active material (D) represented by the general formula (1-5) is known to have a high capacity in high-voltage charging at 4.4 V or more (in terms of Li) (for example, see U.S. Pat. No. 7,135,252).

These positive-electrode active materials can be prepared in accordance with the methods of manufacture and others described in, for example Japanese Unexamined Patent Application, Publication No. 2008-270201, WO2013/118661, Japanese Unexamined Patent Application, Publication No. 2013-030284, and the like.

The positive-electrode active material needs to contain at least one selected from (A) to (D) described above as the main component. Examples of other additives which may be added include, for example, transition element chalcogenides such as $FeS_2$, $TiS_2$, $V_2O_5$, $MoO_3$, and $MoS_2$; or electrically conductive polymers such as polyacetylene, poly(p-phenylene), polyaniline, and polypyrrole; activated carbon; radical-generating polymers; carbon materials; and the like.

[Positive-Electrode Current Collector]

The positive electrode has a positive-electrode current collector. As the positive-electrode current collector, for example, aluminum, stainless steel, nickel, titanium, or alloys thereof can be used.

[Positive-Electrode Active-Material Layer]

In the positive electrode, for example, a positive-electrode active-material layer is formed on at least one surface of the positive-electrode current collector. The positive-electrode active-material layer includes, for example, the aforementioned positive-electrode active material, a binding agent, and, if desired, an electrically conductive agent.

Examples of the binding agent include polytetrafluoroethylene, poly(vinylidene fluoride), a styrene-butadiene rubber (SBR) resin, or the like.

As the electrically conductive agent, for example, carbon materials can be used such as acetylene black, Ketjen black, carbon fiber, or graphite (granular graphite and flaky graphite). Acetylene black and Ketjen black with low crystallinity are preferably used for the positive electrode.

[(c) Negative Electrode]

The negative electrode preferably includes at least one of the negative-electrode active materials below.

[Negative-Electrode Active Material]

For a lithium-ion secondary battery in which cations in an nonaqueous electrolytic solution are mostly lithium ions, examples of the negative-electrode active material of the negative electrode include, for example, those capable of doping/de-doping lithium ions which contain, for example, at least one selected from (E) a carbon material having a d value of the lattice plane [002] of 0.340 nm or less as determined by X ray diffraction; (F) a carbon material having a d value of the lattice plane [002] of more than 0.340 nm as determined by X ray diffraction; (G) an oxide of one or more metals selected from Si, Sn, and Al; (H) one or more metals selected from Si, Sn, and Al, and an alloy comprising the one or more metals and further comprising or not comprising lithium; and (I) a lithium titanium oxide. These negative-electrode active materials may be used alone or in combination of two or more.

((E) Carbon Material Having a d Value of the Lattice Plane [002] of 0.340 nm or Less as Determined by X Ray Diffraction)

Examples of (E) the carbon material having a d value of the lattice plane [002] of 0.340 nm or less as determined by X ray diffraction include pyrolytic carbons, cokes (for example, pitch coke, needle coke, petroleum coke, and the like), graphites, calcined products of organic polymer compounds (for example, those obtained by calcining and carbonizing a phenol resin, a furan resin, and the like at an appropriate temperature), carbon fiber, and activated carbon. These may be graphitized. The above carbon materials preferably have an interplanar spacing (d002) of the plane [002] of 0.340 nm or less as measured by the X-ray diffraction method. In particular, preferred is a graphite having a true density of 1.70 g/cm$^3$ or more or a high-crystallinity carbon material having characteristics similar to that.

((F) Carbon Material Having a d Value of the Lattice Plane [002] of More than 0.340 nm as Determined by X Ray Diffraction)

Examples of (F) the carbon material having a d value of the lattice plane [002] of more than 0.340 nm as determined by X ray diffraction include amorphous carbon, which is a carbon material showing almost no change in the layer structure even upon heat treatment at a high temperature of 2000° C. or more. For example, non-graphitizable carbon (hard carbon), mesocarbon microbeads (MCMB) calcined at 1500° C. or less, mesophase pitch carbon fiber (MCF), and the like. A representative example is Carbotron® P available from Kureha Corporation.

((G) Oxide of One or More Metals Selected from Si, Sn, and Al)

Examples of (G) the oxide of one or more metals selected from Si, Sn, and Al include silicon oxides, tin oxides, and the like, which are capable of doping/de-doping lithium ions.

Examples include $SiO_x$ having a structure in which ultrafine particles of Si are dispersed in $SiO_2$ and the like. When this material is used as a negative-electrode active material, charge and discharge can be smoothly performed because Si reacted with Li is of ultrafine particles. Further, when a compound (paste) for forming a negative-electrode active-material layer is made of this material, the coatability and the adhesiveness of a negative-electrode mixture layer with a current collector are also good because $SiO_x$ particles themselves having the above structure have small surface areas.

It is noted that a higher capacity and better charge-discharge cycle characteristics can be simultaneously obtained when $SiO_x$ is used along with graphite as (E) the negative-electrode active material in a specific ratio. This is because $SiO_x$ shows a large volume change upon charge and discharge.

((H) One or More Metals Selected from Si, Sn, and Al, and an alloy comprising the one or more metals and Further Comprising or not comprising Lithium)

Examples of (H) the one or more metals selected from Si, Sn, and Al, and an alloy comprising the one or more metals and further comprising or not comprising lithium include metals such as silicon, tin, and aluminum; silicon alloys; tin alloys; aluminum alloys; and the like. Materials in which these metals and alloys are alloyed with lithium during charge and discharge can also be used.

Preferred specific examples of these include elemental metals (for example, powdered materials) such as, for example, silicon (Si) and tin (Sn); alloys of the above metals; compounds containing the above metals; alloys including tin (Sn) and cobalt (Co) in the above metals; and the like as described in WO2004/100293, Japanese Unexamined Patent Application, Publication No. 2008-016424, and the like. Use of the above metals for electrodes is preferred because a high charge capacity can be obtained, and expansion and contraction of the volume upon charge and discharge are relatively small. Further, these metals are known to be alloyed with Li upon charging, leading to a high charge capacity when they are used for negative electrodes of lithium-ion secondary batteries. Therefore, use of these metals is also preferred in this regard.

Further, a negative-electrode active material formed from silicon pillars having a submicron diameter, a negative-electrode active material including silicon fiber, and the like as described in WO2004/042851, WO2007/083155, and the like can be used.

((I) Lithium Titanium Oxide)

Examples of (I) the lithium titanium oxide can include lithium titanates having the spinel structure, lithium titanates having the ramsdellite structure, and the like.

Lithium titanates having the spinel structure can include, for example, $Li_{4+\alpha}Ti_5O_{12}$ ($\alpha$ varies within the range of $0 \le \alpha \le 3$ due to charge and discharge reactions). Further, lithium titanates having the ramsdellite structure include, for example, $Li_{2+\beta}Ti_3O_7$ (β varies within the range of $0 \le \beta \le 3$ due to charge and discharge reactions). These negative-electrode active materials can be prepared in accordance with the methods of manufacture and the like as described in, for example in Japanese Unexamined Patent Application, Publication No. 2007-018883, Japanese Unexamined Patent Application, Publication No. 2009-176752, and the like.

For example, hard carbon; oxides such as $TiO_2$, $V_2O_5$, and $MoO_3$; and the like may be used as a negative-electrode active material in a sodium-ion secondary battery where cations in a nonaqueous electrolytic solution are mostly sodium ions. For example, the followings can be used as a positive-electrode active material in a sodium-ion secondary battery where cations in a nonaqueous electrolytic solution are mostly sodium ions: sodium-containing transition metal composite oxides such as $NaFeO_2$, $NaCrO_2$, $NaNiO_2$, $NaMnO_2$, and $NaCoO_2$; mixtures of multiple transition metals such as Fe, Cr, Ni, Mn, and Co of those sodium-containing transition metal composite oxides; those in which some of the transition metals of these sodium-containing transition metal composite oxides are replaced with different metals other than the transition metals; phosphate compounds of transition metals such as $Na_2FeP_2O_7$ and $NaCo_3(PO_4)_2P_2O_7$; sulfides such as $TiS_2$ and $FeS_2$; or electrically conductive polymers such as polyacethylene, poly(p-phenylene), polyaniline, and polypyrrole; activated carbon; radical-generating polymers; carbon materials; and the like.

[Negative-Electrode Current Collector]

The negative electrode has a negative-electrode current collector. As the negative-electrode current collector, for example, copper, stainless steel, nickel, titanium, or alloys thereof can be used.

[Negative-Electrode Active-Material Layer]

In the negative electrode, for example, a negative-electrode active-material layer is formed on at least one surface of the negative-electrode current collector. The negative-electrode active-material layer includes, for example, the aforementioned negative-electrode active material, a binding agent, and, if desired, an electrically conductive agent.

Examples of the binding agent include polytetrafluoroethylene, poly(vinylidene fluoride), a styrene-butadiene rubber (SBR) resin, or the like.

Examples of the electrically conductive agent include, for example, carbon materials such as acetylene black, Ketjen black, carbon fiber, or graphite (granular graphite and flaky graphite).

[Method of Manufacturing Electrodes (the Positive Electrode and the Negative Electrode)]

An electrode can be obtained, for example, by dispersing and kneading predetermined loading amounts of an active material, a binding agent, and, if desired, an electrically conductive agent into a solvent such as N-methyl-2-pyrrolidone (NMP) and water, and applying the resulting paste on a current collector, and drying to form an active-material layer. The resulting electrode is preferably compressed by a method such as roll press to adjust the electrode to a suitable density.

[(d) Separator]

The nonaqueous electrolytic solution battery according to the present invention includes the separator. As a separator for preventing contact between the positive electrode and the negative electrode, non-woven fabrics and porous sheets made of polyolefins such as polypropylene and polyethylene; cellulose; paper; or glass fiber; and the like. These films are preferably microporous so that penetration by an electrolytic solution can be facilitated for easy permeation of ions.

Polyolefin separators include, for example, lithium-ion permeable membranes capable of electrically insulating the positive electrode from the negative electrode, for example, microporous polymer films such as porous polyolefin films. Specific examples of porous polyolefin films include, for example, porous polyethylene films alone, or multilayer films in which a porous polyethylene film and a porous polypropylene film are layered. Examples also include composite films with a porous polyethylene film and a polypropylene film, and the like.

[Housing]

As a housing for nonaqueous electrolytic solution batteries which can be used when assembling the present nonaqueous electrolytic solution battery, for example, metal cans of a coin-type, a cylinder-type, a rectangle-type, and the like; and laminate housings can be used. Materials for metal cans include, for example, nickel-plated steel sheets, stainless steel sheets, nickel-plated stainless steel sheets, aluminum or an alloy thereof, nickel, titanium, and the like. As laminate housings, for example, laminate films such as an aluminum laminate film, a stainless steel laminate film, laminate films of silica-coated polypropylene and polyethylene can be used.

There is no particular limitation for the configuration of the nonaqueous electrolytic solution battery according to the present embodiment, but the configuration may be such that an electrode element having a positive electrode and a negative electrode arranged in a countering manner, and a nonaqueous electrolytic solution are included inside a housing. There is no particular limitation for the shape of the nonaqueous electrolytic solution battery, but a coin-like, cylindrical, rectangular, or aluminum laminate sheet-like electrochemical device may be assembled with the components described above.

EXAMPLES

Below, the present invention will be described in more detail with reference to Examples, but the present invention shall not be limited to these in any sense. It is noted that Examples with sub-numbers may be collectively denoted, for example, Examples 1-1 to 1-41 may be collectively referred to as Example 1. The same may apply to Example 2 and so on and Comparative Examples, and electrolytic solution Nos.

Below, the methods of synthesizing difluoro ionic complexes (cis/trans isomers) and tetrafluoro ionic complexes will be described. The methods disclosed in Patent Document 8, Nonpatent Document 1, and Patent Document 7 were used herein to synthesize ionic complexes. However, methods other than these may be used to synthesize them.

In any cases, raw materials and products were handled under a nitrogen atmosphere of a dew point of −50° C. or less. Further, a glass reactor used was dried at 150° C. for 12 hours or more, and then cooled to room temperature under a nitrogen stream of a dew point of −50° C. or less before use.

[Synthesis Example 1] Synthesis of (1a-Cis) and (1a-Trans)

Lithium tris(oxalato)phosphate as a three-coordinate complex of oxalic acid was obtained according to the method disclosed in Patent Document 7. Lithium tris(oxalato)phosphate (30 g, 99.4 mmol) was dissolved in dimethyl carbonate (hereinafter, referred to as DMC) (120 mL), and hydrogen fluoride (hereinafter, referred to as HF) (11.9 g, 596.4 mmol) was then added. After stirring at 25° C. for 48 hours, residual HF and DMC were removed under reduced pressure. Then, DMC (60 mL) was added, and the concentrated residue was dissolved as much as possible, and then concentrated until the concentration of an Li salt became about 45 mass %. After removing insoluble components including oxalic acid by filtration, 49 g of a DMC solution of a mixture of (1a-Cis) and (1a-Trans) was obtained. Dichloromethane (hereinafter, referred to as "$CH_2Cl_2$") was added to the DMC solution of the mixture at room temperature, and stirred for 12 hours to obtain a precipitated solid. The solid was separated from the mother liquor by filtration, and the mother liquor was distilled to remove DMC under reduced pressure until a solid was obtained. The filtered solid and the solid obtained from the mother liquor were separately dissolved in $CH_2Cl_2$ to separately prepare DMC solutions with a concentration of about 45 mass %, and $CH_2Cl_2$ was then added to allow a solid to precipitate. The solids were recovered separately by filtration, and the preparation of a DMC solution with a concentration of about 45 mass % and the precipitation of a solid were further repeated for several times by a similar procedure to obtain (1a-Cis) and (1a-Trans) with F and P purities of 99.9 mol % (as determined by NMR).

(1a-Cis) and (1a-Trans) were dissolved separately in acetonitrile, and subjected to LC/MS (the ESI method, polarity:negative, fragment voltage: 50 V) to measure molecular weight. A parent ion was observed at m/z 244.9 for both, which is consistent with a theoretical mass number of 244.93 (the anion moiety). Further, the steric conformation was determined by the single crystal X-ray structure analysis. FIG. 1 shows the analysis result of (1a-Cis). It has been confirmed that (1a-Cis) is in the cis configuration in which two fluorine atoms are bonded in the same side when viewed from the central element.

(1a-Cis) and (1a-Trans) clearly have the same atomic composition but different structures because they have the same mass, and F-NMR and P-NMR show their peaks at different positions. Further, (1a-Trans) was determined to be in the trans configuration in which two fluorine atoms are bonded in the opposite sides when viewed from the central element as determined by the single crystal X-ray structure analysis.

[Synthesis Example 2] Synthesis of (5a-Tetra)

Reactions were performed according to the method described in Patent Document 8. To a 500 mL glass flask, added were 20.0 g (132 mmol) of $LiPF_6$, 110 mL of dimethyl carbonate (DMC), and 11.9 g (132 mmol) of oxalic acid. At this point, $LiPF_6$ was completely dissolved, but the majority of oxalic acid remained unresolved. With stirring at 25° C., 13.4 g (79 mmol) of $SiCl_4$ was added dropwise to the flask, and stirring was then continued for 4 hours. Subsequently, tetrafluorosilane and hydrochloric acid were removed under reduced pressure to obtain a crude DMC solution containing the ionic complex (5a-Tetra) as the main component (a purity of 91 mol %). This solution was concentrated until the concentration of an Li salt became about 50 mass % to obtain 51 g of a concentrated liquid. After removing insoluble components by filtration, $CH_2Cl_2$ was added with stirring at room temperature. After stirring for 12 hours, a precipitated solid was recovered by filtration. Again, it was dissolved in DMC to prepare a DMC solution with an concentration of an Li-salt of about 50 mass %, and then the addition of $CH_2Cl_2$, precipitation of a solid, and recovery of a solid were performed by a similar procedure to obtain (5a-Tetra) with F and P purities of 99.9%.

[Synthesis Example 3] Synthesis of (1b-Cis) and (1b-Trans)

(1b-Cis) and (1b-Trans) were each obtained as in Synthesis Example 1 except that hexafluoro-2-hydroxyisobutyric acid was used as a raw material instead of oxalic acid.

[Synthesis Example 3] Synthesis of (6a-Cis) and (6a-Trans) as Na Adducts of (1a-Cis) and (1a-Trans)

A Dow Chemical strongly acidic cation exchange resin 252 (hereinafter, referred to as the ion exchange resin) was weighed out to give 500 g, and immersed in 0.1N aqueous sodium hydroxide (2.5 kg), and stirred at 25° C. for 6 hours. The ion exchange resin was collected by filtration, and washed thoroughly with pure water until the pH of a wash liquid became 8 or less. Then, water was removed by drying under reduced pressure for 12 hours (120° C., 1.3 kPa). The (1a-Cis)/EMC solution with a concentration of 10 mass % was prepared, to which the dried ion exchange resin in a weight corresponding to half of the weight of the liquid was added, and stirred at 25° C. for 6 hours. Then, the ion exchange resin was removed by filtration to obtain a (6a-Cis)/EMC solution (with a concentration of about 10 mass %) in which cations of $Li^+$ had been exchanged with $Na^+$. The ratio of $Na^+/Li^+$ was 99.5 when cations were quantified by ion chromatography. Further, the (6a-Trans)/EMC solution with a concentration of about 10 mass % was obtained as in the method described above except that the (1a-Trans)/EMC solution with the same concentration was substituted for the (1a-Cis)/EMC solution.

[Synthesis Example 5] Synthesis of (5b-Tetra) as an Na Adduct of (5a-Tetra)

A (5b-Tetra)/EMC solution with a concentration of about 10 mass % in which cations of $Li^+$ had been exchanged with $Na^+$ was obtained by substituting a (5a-Tetra)/EMC solution for the (1a-cis)/EMC solution used in Synthesis Example 4. The ratio of $Na^+/Li^+$ was 99.4 when cations were quantified by ion chromatography.

[Synthesis Example 6] Synthesis of (6b-Cis) and (6b-Trans) as K Adducts of (1a-Cis) and (1a-Trans)

(6b-Cis)/EMC and (6 b-Trans)/EMC solutions with a concentration of about 10 mass % in which cations of $Li^+$ had been exchanged with $K^+$ were obtained by substituting 0.1N aqueous potassium hydroxide (2.5 kg) for 0.1N aqueous sodium hydroxide (2.5 kg) used in Synthesis Example 4. The ratio of $K^+/L^i+$ was 99.6 for both solutions when cations were quantified by ion chromatography.

[Synthesis Example 7] Synthesis of (6c-Cis) and (6c-Trans) as TMPA Adducts of (1a-Cis) and (1a-Trans)

To 90 g of EMC, 5.7 g (41.7 mmol) of trimethylpropylammonium chloride and 10.0 g (39.7 mmol) of (1a-Cis) were added, and stirred at 45° C. for 6 hours. After cooled to 5° C., insoluble materials were removed by filtration to obtain a (6c-Cis)/EMC solution (with a concentration of about 13 mass %) in which cations of $Li^+$ had been exchanged with trimethylpropylammonium cations (hereinafter, referred to as TMPA). Further, the (6c-Trans)/EMC solution with a concentration of about 13 mass % was obtained as in the method described above except that (1a-Trans) in the same weight was substituted for (1a-Cis). The ratio of TMPA/Li$^+$ was 98.5 for both solutions when cations were quantified by ion chromatography.

[Synthesis Example 8] Synthesis of (6d-Cis) and (6d-Trans) as PP13 Adducts of (1a-Cis) and (1a-Trans)

To 90 g of EMC, 7.4 g (41.7 mmol) of 1-butyl-1-methylpyrrolidinium chloride and 10.0 g (39.7 mmol) of (1a-Cis) were added, and stirred at 45° C. for 6 hours. After cooled to 5° C., insoluble materials were removed by filtration to obtain a (6d-Cis)/EMC solution (with a concentration of about 15 mass %) in which cations of Li$^+$ had been exchanged with 1-butyl-1-methylpyrrolidinium cations (hereinafter, referred to as PP13). Further, the (6d-Trans)/EMC solution with a concentration of about 15 mass % was obtained as in the method described above except that (1a-Trans) in the same weight was substituted for (1a-Cis). The ratio of PP13/Li$^+$ was 98.3 for both solutions when cations were quantified by ion chromatography.

[Synthesis Example 9] Synthesis of (1c-Cis) and (1c-Trans)

(1c-Cis), which is (1-Cis) where the anion moiety is (1c) and A=Li, and (1c-Trans), which is (1-Trans) where the anion moiety is (Trans-c) and A=Li, were each obtained by applying the method described in Non-Patent Document 1.

[Preparation of Nonaqueous Electrolytic Solutions Nos. 1-1 to 1-41 and Comparative Electrolytic Solutions Nos. 1-1 to 1-6]

In a dry box under a nitrogen atmosphere of a dew point of −50° C. or less, LiPF$_6$ as an electrolyte was dissolved and prepared in a preheated and dissolved nonaqueous solvent of ethylene carbonate (EC) and ethylmethyl carbonate (EMC) (volume ratio 1:2) so that the concentration of LiPF$_6$ was 1 mol/liter, and then various ionic complex/EMC solutions according to the present invention and the group (II) compounds as described above were added in a predetermined amount to prepare the nonaqueous electrolytic solutions Nos. 1-1 to 1-41 according to the present invention and the comparative electrolytic solutions Nos. 1-1 to 1-6 shown in Table 1 below.

TABLE 1

| Electrolytic solution No. | Group (I) compound (Cis isomer) | Content (mass %) | Group (II) compound | Content (mass %) | Group (III) compound Trans isomer | Content (mass %) | Trans isomer/Cis isomer (mass ratio) | Group (IV) compound Tetrafluoro complex | Content (mass %) | Tetrafluoro complex/Cis isomer (mass ratio) |
|---|---|---|---|---|---|---|---|---|---|---|
| Electrolytic solution No. 1-1 | (1a-Cis) | 0.05 | (II-1-1) | 2.0 | — | — | — | — | — | — |
| Electrolytic solution No. 1-2 | | 0.1 | | 2.0 | — | — | — | — | — | — |
| Electrolytic solution No. 1-3 | | 0.8 | | 2.0 | — | — | — | — | — | — |
| Electrolytic solution No. 1-4 | | 1.0 | | 2.0 | — | — | — | — | — | — |
| Electrolytic solution No. 1-5 | | 3.0 | | 2.0 | — | — | — | — | — | — |
| Electrolytic solution No. 1-6 | | 5.0 | | 2.0 | — | — | — | — | — | — |
| Electrolytic solution No. 1-7 | (1a-Cis) | 1.0 | (II-1-1) | 0.05 | — | — | — | — | — | — |
| Electrolytic solution No. 1-8 | | 1.0 | | 0.1 | — | — | — | — | — | — |
| Electrolytic solution No. 1-9 | | 1.0 | | 0.5 | — | — | — | — | — | — |
| Electrolytic solution No. 1-10 | | 1.0 | | 3.0 | — | — | — | — | — | — |
| Electrolytic solution No. 1-11 | | 1.0 | | 5.0 | — | — | — | — | — | — |
| Electrolytic solution No. 1-12 | (1a-Cis) | 1.0 | (II-1-1) | 2.0 | (1a-Trans) | 0.002 | 0.002 | — | — | — |
| Electrolytic solution No. 1-13 | | 1.0 | | 2.0 | | 0.004 | 0.004 | — | — | — |
| Electrolytic solution No. 1-14 | | 1.0 | | 2.0 | | 0.01 | 0.01 | — | — | — |
| Electrolytic solution No. 1-15 | (1a-Cis) | 1.0 | (II-1-1) | 2.0 | — | — | — | (5a-Tetra) | 0.07 | 0.07 |
| Electrolytic solution No. 1-16 | | 1.0 | | 2.0 | — | — | — | | 0.14 | 0.14 |
| Electrolytic solution No. 1-17 | | 1.0 | | 2.0 | — | — | — | | 0.20 | 0.20 |
| Electrolytic solution No. 1-18 | (1a-Cis) | 0.5 | (II-1-1) | 0.2 | (1a-Trans) | 0.001 | 0.002 | (5a-Tetra) | 0.035 | 0.07 |
| Electrolytic solution No. 1-19 | | 0.5 | | 2.0 | | 0.0025 | 0.005 | | 0.06 | 0.12 |
| Electrolytic solution No. 1-20 | | 1.0 | | 0.2 | | 0.002 | 0.002 | | 0.07 | 0.07 |
| Electrolytic solution No. 1-21 | | 1.0 | | 2.0 | | 0.004 | 0.004 | | 0.14 | 0.14 |
| Electrolytic solution No. 1-22 | | 1.0 | | 3.0 | | 0.01 | 0.01 | | 0.20 | 0.20 |
| Electrolytic solution No. 1-23 | | 3.0 | | 2.0 | | 0.015 | 0.005 | | 0.36 | 0.12 |
| Electrolytic solution No. 1-24 | | 3.0 | | 2.0 | | 0.03 | 0.01 | | 0.60 | 0.20 |
| Electrolytic solution No. 1-25 | (1a-Cis) (1b-Cis) | 0.5 0.5 | (II-1-1) | 2.0 | (1a-Trans) | 0.004 | 0.004 | (5a-Tetra) | 0.14 | 0.14 |
| Electrolytic solution No. 1-26 | (1a-Cis) | 1.0 | (II-1-1) (II-2-1) | 1.0 1.0 | (1a-Trans) | 0.004 | 0.004 | (5a-Tetra) | 0.14 | 0.14 |
| Electrolytic solution No. 1-27 | (1a-Cis) | 1.0 | (II-1-1) | 2.0 | (1a-Trans) (1b-Trans) | 0.002 0.002 | 0.002 0.002 | (5a-Tetra) | 0.14 | 0.14 |
| Electrolytic solution No. 1-28 | (1a-Cis) | 1.0 | (II-1-1) | 2.0 | (1a-Trans) | 0.004 | 0.004 | (5a-Trans) (5b-Trans) | 0.07 0.07 | 0.07 0.07 |
| Electrolytic solution No. 1-29 | (1b-Cis) | 1.0 | (II-1-1) | 2.0 | (1a-Trans) | 0.004 | 0.004 | (5a-Tetra) | 0.14 | 0.14 |
| Electrolytic solution No. 1-30 | (1a-Cis) | 1.0 | | 2.0 | (1b-Trans) | 0.004 | 0.004 | (5a-Tetra) | 0.14 | 0.14 |
| Electrolytic solution No. 1-31 | (1a-Cis) | 1.0 | | 2.0 | (1a-Trans) | 0.004 | 0.004 | (5b-Tetra) | 0.14 | 0.14 |
| Electrolytic solution No. 1-32 | (6a-Cis) | 1.0 | (II-1-1) | 2.0 | (1a-Trans) | 0.004 | 0.004 | (5a-Tetra) | 0.14 | 0.14 |
| Electrolytic solution No. 1-33 | (6b-Cis) | 1.0 | | 2.0 | | 0.004 | 0.004 | | 0.14 | 0.14 |
| Electrolytic solution No. 1-34 | (6c-Cis) | 1.0 | | 2.0 | | 0.004 | 0.004 | | 0.14 | 0.14 |
| Electrolytic solution No. 1-35 | (6d-Cis) | 1.0 | | 2.0 | | 0.004 | 0.004 | | 0.14 | 0.14 |
| Electrolytic solution No. 1-36 | (1c-Cis) | 0.8 | | 2.0 | | 0.004 | 0.004 | | 0.14 | 0.14 |
| Electrolytic solution No. 1-37 | (1a-Cis) | 1.0 | (II-1-1) | 2.0 | (6a-Trans) | 0.004 | 0.004 | (5a-Tetra) | 0.14 | 0.14 |
| Electrolytic solution No. 1-38 | | 1.0 | | 2.0 | (6b-Trans) | 0.004 | 0.004 | | 0.14 | 0.14 |

TABLE 1-continued

| Electrolytic solution No, | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 1-39 | | 1.0 | | 2.0 | (6c-Trans) | 0.004 | 0.004 | | 0.14 | 0.14 |
| Electrolytic solution No. 1-40 | | 1.0 | | 2.0 | (6d-Trans) | 0.004 | 0.004 | | 0.14 | 0.14 |
| Electrolytic solution No. 1-41 | | 1.0 | | 2.0 | (1c-Trans) | 0.004 | 0.004 | | 0.14 | 0.14 |
| Comparative electrolytic solution No. 1-1 | — | — | — | — | — | — | — | — | — | — |
| Comparative electrolytic solution No. 1-2 | (1a-Cis) | 1.0 | — | — | — | — | — | — | — | — |
| Comparative electrolytic solution No. 1-3 | (1a-Cis) (1b-Cis) | 0.5 0.5 | — | — | — | — | — | — | — | — |
| Comparative electrolytic solution No. 1-4 | — | — | (II-1-1) | 2.0 | — | — | — | — | — | — |
| Comparative electrolytic solution No. 1-5 | — | — | (II-1-1) | 2.0 | (1a-Trans) | 1.0 | — | — | — | — |
| Comparative electrolytic solution No. 1-6 | — | — | (II-1-1) | 2.0 | (1a-Trans) | 1.0 | — | (5a-Tetra) | 0.14 | — |

<Production of NMC Positive Electrode>

A LiNi$_{1/3}$Mn$_{1/3}$Co$_{1/3}$O$_2$(NMC) powder as a positive-electrode active material was dry-mixed with acetylene black (electrically conductive agent), and then uniformly dispersed and mixed into the N-methyl-2-pyrrolidone (NMP) in which poly(vinylidene fluoride) (PVDF) was pre-dissolved, and NMP for adjusting the viscosity was further added to prepare an NMC mixture paste. The resulting paste was applied to an aluminum foil (current collector), dried, and pressurized. Then the aluminum foil was processed into a predetermined size to obtain a test NMC positive electrode. The ratio of solid contents in the positive electrode was NMC:electrically conductive agent:PVDF=85:5:10 (by the mass ratio).

<Production of Graphite Negative Electrode>

A graphite powder as a negative-electrode active material was uniformly dispersed and mixed into NMP in which PVDF as a binding agent was pre-dissolved, and NMP for adjusting the viscosity was further added to prepare a graphite mixture paste. The above paste was applied to a copper foil (current collector), dried, and pressurized. Then the copper foil was processed into a predetermined size to obtain a test graphite negative electrode. The ratio of solid contents in the negative electrode was graphite powder:PVDF=90:10 (by the mass ratio).

<Production of Nonaqueous Electrolytic Solution Batteries>

Aluminum laminate housing cells (with a capacity of 30 mAh) including the above test NMC positive electrode, the above test graphite negative electrode, and a cellulose separator were respectively impregnated with one of the nonaqueous electrolytic solutions Nos. 1-1 to 1-41 and the comparative electrolytic solutions Nos. 1-1 to 1-6 to obtain the nonaqueous electrolytic solution batteries according to Examples 1-1 to 1-41 and Comparative Examples 1-1 to 1-6.

Example 1, Comparative Example 1: Evaluation of Test Cells

<Evaluation 1> Low-Temperature Property (0° C.) after 500 Cycles at 60° C.

Each of the nonaqueous electrolytic solution batteries according to Examples 1-1 to 1-41 and Comparative Examples 1-1 to 1-6 was evaluated as described below.

First, the resulting cells were subjected to conditioning at an environmental temperature of 25° C. under the following conditions. That is, as the initial charge/discharge, constant-current and constant-voltage charge was performed at a 0.1 C rate (3 mA) to a charge upper limit voltage of 4.3 V, and then discharge was performed at a constant current of a 0.2 C rate (6 mA) to a discharge cutoff voltage of 3.0 V. Subsequently, a charge-discharge cycle was repeated 3 times as described below: constant-current and constant-voltage charge was performed at a 0.2 C rate (6 mA) to a charge upper limit voltage of 4.3 V, and then discharge was performed at a constant current of a 0.2 C rate (6 mA) to a discharge cutoff voltage of 3.0 V.

After this conditioning, charge and discharge tests were performed at an environmental temperature of 60° C. The following charge-discharge cycle was repeated for 500 times: constant-current and constant-voltage charge was performed at a 3 C rate (90 mA) to a charge upper limit voltage of 4.3 V, and discharge was performed at a constant current of a 3 C rate (90 mA) to a discharge cutoff voltage of 3.0 V.

Next, the nonaqueous electrolytic solution batteries were cooled to 25° C., and again discharged to 3.0 V. Then constant-current and constant-voltage charge was performed to 4.3 V at a 0.2 C rate at 0° C. Further, discharge was performed at a constant current of a 5 C rate (150 mA) to a discharge cutoff voltage of 3.0 V while maintaining the temperature at 0° C., and the capacity obtained at that time was taken as the low-temperature property (0° C.) after prolonged cycles at 60° C.

<Evaluation 2> 5 C-Rate Characteristics after 500 Cycles at 60° C.

After performing 500 cycles at an environmental temperature of 60° C. in Evaluation 1 as described above, the nonaqueous electrolytic solution batteries were cooled to 25° C., and then again discharged to 3.0 V. Then constant-current and constant-voltage charge was performed to 4.3 V at a 5 C rate at 25° C. Further, discharge was performed at a constant current of a 5 C rate (150 mA) to a discharge cutoff voltage of 3.0 V while maintaining the temperature at 25° C., and the capacity obtained at that time was taken as the 5 C-rate characteristic (25° C.) after prolonged cycles at 60° C.

<Evaluation 3> Low-Temperature Property (0° C.) after Stored at 60° C.

Each of the nonaqueous electrolytic solution batteries according to Examples 1-1 to 1-41 and Comparative Examples 1-1 to 1-6 was subjected to storage tests (stored for 10 days after charged to 4.3 V) at an environmental temperature of 60° C.

Next, the nonaqueous electrolytic solution batteries were cooled to 25° C., and again discharged to 3.0 V. Then constant-current and constant-voltage charge was performed to 4.3 V at a 0.2 C rate at 0° C. Further, discharge was performed at a constant current of a 5 C rate (150 mA) to a discharge cutoff voltage of 3.0 V while maintaining the temperature at 0° C., and the capacity obtained at that time was taken as the low-temperature property (0° C.) after stored at 60° C.

The evaluation results according to each of Examples 1-1 to 1-41 and Comparative Examples 1-2 to 1-6 are shown in Table 2 as relative values when the evaluation results according to Comparative Example 1-1 are taken as 100.

TABLE 2

(Positive electrode; NMC Negative electrode; Graphite)

|  | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 1-1 | Electrolytic solution No. 1-1 | 130.2 | 138.8 | 111.4 |
| Example 1-2 | Electrolytic solution No. 1-2 | 133.9 | 143.6 | 115.3 |
| Example 1-3 | Electrolytic solution No. 1-3 | 136.2 | 146.9 | 118.3 |
| Example 1-4 | Electrolytic solution No. 1-4 | 137.8 | 148.7 | 118.7 |
| Example 1-5 | Electrolytic solution No. 1-5 | 136.9 | 147.3 | 117.9 |
| Example 1-6 | Electrolytic solution No. 1-6 | 131.2 | 137.3 | 111.2 |
| Example 1-7 | Electrolytic solution No. 1-7 | 132.3 | 138.5 | 111.7 |
| Example 1-8 | Electrolytic solution No. 1-8 | 135.2 | 147.7 | 112.6 |
| Example 1-9 | Electrolytic solution No. 1-9 | 136.9 | 148.6 | 118.6 |
| Example 1-10 | Electrolytic solution No. 1-10 | 136.8 | 147.2 | 117.9 |
| Example 1-11 | Electrolytic solution No. 1-11 | 132.4 | 138.3 | 111.0 |
| Example 1-12 | Electrolytic solution No. 1-12 | 138.1 | 149.3 | 119.2 |
| Example 1-13 | Electrolytic solution No. 1-13 | 139.8 | 150.0 | 119.5 |
| Example 1-14 | Electrolytic solution No. 1-14 | 141.2 | 149.0 | 119.6 |
| Example 1-15 | Electrolytic solution No. 1-15 | 138.9 | 148.8 | 119.4 |
| Example 1-16 | Electrolytic solution No. 1-16 | 139.9 | 149.5 | 119.7 |
| Example 1-17 | Electrolytic solution No. 1-17 | 140.2 | 149.2 | 120.2 |
| Example 1-18 | Electrolytic solution No. 1-18 | 130.3 | 145.2 | 118.2 |
| Example 1-19 | Electrolytic solution No. 1-19 | 136.3 | 147.0 | 118.5 |
| Example 1-20 | Electrolytic solution No. 1-20 | 137.1 | 147.4 | 118.8 |
| Example 1-21 | Electrolytic solution No. 1-21 | 141.3 | 151.6 | 120.2 |
| Example 1-22 | Electrolytic solution No. 1-22 | 137.1 | 148.7 | 119.2 |
| Example 1-23 | Electrolytic solution No. 1-23 | 136.9 | 147.7 | 118.5 |
| Example 1-24 | Electrolytic solution No. 1-24 | 131.9 | 143.0 | 113.9 |
| Example 1-25 | Electrolytic solution No. 1-25 | 140.3 | 151.5 | 119.6 |
| Example 1-26 | Electrolytic solution No. 1-26 | 139.8 | 150.7 | 120.0 |
| Example 1-27 | Electrolytic solution No. 1-27 | 140.9 | 152.1 | 120.1 |
| Example 1-28 | Electrolytic solution No. 1-28 | 140.0 | 151.8 | 119.2 |
| Example 1-29 | Electrolytic solution No. 1-29 | 139.9 | 150.4 | 119.1 |
| Example 1-30 | Electrolytic solution No. 1-30 | 139.9 | 150.7 | 119.5 |
| Example 1-31 | Electrolytic solution No. 1-31 | 140.4 | 150.5 | 118.5 |
| Example 1-32 | Electrolytic solution No. 1-32 | 140.3 | 149.6 | 118.8 |
| Example 1-33 | Electrolytic solution No. 1-33 | 139.5 | 149.9 | 118.6 |
| Example 1-34 | Electrolytic solution No. 1-34 | 139.2 | 148.9 | 118.4 |
| Example 1-35 | Electrolytic solution No. 1-35 | 139.2 | 149.0 | 117.4 |
| Example 1-36 | Electrolytic solution No. 1-36 | 139.5 | 149.9 | 118.8 |
| Example 1-37 | Electrolytic solution No. 1-37 | 139.5 | 149.9 | 118.6 |
| Example 1-38 | Electrolytic solution No. 1-38 | 139.2 | 149.7 | 118.3 |
| Example 1-39 | Electrolytic solution No. 1-39 | 138.9 | 148.1 | 117.7 |
| Example 1-40 | Electrolytic solution No. 1-40 | 138.7 | 148.7 | 116.9 |
| Example 1-41 | Electrolytic solution No. 1-41 | 139.1 | 149.5 | 118.4 |
| Comparative Example 1-1 | Comparative electrolytic solution No. 1-1 | 100.0 | 100.0 | 100.0 |
| Comparative Example 1-2 | Comparative electrolytic solution No. 1-2 | 128.3 | 136.1 | 109.7 |
| Comparative Example 1-3 | Comparative electrolytic solution No. 1-3 | 127.8 | 134.3 | 103.3 |
| Comparative Example 1-4 | Comparative electrolytic solution No. 1-4 | 122.6 | 129.4 | 103.2 |
| Comparative Example 1-5 | Comparative electrolytic solution No. 1-5 | 128.4 | 133.8 | 110.3 |
| Comparative Example 1-6 | Comparative electrolytic solution No. 1-6 | 129.3 | 134.5 | 110.8 |

Regarding Examples 1-1 to 1-11

As seen from the results in Tables 1 and 2, the nonaqueous electrolytic solution batteries including the difluoro ionic complex (1a-Cis) in the cis configuration from Synthesis Example 1 according to Example and the salt having an imide anion (II-1-1) showed a higher discharge capacity (0° C.) after prolonged cycles at 60° C. and a higher 5 C-rate characteristic after prolonged cycles at 60° C. as compared with the nonaqueous electrolytic solution battery including neither (1a-Cis) nor (II-1-1) (Comparative Example 1-1).

Comparison of Example 1-4 with Comparative Example 1-2 revealed that the nonaqueous electrolytic solution battery including both (1a-Cis) and (II-1-1) showed higher effects than the nonaqueous electrolytic solution battery including (1a-Cis) only.

This can be explained as follows. When the difluoro ionic complex (1a-Cis) of the nonaqueous electrolytic solution according to the present invention and a salt having an imide anion such as (II-1-1) are included, these additives are reductively decomposed on a negative electrode in the order of the difluoro ionic complex (1a-Cis) and then the salt having an imide anion (II-1-1) during charge at the first cycle to form a stable film (SEI) on the surface of the negative electrode. That is, the above reaction film layer having a high ion conductivity and the SEI having long-term stability and covering the surface of the negative electrode can prevent side reactions such as decomposition of a solvent which otherwise occur on the surface of the negative electrode. This, in turn, can reduce the initial irreversible capacity of the nonaqueous electrolytic solution battery, and also improve long-term durability and output characteristics.

These appear to reflect significantly improved properties such as the discharge capacity (0° C.) after prolonged cycles at 60° C. and the 5 C-rate characteristic (25° C.) as shown in Table 2, which supports that the present novel combination of the difluoro ionic complex (1a-Cis) and a salt having an imide anion such as (II-1-1) can provide unprecedented effects for improving performance.

Comparisons of Examples 1-1 to 1-6 revealed that the effects of the difluoro ionic complex (1a-Cis) were able to be slightly observed even when the content was 0.05 mass %, and were increased as the content of the ionic complex increased from 0.05 mass % to 0.1, 0.8, and 1.0 mass %. On the other hand, when the content of the difluoro ionic complex (1a-Cis) was 3.0 mass % (Example 1-5), the effects were slightly decreased as compared with the case where the content was 1.0 mass % (Example 1-4). In the case of 5.0 mass % (Example 1-6), the effects were significantly decreased as compared with the case of 1.0 mass %. This may be assumed as follows. The viscosity of a nonaqueous electrolytic solution is increased when the content of the difluoro ionic complex (1a-Cis) reaches 3 mass % or more. This may restrict movement of cations within a nonaqueous electrolytic solution battery, resulting in decreased battery performance.

Comparisons of Examples 1-4 and 1-7 to 1-11 revealed that the effects of the salt having an imide anion (II-1-1) were able to be slightly observed even when the content was 0.05 mass %, and were increased as the content of (II-1-1) increased from 0.05 mass % to 0.1, 0.5, and 1.0 mass %. On the other hand, when the content of the (II-1-1) was 3.0 mass % (Example 1-10), the effects were slightly decreased as compared with the case where the content was 2.0 mass % (Example 1-4). In the case of 5.0 mass % (Example 1-11), the effects were significantly decreased as compared with the case of 1.0 mass %.

Further, comparison of Example 1-4 with Comparative Example 1-5 revealed that the nonaqueous electrolytic solution battery including the difluoro ionic complex (1a-Cis) in the cis configuration from Example 1-4 and the salt having an imide anion (II-1-1) improved not only the discharge capacity (0° C.) after prolonged cycles at 60° C. but also the discharge capacity (0° C.) after stored at 60° C. as compared with the nonaqueous electrolytic solution battery including the difluoro ionic complex (1a-Trans) in the trans configuration from Comparative Example 1-5 and the salt having an imide anion (II-1-1). This is inferred to be a result that the different rates of the reductive decomposition reaction between (1a-Cis) in the cis configuration and (1a-Trans) in the trans configuration may alter the selectivity of the reductive decomposition reaction (the presence or absence of solvent decomposition), resulting in different main components in SEIs formed therefrom, which is likely responsible for the difference in the effects of SEIs for improving the battery performance in the end.

Regarding Examples 1-12 to 1-14

Examples 1-12 to 1-14 where nonaqueous electrolytic solutions contain 3 types of compounds: the difluoro ionic complex (1a-Cis) in the cis configuration, the difluoro ionic complex (1a-Trans) in the trans configuration according to Synthesis Example 1, and the salt having an imide anion (II-1-1) were found to have a tendency for further increasing the discharge capacity (0° C.) after stored at 60° C. without decreasing the discharge capacity (0° C.) after prolonged cycles at 60° C. as compared with the nonaqueous electrolytic solution battery (Example 1-4) including the above (1a-Cis) and (II-1-1).

Further, as the ratio of the difluoro ionic complex (1a-Trans) in the trans configuration to the difluoro ionic complex (1a-Cis) in the cis configuration, i.e., difluoro ionic complex (1-Trans)/difluoro ionic complex (1-Cis) (by the mass ratio) increased from 0.002 to 0.004 and 0.01, the discharge capacity (0° C.) after stored at 60° C. was found to show a moderate improving tendency without impairing the discharge capacity (0° C.) after prolonged cycles at 60° C.

Regarding Examples 1-15 to 1-17

Moreover, Examples 1-15 to 1-17 where the nonaqueous electrolytic solutions contain 3 types of compounds: the difluoro ionic complex (1a-Cis), the salt having an imide anion (II-1-1), and the tetrafluoro ionic complex (5a-Tetra) were found to have a tendency for further improving the discharge capacity (0° C.) after stored at 60° C. without decreasing the discharge capacity (0° C.) after prolonged cycles at 60° C. and the 5 C-rate characteristic (25° C.) as compared with the nonaqueous electrolytic solution battery (Example 1-4) including (1a-Cis) and the salt having an imide anion (II-1-1)

Further, comparison of Example 1-16 with Comparative Example 1-6 revealed that the nonaqueous electrolytic solution battery including 3 types of compounds: (1a-Cis), (II-1-1), and (5a-Tetra) showed higher effects as compared with the nonaqueous electrolytic solution battery including (1a-Trans), (II-1-1), and (5a-Tetra).

Further, as the ratio of the tetrafluoro ionic complex (5a-Tetra) to the difluoro ionic complex (1a-Cis) in the cis configuration, i.e., tetrafluoro ionic complex (5a-Tetra)/difluoro ionic complex (1-Cis) (by the mass ratio) increased from 0.07 to 0.14 and 0.20, the discharge capacity (0° C.) after stored at 60° C. was found to show an improving tendency without impairing the discharge capacity (0° C.) after prolonged cycles at 60° C.

Regarding Examples 1-18 to 1-24

Further, as shown in Examples 1-18 to 1-24, the nonaqueous electrolytic solutions containing a compound(s) selected from the four groups of the difluoro ionic complex (1a-Cis) in the cis configuration from Synthesis Example 1, the salt having an imide anion (II-1-1), the difluoro ionic complex (1a-Trans) in the trans configuration from Synthesis Example 1, and the tetrafluoro ionic complex (5a-Tetra)

from Synthesis Example 2 were found to have a tendency for improving the discharge capacity (0° C.) after prolonged cycles at 60° C., the 5 C-rate characteristic (25° C.), and the discharge capacity (0° C.) after stored at 60° C. as compared with the nonaqueous electrolytic solutions which did not contain the tetrafluoro ionic complex (5a-Tetra) (Examples 1-12 to 1-14) and the nonaqueous electrolytic solutions which did not contain the difluoro ionic complex (1a-Trans) in the trans configuration (Examples 1-15 to 1-17) (For example, from comparisons of Examples 1-13 and 1-16 with Example 1-21 where the contents of the group (I) compound and the group (II) compound were similar between the corresponding Examples).

Regarding Examples 1-25 to 1-31

Similarly to the above, the low-temperature property (0° C.) after prolonged cycles at 60° C., the 5 C-rate characteristic (25° C.) after prolonged cycles at 60° C., and the low-temperature property (0° C.) after stored at 60° C. were shown to be excellent also in Examples 1-25 to 1-31, which used the difluoro ionic complex (1b-Cis) in the cis configuration from Synthesis Example 3 as the group (I) compound, combined and used the salt having an imide anion (II-2-1) as the group (II) compound, used the difluoro ionic complex (1b-Trans) in the trans configuration from Synthesis Example 3 as the group (III) compound, and/or used the tetrafluoro ionic complex (5b-Tetra) from Synthesis Example 5 as the group (IV) compound.

Regarding Examples 1-32 to 1-41

In contrast, as shown in Examples 1-21, 32, and 33, comparisons of the ionic complexes (1a-Cis), (6a-Cis), and (6b-Cis) having Li$^+$, Na$^+$, and K$^+$ as cations, respectively, showed no difference in their effects, and a high discharge capacity (0° C.) after cycles was able to be obtained for all. Similarly, comparisons of the ionic complexes (1a-Cis), (6c-Cis), and (6d-Cis) having Li$^+$, TMPA, and PP13 as cations, respectively, revealed that Li$^+$ showed the best results although TMPA and PP13 showed some effects (Example 1-21 was compared with Examples 1-34, 1-35). This may be because the content of anion sides as the effective moieties was decreased due to the large molecular weights of the cations of TMPA and PP13, and because some of TMPA and PP13 were reductively or oxidatively decomposed, and decomposition residues were deposited as highly resistive materials on the surface of an electrode.

As shown in Example 1-36, (1c-Cis) in which the central element of P was replaced with Si had a low solubility, and was not sufficiently dissolved at 1.0 mass %, but showed relatively good effects when added at 0.8 mass %. Moreover, as shown in Examples 1-37 to 1-41, addition of the difluoro ionic complexes (6a-Trans, 6b-Trans, 6c-Trans, and 6d-Trans) in the trans configuration having different cation species and the difluoro ionic complex (1c-Trans) in the trans configuration in which the central element of P was replaced with Si can similarly provide a higher discharge capacity (0° C.) after prolonged cycles at 60° C. and a higher 5 C-rate characteristic after prolonged cycles at 60° C. as compared with Comparative Example 1-1.

[Preparation of Nonaqueous Electrolytic Solutions According to the Present Invention:Nos. 2 to 11]

The nonaqueous electrolytic solutions Nos. 2 to 11 according to the present invention were prepared in a similar way as in the nonaqueous electrolytic solution No. 1-1.

That is, in a dry box under a nitrogen atmosphere of a dew point of −50° C. or less, LiPF$_6$ as an electrolyte was dissolved and prepared in a preheated and dissolved non-aqueous solvent of ethylene carbonate (EC) and ethylmethyl carbonate (EMC) (volume ratio 1:2) so that the concentration of LiPF$_6$ was 1 mol/liter, and then various ionic complex/EMC solutions according to the present invention and the group (II) compounds as described above were added in a predetermined amount or were not added to prepare a variety of the nonaqueous electrolytic solutions and the comparative electrolytic solutions shown in Tables 3, 5, 6, 9, 10, 13, 14, 17, 19, and 21.

Examples 2 to 11 and Comparative Examples 1 to 11:Production and Evaluation of Nonaqueous Electrolytic Solution Batteries Aluminum laminate housing cells (with a capacity of 30 mAh) including the test NMC positive electrode, the test graphite negative electrode, and a cellulose separator were respectively impregnated with a variety of the nonaqueous electrolytic solutions and the comparative electrolytic solutions shown in Tables 3, 5, 6, 9, 10, 13, 14, 17, 19, and 21 in a similar procedure as in the nonaqueous electrolytic solution batteries according to Examples 1-1 to 1-41 to produce the nonaqueous electrolytic solution batteries according to Examples and Comparative Examples shown in Tables 4, 7, 8, 11, 12, 15, 16, 18, 20, and 22. Each of these nonaqueous electrolytic solution electrolytic solution batteries was subjected to the following evaluations as described above as in Example 1-1.
<Evaluation 1> Low-temperature property (0° C.) after 500 cycles at 60° C.
<Evaluation 2> 5 C-rate characteristic after 500 cycles at 60° C.
<Evaluation 3> Low-temperature property (0° C.) after stored at 60° C.

Various evaluations of the nonaqueous electrolytic solution batteries are shown in Tables 4, 7, 8, 11, 12, 15, 16, and 18 as relative values when the corresponding evaluation results of the nonaqueous electrolytic solution battery according to Comparative Example 1-1 are taken as 100.

TABLE 3

| Electrolytic solution No. | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 2-1 | (1a-Cis) | 0.05 | (II-2-1) | 1.0 | — | — | — | — | — | — |
| Electrolytic solution No. 2-2 | | 0.1 | | 1.0 | — | — | — | — | — | — |
| Electrolytic solution No. 2-3 | | 0.8 | | 1.0 | — | — | — | — | — | — |
| Electrolytic solution No. 2-4 | | 1.0 | | 1.0 | — | — | — | — | — | — |
| Electrolytic solution No. 2-5 | | 3.0 | | 1.0 | — | — | — | — | — | — |

TABLE 3-continued

| Electrolytic solution No, | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 2-6 | | 5.0 | | 1.0 | — | — | — | — | — | — |
| Electrolytic solution No. 2-7 | (1a-Cis) | 1.0 | (II-2-1) | 0.05 | — | — | — | — | — | — |
| Electrolytic solution No. 2-8 | | 1.0 | | 0.1 | — | — | — | — | — | — |
| Electrolytic solution No. 2-9 | | 1.0 | | 0.5 | — | — | — | — | — | — |
| Electrolytic solution No. 2-10 | | 1.0 | | 2.0 | — | — | — | — | — | — |
| Electrolytic solution No. 2-11 | | 1.0 | | 5.0 | — | — | — | — | — | — |
| Electrolytic solution No. 2-12 | (1a-Cis) | 1.0 | (II-2-1) | 1.0 | (1a-Trans) | 0.002 | 0.002 | — | — | — |
| Electrolytic solution No. 2-13 | | 1.0 | | 1.0 | | 0.004 | 0.004 | — | — | — |
| Electrolytic solution No. 2-14 | | 1.0 | | 1.0 | | 0.01 | 0.01 | — | — | — |
| Electrolytic solution No. 2-15 | (1a-Cis) | 1.0 | (II-2-1) | 1.0 | — | — | — | (5a-Tetra) | 0.07 | 0.07 |
| Electrolytic solution No. 2-16 | | 1.0 | | 1.0 | — | — | — | | 0.14 | 0.14 |
| Electrolytic solution No. 2-17 | | 1.0 | | 1.0 | — | — | — | | 0.20 | 0.20 |
| Electrolytic solution No. 2-18 | (1a-Cis) | 0.5 | (II-2-1) | 0.2 | (1a-Trans) | 0.001 | 0.002 | (5a-Tetra) | 0.035 | 0.07 |
| Electrolytic solution No. 2-19 | | 0.5 | | 1.0 | | 0.0025 | 0.005 | | 0.06 | 0.12 |
| Electrolytic solution No. 2-20 | | 1.0 | | 0.2 | | 0.002 | 0.002 | | 0.07 | 0.07 |
| Electrolytic solution No. 2-21 | | 1.0 | | 1.0 | | 0.004 | 0.004 | | 0.14 | 0.14 |
| Electrolytic solution No. 2-22 | | 1.0 | | 3.0 | | 0.01 | 0.01 | | 0.20 | 0.20 |
| Electrolytic solution No. 2-23 | | 3.0 | | 1.0 | | 0.015 | 0.005 | | 0.36 | 0.12 |
| Electrolytic solution No. 2-24 | | 3.0 | | 3.0 | | 0.03 | 0.01 | | 0.60 | 0.20 |
| Electrolytic solution No. 2-25 | (1a-Cis) (1b-Cis) | 0.5 0.5 | (II-2-1) | 1.0 | (1a-Trans) | 0.004 | 0.004 | (5a-Tetra) | 0.14 | 0.14 |
| Electrolytic solution No. 2-26 | (1a-Cis) | 1.0 | (II-2-1) (II-3-1) | 0.5 | (1a-Trans) | 0.004 | 0.004 | (5a-Tetra) | 0.14 | 0.14 |
| Electrolytic solution No. 2-27 | (1a-Cis) | 1.0 | (II-2-1) | 1.0 | (1a-Trans) (1b-Trans) | 0.002 0.002 | 0.002 0.002 | (5a-Tetra) | 0.14 | 0.14 |
| Electrolytic solution No. 2-28 | (1a-Cis) | 1.0 | (II-2-1) | 1.0 | (1a-Trans) | 0.004 | 0.004 | (5a-Trans) (5b-Trans) | 0.07 0.07 | 0.07 0.07 |
| Electrolytic solution No. 2-29 | (1b-Cis) | 1.0 | (II-2-1) | 1.0 | (1a-Trans) | 0.004 | 0.004 | (5a-Tetra) | 0.14 | 0.14 |
| Electrolytic solution No. 2-30 | (1a-Cis) | 1.0 | | 1.0 | (1b-Trans) | 0.004 | 0.004 | (5a-Tetra) | 0.14 | 0.14 |
| Electrolytic solution No. 2-31 | (1a-Cis) | 1.0 | | 1.0 | (1a-Trans) | 0.004 | 0.004 | (5b-Tetra) | 0.14 | 0.14 |
| Comparative electrolytic solution No. 2-1 | — | — | (II-2-1) | 1.0 | — | — | — | — | — | — |
| Comparative electrolytic solution No. 2-2 | — | — | (II-2-1) | 1.0 | (1a-Trans) | 1.0 | — | — | — | — |
| Comparative electrolytic solution No. 2-3 | — | — | (II-2-1) | 1.0 | (1a-Trans) | 1.0 | — | (5a-Tetra) | 0.14 | — |

TABLE 4

(Positive electrode; NMC Negative electrode; Graphite)

| | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 2-1 | Electrolytic solution No. 2-1 | 141.6 | 150.9 | 123.2 |
| Example 2-2 | Electrolytic solution No. 2-2 | 145.7 | 156.1 | 127.4 |
| Example 2-3 | Electrolytic solution No. 2-3 | 148.2 | 159.7 | 130.8 |
| Example 2-4 | Electrolytic solution No. 2-4 | 150.0 | 161.6 | 131.2 |
| Example 2-5 | Electrolytic solution No. 2-5 | 148.9 | 160.1 | 130.3 |
| Example 2-6 | Electrolytic solution No. 2-6 | 142.7 | 149.3 | 122.9 |
| Example 2-7 | Electrolytic solution No. 2-7 | 143.9 | 150.6 | 123.5 |
| Example 2-8 | Electrolytic solution No. 2-8 | 147.2 | 160.5 | 124.4 |
| Example 2-9 | Electrolytic solution No. 2-9 | 148.9 | 161.6 | 131.1 |
| Example 2-10 | Electrolytic solution No. 2-10 | 148.9 | 160.0 | 130.3 |
| Example 2-11 | Electrolytic solution No. 2-11 | 144.1 | 150.3 | 122.7 |
| Example 2-12 | Electrolytic solution No. 2-12 | 150.2 | 162.3 | 131.8 |
| Example 2-13 | Electrolytic solution No. 2-13 | 152.2 | 163.0 | 132.1 |
| Example 2-14 | Electrolytic solution No. 2-14 | 153.7 | 162.0 | 132.2 |
| Example 2-15 | Electrolytic solution No. 2-15 | 151.1 | 161.8 | 132.0 |
| Example 2-16 | Electrolytic solution No. 2-16 | 152.2 | 162.5 | 132.3 |
| Example 2-17 | Electrolytic solution No. 2-17 | 152.5 | 162.2 | 132.8 |
| Example 2-18 | Electrolytic solution No. 2-18 | 141.8 | 157.8 | 130.6 |
| Example 2-19 | Electrolytic solution No. 2-19 | 148.3 | 159.8 | 131.0 |
| Example 2-20 | Electrolytic solution No. 2-20 | 149.2 | 160.2 | 131.3 |
| Example 2-21 | Electrolytic solution No. 2-21 | 153.8 | 164.8 | 132.8 |
| Example 2-22 | Electrolytic solution No. 2-22 | 149.2 | 161.7 | 131.8 |
| Example 2-23 | Electrolytic solution No. 2-23 | 149.0 | 160.5 | 131.0 |
| Example 2-24 | Electrolytic solution No. 2-24 | 143.6 | 155.4 | 125.9 |

TABLE 4-continued (Positive electrode; NMC Negative electrode; Graphite)

| | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 2-25 | Electrolytic solution No. 2-25 | 152.6 | 164.7 | 132.2 |
| Example 2-26 | Electrolytic solution No. 2-26 | 152.2 | 163.8 | 132.6 |
| Example 2-27 | Electrolytic solution No. 2-27 | 153.3 | 165.4 | 132.8 |
| Example 2-28 | Electrolytic solution No. 2-28 | 152.3 | 164.9 | 131.8 |
| Example 2-29 | Electrolytic solution No. 2-29 | 152.2 | 163.5 | 131.6 |
| Example 2-30 | Electrolytic solution No. 2-30 | 152.2 | 163.8 | 132.1 |
| Example 2-31 | Electrolytic solution No. 2-31 | 152.8 | 163.6 | 131.0 |
| Comparative Example 2-1 | Comparative electrolytic solution No. 2-1 | 133.9 | 140.2 | 113.9 |
| Comparative Example 2-2 | Comparative electrolytic solution No. 2-2 | 139.5 | 145.5 | 122.1 |
| Comparative Example 2-3 | Comparative electrolytic solution No. 2-3 | 140.4 | 146.2 | 123.0 |

Regarding Examples 2-1 to 2-11

As seen from the results in Tables 3 to 4, the nonaqueous electrolytic solution batteries including the difluoro ionic complex (1a-Cis) in the cis configuration from Synthesis Example 1 according to Example and the salt having an imide anion (11-2-1) showed a higher discharge capacity (0° C.) after prolonged cycles at 60° C. and a higher 5 C-rate characteristic after prolonged cycles at 60° C. as compared with the nonaqueous electrolytic solution battery including neither the above ionic complex nor the salt having an imide anion (II-2-1) (Comparative Example 1-1).

Comparison of Example 2-4 with Comparative Example 1-2 or Example 2-1 revealed that the nonaqueous electrolytic solution battery including both (1a-Cis) and the salt having an imide anion (II-2-1) showed higher effects than the nonaqueous electrolytic solution battery including (1a-Cis) only or (II-2-1) only.

This can be explained as follows. When the difluoro ionic complex (1a-Cis) in the nonaqueous electrolytic solution according to the present invention and the salt having an imide anion (II-2-1) are included as in Examples 1-1 to 1-11 and Example 1-16 as described above, these additives are reductively decomposed in the order of (1a-Cis) and (II-2-1) on a negative electrode during charge at the first cycle to form a stable film (SEI) on the surface of the negative electrode.

Further, comparison of Example 2-4 with Comparative Example 2-2 and comparison of Example 2-16 with Comparative Example 2-3 revealed that the nonaqueous electrolytic solution battery including the difluoro ionic complex (1a-Cis) in the cis configuration and the salt having an imide anion (II-2-1) demonstrated better results as compared with the nonaqueous electrolytic solution battery including the difluoro ionic complex (1a-Trans) in the trans configuration and the salt having an imide anion (II-2-1).

Further, comparisons of Examples 2-1 to 2-11 revealed that the effects of the difluoro ionic complex (1a-Cis) and the salt having an imide anion (II-2-1) were able to be slightly observed even when the contents were each 0.05 mass %, and were increased as the content of the ionic complex increased from 0.05 mass % to 0.1, 0.5, and 1.0 mass %.

When the content of the difluoro ionic complex (1a-Cis) was 3.0 mass % (Example 2-5), the effects were slightly decreased as compared with the case where the content was 1.0 mass % (Example 2-4). In the case of 5.0 mass % (Example 2-6), the effects were significantly decreased as compared with the case of 1.0 mass %. This may be assumed as follows. Similarly to Examples 1-1 to 1-11 as described above, the viscosity of a nonaqueous electrolytic solution is increased when the content of the difluoro ionic complex (1a-Cis) reaches 3 mass % or more. This may restrict movement of cations within a nonaqueous electrolytic solution battery, resulting in decreased battery performance.

Regarding Examples 2-12 to 2-14

Examples 2-12 to 2-14 where the nonaqueous electrolytic solutions contained 3 types of compounds: the difluoro ionic complex (1a-Cis) in the cis configuration from Synthesis Example 1, the difluoro ionic complex (1a-Trans) in the trans configuration, and the salt having an imide anion (II-2-1) were found to have a tendency for further increasing the discharge capacity (0° C.) after stored at 60° C. without decreasing the discharging capacity (0° C.) after prolonged cycles at 60° C. as compared with the nonaqueous electrolytic solution battery (Example 2-4) including (1a-Cis) and (II-2-1)

Further, in the above, as the ratio of the difluoro ionic complex in the trans conformation (1a-Trans) to the difluoro ionic complex in the cis conformation (1a-Cis), i.e., difluoro ionic complex (1-Trans)/difluoro ionic complex (1-Cis) (by the mass ratio) increased from 0.002 to 0.004 and 0.01, the discharge capacity (0° C.) after stored at 60° C. was found to show a moderate improving tendency without impairing the discharge capacity (0° C.) after prolonged cycles at 60° C.

Regarding Examples 2-15 to 2-17

Moreover, Examples 2-15 to 2-17 where the nonaqueous electrolytic solutions contained 3 types of compounds: the difluoro ionic complex (1a-Cis) in the cis configuration, the salt having an imide anion (II-2-1), and the tetrafluoro ionic complex (5a-Tetra) were found to have a tendency for further improving the discharge capacity (0° C.) after stored at 60° C. without decreasing the discharge capacity (0° C.) after prolonged cycles at 60° C. and the 5 C-rate characteristic (25° C.) as compared with the nonaqueous electrolytic solution battery (Example 2-4) containing the difluoro ionic complex (1a-Cis) and (II-2-1).

Further, in the above, as the ratio of the tetrafluoro ionic complex (5a-Tetra) to the difluoro ionic complex (1a-Cis) in the cis configuration, i.e., tetrafluoro ionic complex (5a-

Tetra)/difluoro ionic complex (1-Cis) (by the mass ratio) increased from 0.07 to 0.14 and 0.20, the discharge capacity (0° C.) after stored at 60° C. was found to show an improving tendency without impairing the discharge capacity (0° C.) after prolonged cycles at 60° C.

Regarding Examples 2-18 to 2-24

Further, as shown in Examples 2-18 to 2-24, the nonaqueous electrolytic solutions containing a compound(s) selected from the four groups of the difluoro ionic complex (1a-Cis) in the cis configuration from Synthesis Example 1, the salt having an imide anion (II-2-1), the difluoro ionic complex (1a-Trans) in the trans conformation from Synthesis Example 1, and the tetrafluoro ionic complex (5a-Tetra) from Synthesis Example 2 were found to have a tendency for improving the discharge capacity (0° C.) after prolonged cycles at 60° C., the 5 C-rate characteristic (25° C.), and the discharge capacity (0° C.) after stored at 60° C. as compared with the nonaqueous electrolytic solutions which did not contain the tetrafluoro ionic complex (5a-Tetra) (Examples 2-12 to 2-14) and the nonaqueous electrolytic solutions which did not contain the difluoro ionic complex (1a-Trans) in the trans configuration (Examples 2-15 to 2-17) (For example, from comparisons of Examples 2-13 and 16 with Example 2-21 where the contents of the group (I) compound and the group (II) compound were similar between the corresponding Examples).

Regarding Examples 2-25 to 2-31

Similarly to the above, the low-temperature property (0° C.) after prolonged cycles at 60° C., the 5 C-rate characteristic (25° C.) after prolonged cycles at 60° C., and the low-temperature property (0° C.) after stored at 60° C. were shown to be excellent also in Examples 2-25 to 2-31, which used the difluoro ionic complex (1b-Cis) in the cis configuration from Synthesis Example 3 as the group (I) compound, combined and used the salt having an imide anion (1-3-1) as the group (II) compound, used the difluoro ionic complex (1b-Trans) in the trans configuration from Synthesis Example 3 as the group (III) compound, and/or used the tetrafluoro ionic complex (5b-Tetra) from Synthesis Example 5 as the group (IV) compound.

TABLE 5

| Electrolytic solution No, | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 3-1 | (1a-Cis) | 0.05 | (II-3-1) | 3.0 | — | — | — | — | — | — |
| Electrolytic solution No. 3-2 |  | 0.1 |  | 3.0 | — | — | — | — | — | — |
| Electrolytic solution No. 3-3 |  | 0.8 |  | 3.0 | — | — | — | — | — | — |
| Electrolytic solution No. 3-4 |  | 1.0 |  | 3.0 | — | — | — | — | — | — |
| Electrolytic solution No. 3-5 |  | 3.0 |  | 3.0 | — | — | — | — | — | — |
| Electrolytic solution No. 3-6 |  | 5.0 |  | 3.0 | — | — | — | — | — | — |
| Electrolytic solution No. 3-7 | (1a-Cis) | 1.0 | (II-3-1) | 0.05 | — | — | — | — | — | — |
| Electrolytic solution No. 3-8 |  | 1.0 |  | 0.1 | — | — | — | — | — | — |
| Electrolytic solution No. 3-9 |  | 1.0 |  | 0.5 | — | — | — | — | — | — |
| Electrolytic solution No. 3-10 |  | 1.0 |  | 2.0 | — | — | — | — | — | — |
| Electrolytic solution No. 3-11 |  | 1.0 |  | 5.0 | — | — | — | — | — | — |
| Electrolytic solution No. 3-12 | (1a-Cis) | 1.0 | (II-3-1) | 3.0 | (1a-Trans) | 0.002 | 0.002 | — | — | — |
| Electrolytic solution No. 3-13 |  | 1.0 |  | 3.0 |  | 0.004 | 0.004 | — | — | — |
| Electrolytic solution No. 3-14 |  | 1.0 |  | 3.0 |  | 0.01 | 0.01 | — | — | — |
| Electrolytic solution No. 3-15 | (1a-Cis) | 1.0 | (II-3-1) | 3.0 | — | — | — | (5a-Tetra) | 0.07 | 0.07 |
| Electrolytic solution No. 3-16 |  | 1.0 |  | 3.0 | — | — | — |  | 0.14 | 0.14 |
| Electrolytic solution No. 3-17 |  | 1.0 |  | 3.0 | — | — | — |  | 0.20 | 0.20 |
| Electrolytic solution No. 3-18 | (1a-Cis) | 0.5 | (II-3-1) | 1.0 | (1a-Trans) | 0.001 | 0.002 | (5a-Tetra) | 0.035 | 0.07 |
| Electrolytic solution No. 3-19 |  | 0.5 |  | 3.0 |  | 0.0025 | 0.005 |  | 0.06 | 0.12 |
| Electrolytic solution No. 3-20 |  | 1.0 |  | 1.0 |  | 0.002 | 0.002 |  | 0.07 | 0.07 |
| Electrolytic solution No. 3-21 |  | 1.0 |  | 3.0 |  | 0.004 | 0.004 |  | 0.14 | 0.14 |
| Electrolytic solution No. 3-22 |  | 1.0 |  | 1.0 |  | 0.01 | 0.01 |  | 0.20 | 0.20 |
| Electrolytic solution No. 3-23 |  | 3.0 |  | 5.0 |  | 0.015 | 0.005 |  | 0.36 | 0.12 |
| Electrolytic solution No. 3-24 |  | 3.0 |  | 10.0 |  | 0.03 | 0.01 |  | 0.60 | 0.20 |
| Electrolytic solution No. 3-25 | (1a-Cis) (1b-Cis) | 0.5 0.5 | (II-3-1) | 3.0 | (1a-Trans) | 0.004 | 0.004 | (5a-Tetra) | 0.14 | 0.14 |
| Electrolytic solution No. 3-26 | (1a-Cis) | 1.0 | (II-3-1) (II-1-1) | 1.5 1.5 | (1a-Trans) | 0.004 | 0.004 | (5a-Tetra) | 0.14 | 0.14 |
| Electrolytic solution No. 3-27 | (1a-Cis) | 1.0 | (II-3-1) | 3.0 | (1a-Trans) (1b-Trans) | 0.002 0.002 | 0.002 0.002 | (5a-Tetra) | 0.14 | 0.14 |
| Electrolytic solution No. 3-28 | (1a-Cis) | 1.0 | (II-3-1) | 3.0 | (1a-Trans) | 0.004 | 0.004 | (5a-Trans) (5b-Trans) | 0.07 0.07 | 0.07 0.07 |
| Electrolytic solution No. 3-29 | (1b-Cis) | 1.0 | (II-3-1) | 3.0 | (1a-Trans) | 0.004 | 0.004 | (5a-Tetra) | 0.14 | 0.14 |
| Electrolytic solution No. 3-30 | (1a-Cis) | 1.0 |  | 3.0 | (1b-Trans) | 0.004 | 0.004 | (5a-Tetra) | 0.14 | 0.14 |
| Electrolytic solution No. 3-31 | (1a-Cis) | 1.0 |  | 3.0 | (1a-Trans) | 0.004 | 0.004 | (5b-Tetra) | 0.14 | 0.14 |
| Comparative electrolytic solution No. 3-1 | — | — | (II-3-1) | 3.0 | — | — | — | — | — | — |
| Comparative electrolytic solution No. 3-2 | — | — | (II-3-1) | 3.0 | (1a-Trans) | 1.0 | — | — | — | — |
| Comparative electrolytic solution No. 3-3 | — | — | (II-3-1) | 3.0 | (1a-Trans) | 1.0 | — | (5a-Tetra) | 0.14 | — |

TABLE 6

| Electrolytic solution No, | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 4-1 | (1a-Cis) | 0.05 | (II-4-1) | 1.0 | — | — | — | — | — | — |
| Electrolytic solution No. 4-2 | | 0.1 | | 1.0 | — | — | — | — | — | — |
| Electrolytic solution No. 4-3 | | 0.8 | | 1.0 | — | — | — | — | — | — |
| Electrolytic solution No. 4-4 | | 1.0 | | 1.0 | — | — | — | — | — | — |
| Electrolytic solution No. 4-5 | | 3.0 | | 1.0 | — | — | — | — | — | — |
| Electrolytic solution No. 4-6 | | 5.0 | | 1.0 | — | — | — | — | — | — |
| Electrolytic solution No. 4-7 | (1a-Cis) | 1.0 | (II-4-1) | 0.05 | — | — | — | — | — | — |
| Electrolytic solution No. 4-8 | | 1.0 | | 0.1 | — | — | — | — | — | — |
| Electrolytic solution No. 4-9 | | 1.0 | | 0.5 | — | — | — | — | — | — |
| Electrolytic solution No. 4-10 | | 1.0 | | 2.0 | — | — | — | — | — | — |
| Electrolytic solution No. 4-11 | | 1.0 | | 5.0 | — | — | — | — | — | — |
| Electrolytic solution No. 4-12 | (1a-Cis) | 1.0 | (II-4-1) | 1.0 | (1a-Trans) | 0.002 | 0.002 | — | — | — |
| Electrolytic solution No. 4-13 | | 1.0 | | 1.0 | | 0.004 | 0.004 | — | — | — |
| Electrolytic solution No. 4-14 | | 1.0 | | 1.0 | | 0.01 | 0.01 | — | — | — |
| Electrolytic solution No. 4-15 | (1a-Cis) | 1.0 | (II-4-1) | 1.0 | — | — | — | (5a-Tetra) | 0.07 | 0.07 |
| Electrolytic solution No. 4-16 | | 1.0 | | 1.0 | — | — | — | | 0.14 | 0.14 |
| Electrolytic solution No. 4-17 | | 1.0 | | 1.0 | — | — | — | | 0.20 | 0.20 |
| Electrolytic solution No. 4-18 | (1a-Cis) | 0.5 | (II-4-1) | 0.2 | (1a-Trans) | 0.001 | 0.002 | (5a-Tetra) | 0.035 | 0.07 |
| Electrolytic solution No. 4-19 | | 0.5 | | 1.0 | | 0.0025 | 0.005 | | 0.06 | 0.12 |
| Electrolytic solution No. 4-20 | | 1.0 | | 0.2 | | 0.002 | 0.002 | | 0.07 | 0.07 |
| Electrolytic solution No. 4-21 | | 1.0 | | 1.0 | | 0.004 | 0.004 | | 0.14 | 0.14 |
| Electrolytic solution No. 4-22 | | 1.0 | | 3.0 | | 0.01 | 0.01 | | 0.20 | 0.20 |
| Electrolytic solution No. 4-23 | | 3.0 | | 1.0 | | 0.015 | 0.005 | | 0.36 | 0.12 |
| Electrolytic solution No. 4-24 | | 3.0 | | 3.0 | | 0.03 | 0.01 | | 0.60 | 0.20 |
| Electrolytic solution No. 4-25 | (1a-Cis) (1b-Cis) | 0.5 0.5 | (II-4-1) | 1.0 | (1a-Trans) | 0.004 | 0.004 | (5a-Tetra) | 0.14 | 0.14 |
| Electrolytic solution No. 4-26 | (1a-Cis) | 1.0 | (II-4-1) (II-2-1) | 0.5 0.5 | (1a-Trans) | 0.004 | 0.004 | (5a-Tetra) | 0.14 | 0.14 |
| Electrolytic solution No. 4-27 | (1a-Cis) | 1.0 | (II-4-1) | 1.0 | (1a-Trans) (1b-Trans) | 0.002 0.002 | 0.002 0.002 | (5a-Tetra) | 0.14 | 0.14 |
| Electrolytic solution No. 4-28 | (1a-Cis) | 1.0 | (II-4-1) | 1.0 | (1a-Trans) | 0.004 | 0.004 | (5a-Trans) (5b-Trans) | 0.07 0.07 | 0.07 0.07 |
| Electrolytic solution No. 4-29 | (1b-Cis) | 1.0 | (II-4-1) | 1.0 | (1a-Trans) | 0.004 | 0.004 | (5a-Tetra) | 0.14 | 0.14 |
| Electrolytic solution No. 4-30 | (1a-Cis) | 1.0 | | 1.0 | (1b-Trans) | 0.004 | 0.004 | (5a-Tetra) | 0.14 | 0.14 |
| Electrolytic solution No. 4-31 | (1a-Cis) | 1.0 | | 1.0 | (1a-Trans) | 0.004 | 0.004 | (5b-Tetra) | 0.14 | 0.14 |
| Comparative electrolytic solution No. 4-1 | — | — | (II-4-1) | 1.0 | — | — | — | — | — | — |
| Comparative electrolytic solution No. 4-2 | — | — | (II-4-1) | 1.0 | (1a-Trans) | 1.0 | — | — | — | — |
| Comparative electrolytic solution No. 4-3 | — | — | (II-4-1) | 1.0 | (1a-Trans) | 1.0 | — | (5a-Tetra) | 0.14 | — |

TABLE 7

(Positive electrode; NMC Negative electrode; Graphite)

| | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 3-1 | Electrolytic solution No. 3-1 | 139.1 | 146.1 | 122.0 |
| Example 3-2 | Electrolytic solution No. 3-2 | 143.1 | 151.1 | 126.2 |
| Example 3-3 | Electrolytic solution No. 3-3 | 145.5 | 154.6 | 129.5 |
| Example 3-4 | Electrolytic solution No. 3-4 | 147.3 | 156.5 | 129.9 |
| Example 3-5 | Electrolytic solution No. 3-5 | 146.2 | 155.0 | 129.1 |
| Example 3-6 | Electrolytic solution No. 3-6 | 140.2 | 144.5 | 121.8 |
| Example 3-7 | Electrolytic solution No. 3-7 | 141.3 | 145.7 | 122.3 |
| Example 3-8 | Electrolytic solution No. 3-8 | 144.5 | 155.4 | 123.3 |
| Example 3-9 | Electrolytic solution No. 3-9 | 146.3 | 156.4 | 129.8 |
| Example 3-10 | Electrolytic solution No. 3-10 | 146.2 | 154.9 | 129.1 |
| Example 3-11 | Electrolytic solution No. 3-11 | 141.5 | 145.5 | 121.5 |
| Example 3-12 | Electrolytic solution No. 3-12 | 147.5 | 157.1 | 130.5 |
| Example 3-13 | Electrolytic solution No. 3-13 | 149.4 | 157.8 | 130.9 |
| Example 3-14 | Electrolytic solution No. 3-14 | 150.9 | 156.8 | 131.0 |
| Example 3-15 | Electrolytic solution No. 3-15 | 148.4 | 156.6 | 130.7 |
| Example 3-16 | Electrolytic solution No. 3-16 | 149.5 | 157.3 | 131.1 |
| Example 3-17 | Electrolytic solution No. 3-17 | 149.8 | 157.0 | 131.6 |
| Example 3-18 | Electrolytic solution No. 3-18 | 139.3 | 152.8 | 129.4 |
| Example 3-19 | Electrolytic solution No. 3-19 | 145.6 | 154.7 | 129.8 |

TABLE 7-continued (Positive electrode; NMC Negative electrode; Graphite)

| | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 3-20 | Electrolytic solution No. 3-20 | 146.5 | 155.1 | 130.0 |
| Example 3-21 | Electrolytic solution No. 3-21 | 151.0 | 159.5 | 131.6 |
| Example 3-22 | Electrolytic solution No. 3-22 | 146.5 | 156.5 | 130.5 |
| Example 3-23 | Electrolytic solution No. 3-23 | 146.3 | 155.4 | 129.8 |
| Example 3-24 | Electrolytic solution No. 3-24 | 141.0 | 150.4 | 124.7 |
| Example 3-25 | Electrolytic solution No. 3-25 | 149.9 | 159.4 | 130.9 |
| Example 3-26 | Electrolytic solution No. 3-26 | 149.4 | 158.6 | 131.4 |
| Example 3-27 | Electrolytic solution No. 3-27 | 150.6 | 160.1 | 131.5 |
| Example 3-28 | Electrolytic solution No. 3-28 | 149.6 | 159.7 | 130.5 |
| Example 3-29 | Electrolytic solution No. 3-29 | 149.5 | 158.3 | 130.4 |
| Example 3-30 | Electrolytic solution No. 3-30 | 149.5 | 158.6 | 130.8 |
| Example 3-31 | Electrolytic solution No. 3-31 | 150.0 | 158.3 | 129.7 |
| Comparative Example 3-1 | Comparative electrolytic solution No. 3-1 | 131.5 | 135.7 | 112.8 |
| Comparative Example 3-2 | Comparative electrolytic solution No. 3-2 | 137.0 | 140.8 | 121.0 |
| Comparative Example 3-3 | Comparative electrolytic solution No. 3-3 | 137.9 | 141.5 | 121.8 |

TABLE 8

(Positive electrode; NMC Negative electrode; Graphite)

| | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 4-1 | Electrolytic solution No. 4-1 | 134.0 | 129.2 | 117.5 |
| Example 4-2 | Electrolytic solution No. 4-2 | 137.8 | 133.7 | 121.6 |
| Example 4-3 | Electrolytic solution No. 4-3 | 140.2 | 136.7 | 124.8 |
| Example 4-4 | Electrolytic solution No. 4-4 | 141.9 | 138.4 | 125.2 |
| Example 4-5 | Electrolytic solution No. 4-5 | 140.9 | 137.1 | 124.4 |
| Example 4-6 | Electrolytic solution No. 4-6 | 135.0 | 127.8 | 117.3 |
| Example 4-7 | Electrolytic solution No. 4-7 | 136.1 | 128.9 | 117.8 |
| Example 4-8 | Electrolytic solution No. 4-8 | 139.2 | 137.4 | 118.7 |
| Example 4-9 | Electrolytic solution No. 4-9 | 140.9 | 138.3 | 125.1 |
| Example 4-10 | Electrolytic solution No. 4-10 | 140.8 | 137.0 | 124.3 |
| Example 4-11 | Electrolytic solution No. 4-11 | 136.3 | 128.6 | 117.1 |
| Example 4-12 | Electrolytic solution No. 4-12 | 142.1 | 138.9 | 125.8 |
| Example 4-13 | Electrolytic solution No. 4-13 | 143.9 | 139.5 | 126.1 |
| Example 4-14 | Electrolytic solution No. 4-14 | 145.4 | 138.7 | 126.2 |
| Example 4-15 | Electrolytic solution No. 4-15 | 142.9 | 138.5 | 125.9 |
| Example 4-16 | Electrolytic solution No. 4-16 | 144.0 | 139.1 | 126.3 |
| Example 4-17 | Electrolytic solution No. 4-17 | 144.3 | 138.8 | 126.7 |
| Example 4-18 | Electrolytic solution No. 4-18 | 134.2 | 135.1 | 124.6 |
| Example 4-19 | Electrolytic solution No. 4-19 | 140.3 | 136.8 | 125.0 |
| Example 4-20 | Electrolytic solution No. 4-20 | 141.1 | 137.1 | 125.2 |
| Example 4-21 | Electrolytic solution No. 4-21 | 145.5 | 141.1 | 126.7 |
| Example 4-22 | Electrolytic solution No. 4-22 | 141.1 | 138.4 | 125.7 |
| Example 4-23 | Electrolytic solution No. 4-23 | 140.9 | 137.4 | 125.0 |
| Example 4-24 | Electrolytic solution No. 4-24 | 135.8 | 133.0 | 120.2 |
| Example 4-25 | Electrolytic solution No. 4-25 | 144.4 | 141.0 | 126.1 |
| Example 4-26 | Electrolytic solution No. 4-26 | 143.9 | 140.2 | 126.5 |
| Example 4-27 | Electrolytic solution No. 4-27 | 145.0 | 141.6 | 126.7 |
| Example 4-28 | Electrolytic solution No. 4-28 | 144.1 | 141.2 | 125.7 |
| Example 4-29 | Electrolytic solution No. 4-29 | 144.0 | 139.9 | 125.6 |
| Example 4-30 | Electrolytic solution No. 4-30 | 144.0 | 140.2 | 126.0 |
| Example 4-31 | Electrolytic solution No. 4-31 | 144.5 | 140.0 | 125.0 |
| Comparative Example 4-1 | Comparative electrolytic solution No. 4-1 | 126.6 | 120.0 | 108.7 |
| Comparative Example 4-2 | Comparative electrolytic solution No. 4-2 | 132.0 | 124.5 | 116.5 |
| Comparative Example 4-3 | Comparative electrolytic solution No. 4-3 | 132.8 | 125.2 | 117.3 |

TABLE 9

| Electrolytic solution No, | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 5-1 | (1a-Cis) | 0.05 | (II-5-1) | 1.0 | — | — | — | — | — | — |
| Electrolytic solution No. 5-2 | | 0.1 | | 1.0 | — | — | — | — | — | — |
| Electrolytic solution No. 5-3 | | 0.8 | | 1.0 | — | — | — | — | — | — |
| Electrolytic solution No. 5-4 | | 1.0 | | 1.0 | — | — | — | — | — | — |
| Electrolytic solution No. 5-5 | | 3.0 | | 1.0 | — | — | — | — | — | — |
| Electrolytic solution No. 5-6 | | 5.0 | | 1.0 | — | — | — | — | — | — |
| Electrolytic solution No. 5-7 | (1a-Cis) | 1.0 | (II-5-1) | 0.05 | — | — | — | — | — | — |
| Electrolytic solution No. 5-8 | | 1.0 | | 0.1 | — | — | — | — | — | — |
| Electrolytic solution No. 5-9 | | 1.0 | | 0.5 | — | — | — | — | — | — |
| Electrolytic solution No. 5-10 | | 1.0 | | 2.0 | — | — | — | — | — | — |
| Electrolytic solution No. 5-11 | | 1.0 | | 5.0 | — | — | — | — | — | — |
| Electrolytic solution No. 5-12 | (1a-Cis) | 1.0 | (II-5-1) | 1.0 | (1a-Trans) | 0.002 | 0.002 | — | — | — |
| Electrolytic solution No. 5-13 | | 1.0 | | 1.0 | | 0.004 | 0.004 | — | — | — |
| Electrolytic solution No. 5-14 | | 1.0 | | 1.0 | | 0.01 | 0.01 | — | — | — |
| Electrolytic solution No. 5-15 | (1a-Cis) | 1.0 | (II-5-1) | 1.0 | — | — | — | (5a-Tetra) | 0.07 | 0.07 |
| Electrolytic solution No. 5-16 | | 1.0 | | 1.0 | — | — | — | | 0.14 | 0.14 |
| Electrolytic solution No. 5-17 | | 1.0 | | 1.0 | — | — | — | | 0.20 | 0.20 |
| Electrolytic solution No. 5-18 | (1a-Cis) | 0.5 | (II-5-1) | 0.2 | (1a-Trans) | 0.001 | 0.002 | (5a-Tetra) | 0.035 | 0.07 |
| Electrolytic solution No. 5-19 | | 0.5 | | 1.0 | | 0.0025 | 0.005 | | 0.06 | 0.12 |
| Electrolytic solution No. 5-20 | | 1.0 | | 0.2 | | 0.002 | 0.002 | | 0.07 | 0.07 |
| Electrolytic solution No. 5-21 | | 1.0 | | 1.0 | | 0.004 | 0.004 | | 0.14 | 0.14 |
| Electrolytic solution No. 5-22 | | 1.0 | | 3.0 | | 0.01 | 0.01 | | 0.20 | 0.20 |
| Electrolytic solution No. 5-23 | | 3.0 | | 1.0 | | 0.015 | 0.005 | | 0.36 | 0.12 |
| Electrolytic solution No. 5-24 | | 3.0 | | 3.0 | | 0.03 | 0.01 | | 0.60 | 0.20 |
| Electrolytic solution No. 5-25 | (1a-Cis) (1b-Cis) | 0.5 0.5 | (II-5-1) | 1.0 | (1a-Trans) | 0.004 | 0.004 | (5a-Tetra) | 0.14 | 0.14 |
| Electrolytic solution No. 5-26 | (1a-Cis) | 1.0 | (II-5-1 (II-2-1) | 0.5 0.5 | (1a-Trans) | 0.004 | 0.004 | (5a-Tetra) | 0.14 | 0.14 |
| Electrolytic solution No. 5-27 | (1a-Cis) | 1.0 | (II-5-1) | 1.0 | (1a-Trans) (1b-Trans) | 0.002 0.002 | 0.002 0.002 | (5a-Tetra) | 0.14 | 0.14 |
| Electrolytic solution No. 5-28 | (1a-Cis) | 1.0 | (II-5-1) | 1.0 | (1a-Trans) | 0.004 | 0.004 | (5a-Tetra) (5b-Trans) | 0.07 0.07 | 0.07 0.07 |
| Electrolytic solution No. 5-29 | (1b-Cis) | 1.0 | (II-5-1) | 1.0 | (1a-Trans) | 0.004 | 0.004 | (5a-Tetra) | 0.14 | 0.14 |
| Electrolytic solution No. 5-30 | (1a-Cis) | 1.0 | | 1.0 | (1b-Trans) | 0.004 | 0.004 | (5a-Tetra) | 0.14 | 0.14 |
| Electrolytic solution No. 5-31 | (1a-Cis) | 1.0 | | 1.0 | (1a-Trans) | 0.004 | 0.004 | (5b-Tetra) | 0.14 | 0.14 |
| Comparative electrolytic solution No. 5-1 | — | — | (II-5-1) | 1.0 | — | — | — | — | — | — |
| Comparative electrolytic solution No. 5-2 | — | — | (II-5-1) | 1.0 | (1a-Trans) | 1.0 | — | — | — | — |
| Comparative electrolytic solution No. 5-3 | — | — | (II-5-1) | 1.0 | (1a-Trans) | 1.0 | — | (5a-Tetra) | 0.14 | — |

TABLE 10

| Electrolytic solution No, | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 6-1 | (1a-Cis) | 0.05 | (II-6-1) | 1.0 | — | — | — | — | — | — |
| Electrolytic solution No. 6-2 | | 0.1 | | 1.0 | — | — | — | — | — | — |
| Electrolytic solution No. 6-3 | | 0.8 | | 1.0 | — | — | — | — | — | — |
| Electrolytic solution No. 6-4 | | 1.0 | | 1.0 | — | — | — | — | — | — |
| Electrolytic solution No. 6-5 | | 3.0 | | 1.0 | — | — | — | — | — | — |
| Electrolytic solution No. 6-6 | | 5.0 | | 1.0 | — | — | — | — | — | — |
| Electrolytic solution No. 6-7 | (1a-Cis) | 1.0 | (II-6-1) | 0.05 | — | — | — | — | — | — |
| Electrolytic solution No. 6-8 | | 1.0 | | 0.1 | — | — | — | — | — | — |
| Electrolytic solution No. 6-9 | | 1.0 | | 0.5 | — | — | — | — | — | — |
| Electrolytic solution No. 6-10 | | 1.0 | | 2.0 | — | — | — | — | — | — |
| Electrolytic solution No. 6-11 | | 1.0 | | 5.0 | — | — | — | — | — | — |
| Electrolytic solution No. 6-12 | (1a-Cis) | 1.0 | (II-6-1) | 1.0 | (1a-Trans) | 0.002 | 0.002 | — | — | — |
| Electrolytic solution No. 6-13 | | 1.0 | | 1.0 | | 0.004 | 0.004 | — | — | — |
| Electrolytic solution No. 6-14 | | 1.0 | | 1.0 | | 0.01 | 0.01 | — | — | — |
| Electrolytic solution No. 6-15 | (1a-Cis) | 1.0 | (II-6-1) | 1.0 | — | — | — | (5a-Tetra) | 0.07 | 0.07 |
| Electrolytic solution No. 6-16 | | 1.0 | | 1.0 | — | — | — | | 0.14 | 0.14 |
| Electrolytic solution No. 6-17 | | 1.0 | | 1.0 | — | — | — | | 0.20 | 0.20 |
| Electrolytic solution No. 6-18 | (1a-Cis) | 0.5 | (II-6-1) | 0.2 | (1a-Trans) | 0.001 | 0.002 | (5a-Tetra) | 0.035 | 0.07 |

TABLE 10-continued

| Electrolytic solution No, | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 6-19 | | 0.5 | | 1.0 | | 0.0025 | 0.005 | | 0.06 | 0.12 |
| Electrolytic solution No. 6-20 | | 1.0 | | 0.2 | | 0.002 | 0.002 | | 0.07 | 0.07 |
| Electrolytic solution No. 6-21 | | 1.0 | | 1.0 | | 0.004 | 0.004 | | 0.14 | 0.14 |
| Electrolytic solution No. 6-22 | | 1.0 | | 3.0 | | 0.01 | 0.01 | | 0.20 | 0.20 |
| Electrolytic solution No. 6-23 | | 3.0 | | 1.0 | | 0.015 | 0.005 | | 0.36 | 0.12 |
| Electrolytic solution No. 6-24 | | 3.0 | | 3.0 | | 0.03 | 0.01 | | 0.60 | 0.20 |
| Electrolytic solution No. 6-25 | (1a-Cis) (1b-Cis) | 0.5 0.5 | (II-6-1) | 1.0 | (1a-Trans) | 0.004 | 0.004 | (5a-Tetra) | 0.14 | 0.14 |
| Electrolytic solution No. 6-26 | (1a-Cis) | 1.0 | (II-6-1) (II-2-1) | 0.5 0.5 | (1a-Trans) | 0.004 | 0.004 | (5a-Tetra) | 0.14 | 0.14 |
| Electrolytic solution No. 6-27 | (1a-Cis) | 1.0 | (II-6-1) | 1.0 | (1a-Trans) (1b-Trans) | 0.002 0.002 | 0.002 0.002 | (5a-Tetra) | 0.14 | 0.14 |
| Electrolytic solution No. 6-28 | (1a-Cis) | 1.0 | (II-6-1) | 1.0 | (1a-Trans) | 0.004 | 0.004 | (5a-Trans) (5b-Trans) | 0.07 0.07 | 0.07 0.07 |
| Electrolytic solution No. 6-29 | (1b-Cis) | 1.0 | (II-6-1) | 1.0 | (1a-Trans) | 0.004 | 0.004 | (5a-Tetra) | 0.14 | 0.14 |
| Electrolytic solution No. 6-30 | (1a-Cis) | 1.0 | | 1.0 | (1b-Trans) | 0.004 | 0.004 | (5a-Tetra) | 0.14 | 0.14 |
| Electrolytic solution No. 6-31 | (1a-Cis) | 1.0 | | 1.0 | (1a-Trans) | 0.004 | 0.004 | (5b-Tetra) | 0.14 | 0.14 |
| Comparative electrolytic solution No. 6-1 | — | — | (II-6-1) | 1.0 | — | — | — | — | — | — |
| Comparative electrolytic solution No. 6-2 | — | — | (II-6-1) | 1.0 | (1a-Trans) | 1.0 | — | — | — | — |
| Comparative electrolytic solution No. 6-3 | — | — | (II-6-1) | 1.0 | (1a-Trans) | 1.0 | — | (5a-Tetra) | 0.14 | — |

TABLE 11

(Positive electrode; NMC Negative electrode; Graphite)

| | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 5-1 | Electrolytic solution No. 5-1 | 131.4 | 141.2 | 115.0 |
| Example 5-2 | Electrolytic solution No. 5-2 | 135.2 | 146.1 | 118.9 |
| Example 5-3 | Electrolytic solution No. 5-3 | 137.5 | 149.5 | 122.0 |
| Example 5-4 | Electrolytic solution No. 5-4 | 139.2 | 151.3 | 122.4 |
| Example 5-5 | Electrolytic solution No. 5-5 | 138.2 | 149.9 | 121.7 |
| Example 5-6 | Electrolytic solution No. 5-6 | 132.4 | 139.7 | 114.7 |
| Example 5-7 | Electrolytic solution No. 5-7 | 133.5 | 140.9 | 115.2 |
| Example 5-8 | Electrolytic solution No. 5-8 | 136.6 | 150.3 | 116.2 |
| Example 5-9 | Electrolytic solution No. 5-9 | 138.2 | 151.2 | 122.3 |
| Example 5-10 | Electrolytic solution No. 5-10 | 138.1 | 149.8 | 121.6 |
| Example 5-11 | Electrolytic solution No. 5-11 | 133.7 | 140.7 | 114.5 |
| Example 5-12 | Electrolytic solution No. 5-12 | 139.4 | 151.9 | 123.0 |
| Example 5-13 | Electrolytic solution No. 5-13 | 141.2 | 152.6 | 123.3 |
| Example 5-14 | Electrolytic solution No. 5-14 | 142.6 | 151.6 | 123.4 |
| Example 5-15 | Electrolytic solution No. 5-15 | 140.2 | 151.4 | 123.2 |
| Example 5-16 | Electrolytic solution No. 5-16 | 141.3 | 152.1 | 123.5 |
| Example 5-17 | Electrolytic solution No. 5-17 | 141.5 | 151.8 | 124.0 |
| Example 5-18 | Electrolytic solution No. 5-18 | 131.6 | 147.7 | 121.9 |
| Example 5-19 | Electrolytic solution No. 5-19 | 137.6 | 149.6 | 122.3 |
| Example 5-20 | Electrolytic solution No. 5-20 | 138.4 | 149.9 | 122.5 |
| Example 5-21 | Electrolytic solution No. 5-21 | 142.7 | 154.2 | 124.0 |
| Example 5-22 | Electrolytic solution No. 5-22 | 138.4 | 151.3 | 123.0 |
| Example 5-23 | Electrolytic solution No. 5-23 | 138.3 | 150.2 | 122.3 |
| Example 5-24 | Electrolytic solution No. 5-24 | 133.2 | 145.4 | 117.5 |
| Example 5-25 | Electrolytic solution No. 5-25 | 141.6 | 154.2 | 123.4 |
| Example 5-26 | Electrolytic solution No. 5-26 | 141.2 | 153.3 | 123.8 |
| Example 5-27 | Electrolytic solution No. 5-27 | 142.3 | 154.8 | 123.9 |
| Example 5-28 | Electrolytic solution No. 5-28 | 141.4 | 154.4 | 123.0 |
| Example 5-29 | Electrolytic solution No. 5-29 | 141.3 | 153.0 | 122.9 |
| Example 5-30 | Electrolytic solution No. 5-30 | 141.2 | 153.3 | 123.3 |
| Example 5-31 | Electrolytic solution No. 5-31 | 141.8 | 153.1 | 122.3 |
| Comparative Example 5-1 | Comparative electrolytic solution No. 5-1 | 124.2 | 131.2 | 106.3 |
| Comparative Example 5-2 | Comparative electrolytic solution No. 5-2 | 129.5 | 136.2 | 114.0 |
| Comparative Example 5-3 | Comparative electrolytic solution No. 5-3 | 130.3 | 136.8 | 114.8 |

TABLE 12

(Positive electrode; NMC Negative electrode; Graphite)

| | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 6-1 | Electrolytic solution No. 6-1 | 140.4 | 143.7 | 124.4 |
| Example 6-2 | Electrolytic solution No. 6-2 | 144.4 | 148.6 | 128.7 |
| Example 6-3 | Electrolytic solution No. 6-3 | 146.8 | 152.0 | 132.0 |
| Example 6-4 | Electrolytic solution No. 6-4 | 148.7 | 153.9 | 132.4 |
| Example 6-5 | Electrolytic solution No. 6-5 | 147.6 | 152.4 | 131.6 |
| Example 6-6 | Electrolytic solution No. 6-6 | 141.4 | 142.1 | 124.1 |
| Example 6-7 | Electrolytic solution No. 6-7 | 142.6 | 143.3 | 124.7 |
| Example 6-8 | Electrolytic solution No. 6-8 | 145.9 | 152.8 | 125.6 |
| Example 6-9 | Electrolytic solution No. 6-9 | 147.6 | 153.8 | 132.3 |
| Example 6-10 | Electrolytic solution No. 6-10 | 147.5 | 152.3 | 131.6 |
| Example 6-11 | Electrolytic solution No. 6-11 | 142.8 | 143.1 | 123.9 |
| Example 6-12 | Electrolytic solution No. 6-12 | 148.9 | 154.5 | 133.1 |
| Example 6-13 | Electrolytic solution No. 6-13 | 150.8 | 155.2 | 133.4 |
| Example 6-14 | Electrolytic solution No. 6-14 | 152.3 | 154.2 | 133.5 |
| Example 6-15 | Electrolytic solution No. 6-15 | 149.8 | 154.0 | 133.3 |
| Example 6-16 | Electrolytic solution No. 6-16 | 150.9 | 154.7 | 133.6 |
| Example 6-17 | Electrolytic solution No. 6-17 | 151.1 | 154.4 | 134.1 |
| Example 6-18 | Electrolytic solution No. 6-18 | 140.5 | 150.3 | 131.9 |
| Example 6-19 | Electrolytic solution No. 6-19 | 147.0 | 152.1 | 132.3 |
| Example 6-20 | Electrolytic solution No. 6-20 | 147.8 | 152.5 | 132.5 |
| Example 6-21 | Electrolytic solution No. 6-21 | 152.4 | 156.9 | 134.1 |
| Example 6-22 | Electrolytic solution No. 6-22 | 147.8 | 153.9 | 133.0 |
| Example 6-23 | Electrolytic solution No. 6-23 | 147.7 | 152.8 | 132.3 |
| Example 6-24 | Electrolytic solution No. 6-24 | 142.3 | 147.9 | 127.1 |
| Example 6-25 | Electrolytic solution No. 6-25 | 151.3 | 156.8 | 133.4 |
| Example 6-26 | Electrolytic solution No. 6-26 | 150.8 | 156.0 | 133.9 |
| Example 6-27 | Electrolytic solution No. 6-27 | 151.9 | 157.4 | 134.0 |
| Example 6-28 | Electrolytic solution No. 6-28 | 151.0 | 157.0 | 133.0 |
| Example 6-29 | Electrolytic solution No. 6-29 | 150.9 | 155.6 | 132.9 |
| Example 6-30 | Electrolytic solution No. 6-30 | 150.8 | 155.9 | 133.3 |
| Example 6-31 | Electrolytic solution No. 6-31 | 151.4 | 155.7 | 132.2 |
| Comparative Example 6-1 | Comparative electrolytic solution No. 6-1 | 132.7 | 133.5 | 115.0 |
| Comparative Example 6-2 | Comparative electrolytic solution No. 6-2 | 138.3 | 138.5 | 123.3 |
| Comparative Example 6-3 | Comparative electrolytic solution No. 6-3 | 139.1 | 139.2 | 124.1 |

TABLE 13

| Electrolytic solution No, | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 7-1 | (1a-Cis) | 0.05 | (II-7-1) | 1.0 | — | — | — | — | — | — |
| Electrolytic solution No. 7-2 | | 0.1 | | 1.0 | — | — | — | — | — | — |
| Electrolytic solution No. 7-3 | | 0.8 | | 1.0 | — | — | — | — | — | — |
| Electrolytic solution No. 7-4 | | 1.0 | | 1.0 | — | — | — | — | — | — |
| Electrolytic solution No. 7-5 | | 3.0 | | 1.0 | — | — | — | — | — | — |
| Electrolytic solution No. 7-6 | | 5.0 | | 1.0 | — | — | — | — | — | — |
| Electrolytic solution No. 7-7 | (1a-Cis) | 1.0 | (II-7-1) | 0.05 | — | — | — | — | — | — |
| Electrolytic solution No. 7-8 | | 1.0 | | 0.1 | — | — | — | — | — | — |
| Electrolytic solution No. 7-9 | | 1.0 | | 0.5 | — | — | — | — | — | — |
| Electrolytic solution No. 7-10 | | 1.0 | | 2.0 | — | — | — | — | — | — |
| Electrolytic solution No. 7-11 | | 1.0 | | 5.0 | — | — | — | — | — | — |
| Electrolytic solution No. 7-12 | (1a-Cis) | 1.0 | (II-7-1) | 1.0 | (1a-Trans) | 0.002 | 0.002 | — | — | — |
| Electrolytic solution No. 7-13 | | 1.0 | | 1.0 | | 0.004 | 0.004 | — | — | — |
| Electrolytic solution No. 7-14 | | 1.0 | | 1.0 | | 0.01 | 0.01 | — | — | — |
| Electrolytic solution No. 7-15 | (1a-Cis) | 1.0 | (II-7-1) | 1.0 | — | — | — | (5a-Tetra) | 0.07 | 0.07 |
| Electrolytic solution No. 7-16 | | 1.0 | | 1.0 | — | — | — | | 0.14 | 0.14 |
| Electrolytic solution No. 7-17 | | 1.0 | | 1.0 | — | — | — | | 0.20 | 0.20 |
| Electrolytic solution No. 7-18 | (1a-Cis) | 0.5 | (II-7-1) | 0.2 | (1a-Trans) | 0.001 | 0.002 | (5a-Tetra) | 0.035 | 0.07 |
| Electrolytic solution No. 7-19 | | 0.5 | | 1.0 | | 0.0025 | 0.005 | | 0.06 | 0.12 |
| Electrolytic solution No. 7-20 | | 1.0 | | 0.2 | | 0.002 | 0.002 | | 0.07 | 0.07 |
| Electrolytic solution No. 7-21 | | 1.0 | | 1.0 | | 0.004 | 0.004 | | 0.14 | 0.14 |
| Electrolytic solution No. 7-22 | | 1.0 | | 3.0 | | 0.01 | 0.01 | | 0.20 | 0.20 |
| Electrolytic solution No. 7-23 | | 3.0 | | 1.0 | | 0.015 | 0.005 | | 0.36 | 0.12 |

TABLE 13-continued

| Electrolytic solution No, | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 7-24 | | 3.0 | | 3.0 | | 0.03 | 0.01 | | 0.60 | 0.20 |
| Electrolytic solution No. 7-25 | (1a-Cis) (1b-Cis) | 0.5 0.5 | (II-7-1) | 1.0 | (1a-Trans) | 0.004 | 0.004 | (5a-Tetra) | 0.14 | 0.14 |
| Electrolytic solution No. 7-26 | (1a-Cis) | 1.0 | (II-7-1) (II-2-1) | 0.5 0.5 | (1a-Trans) | 0.004 | 0.004 | (5a-Tetra) | 0.14 | 0.14 |
| Electrolytic solution No. 7-27 | (1a-Cis) | 1.0 | (II-7-1) | 1.0 | (1a-Trans) (1b-Trans) | 0.002 0.002 | 0.002 0.002 | (5a-Tetra) | 0.14 | 0.14 |
| Electrolytic solution No. 7-28 | (1a-Cis) | 1.0 | (II-7-1) | 1.0 | (1a-Trans) | 0.004 | 0.004 | (5a-Trans) (5b-Trans) | 0.07 0.07 | 0.07 0.07 |
| Electrolytic solution No. 7-29 | (1b-Cis) | 1.0 | (II-7-1) | 1.0 | (1a-Trans) | 0.004 | 0.004 | (5a-Tetra) | 0.14 | 0.14 |
| Electrolytic solution No. 7-30 | (1a-Cis) | 1.0 | | 1.0 | (1b-Trans) | 0.004 | 0.004 | (5a-Tetra) | 0.14 | 0.14 |
| Electrolytic solution No. 7-31 | (1a-Cis) | 1.0 | | 1.0 | (1a-Trans) | 0.004 | 0.004 | (5b-Tetra) | 0.14 | 0.14 |
| Comparative electrolytic solution No. 7-1 | — | — | (II-7-1) | 1.0 | — | — | — | — | — | — |
| Comparative electrolytic solution No. 7-2 | — | — | (II-7-1) | 1.0 | (1a-Trans) | 1.0 | — | — | — | — |
| Comparative electrolytic solution No. 7-3 | — | — | (II-7-1) | 1.0 | (1a-Trans) | 1.0 | — | (5a-Tetra) | 0.14 | — |

TABLE 14

| Electrolytic solution No, | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 8-1 | (1a-Cis) | 0.05 | (II-8-1) | 1.0 | — | — | — | — | — | — |
| Electrolytic solution No. 8-2 | | 0.1 | | 1.0 | — | — | — | — | — | — |
| Electrolytic solution No. 8-3 | | 0.8 | | 1.0 | — | — | — | — | — | — |
| Electrolytic solution No. 8-4 | | 1.0 | | 1.0 | — | — | — | — | — | — |
| Electrolytic solution No. 8-5 | | 3.0 | | 1.0 | — | — | — | — | — | — |
| Electrolytic solution No. 8-6 | | 5.0 | | 1.0 | — | — | — | — | — | — |
| Electrolytic solution No. 8-7 | (1a-Cis) | 1.0 | (II-8-1) | 0.05 | — | — | — | — | — | — |
| Electrolytic solution No. 8-8 | | 1.0 | | 0.1 | — | — | — | — | — | — |
| Electrolytic solution No. 8-9 | | 1.0 | | 0.5 | — | — | — | — | — | — |
| Electrolytic solution No. 8-10 | | 1.0 | | 2.0 | — | — | — | — | — | — |
| Electrolytic solution No. 8-11 | | 1.0 | | 5.0 | — | — | — | — | — | — |
| Electrolytic solution No. 8-12 | (1a-Cis) | 1.0 | (II-8-1) | 1.0 | (1a-Trans) | 0.002 | 0.002 | — | — | — |
| Electrolytic solution No. 8-13 | | 1.0 | | 1.0 | | 0.004 | 0.004 | — | — | — |
| Electrolytic solution No. 8-14 | | 1.0 | | 1.0 | | 0.01 | 0.01 | — | — | — |
| Electrolytic solution No. 8-15 | (1a-Cis) | 1.0 | (II-8-1) | 1.0 | — | — | — | (5a-Tetra) | 0.07 | 0.07 |
| Electrolytic solution No. 8-16 | | 1.0 | | 1.0 | — | — | — | | 0.14 | 0.14 |
| Electrolytic solution No. 8-17 | | 1.0 | | 1.0 | — | — | — | | 0.20 | 0.20 |
| Electrolytic solution No. 8-18 | (1a-Cis) | 0.5 | (II-8-1) | 0.2 | (1a-Trans) | 0.001 | 0.002 | (5a-Tetra) | 0.035 | 0.07 |
| Electrolytic solution No. 8-19 | | 0.5 | | 1.0 | | 0.0025 | 0.005 | | 0.06 | 0.12 |
| Electrolytic solution No. 8-20 | | 1.0 | | 0.2 | | 0.002 | 0.002 | | 0.07 | 0.07 |
| Electrolytic solution No. 8-21 | | 1.0 | | 1.0 | | 0.004 | 0.004 | | 0.14 | 0.14 |
| Electrolytic solution No. 8-22 | | 1.0 | | 3.0 | | 0.01 | 0.01 | | 0.20 | 0.20 |
| Electrolytic solution No. 8-23 | | 3.0 | | 1.0 | | 0.015 | 0.005 | | 0.36 | 0.12 |
| Electrolytic solution No. 8-24 | | 3.0 | | 3.0 | | 0.03 | 0.01 | | 0.60 | 0.20 |
| Electrolytic solution No. 8-25 | (1a-Cis) (1b-Cis) | 0.5 0.5 | (II-8-1) | 1.0 | (1a-Trans) | 0.004 | 0.004 | (5a-Tetra) | 0.14 | 0.14 |
| Electrolytic solution No. 8-26 | (1a-Cis) | 1.0 | (II-8-1) (II-2-1) | 0.5 0.5 | (1a-Trans) | 0.004 | 0.004 | (5a-Tetra) | 0.14 | 0.14 |
| Electrolytic solution No. 8-27 | (1a-Cis) | 1.0 | (II-8-1) | 1.0 | (1a-Trans) (1b-Trans) | 0.002 0.002 | 0.002 0.002 | (5a-Tetra) | 0.14 | 0.14 |
| Electrolytic solution No. 8-28 | (1a-Cis) | 1.0 | (II-8-1) | 1.0 | (1a-Trans) | 0.004 | 0.004 | (5a-Trans) (5b-Trans) | 0.07 0.07 | 0.07 0.07 |
| Electrolytic solution No. 8-29 | (1b-Cis) | 1.0 | (II-8-1) | 1.0 | (1a-Trans) | 0.004 | 0.004 | (5a-Tetra) | 0.14 | 0.14 |
| Electrolytic solution No. 8-30 | (1a-Cis) | 1.0 | | 1.0 | (1b-Trans) | 0.004 | 0.004 | (5a-Tetra) | 0.14 | 0.14 |
| Electrolytic solution No. 8-31 | (1a-Cis) | 1.0 | | 1.0 | (1a-Trans) | 0.004 | 0.004 | (5b-Tetra) | 0.14 | 0.14 |
| Comparative electrolytic solution No. 8-1 | — | — | (II-8-1) | 1.0 | — | — | — | — | — | — |
| Comparative electrolytic solution No. 8-2 | — | — | (II-8-1) | 1.0 | (1a-Trans) | 1.0 | — | — | — | — |
| Comparative electrolytic solution No. 8-3 | — | — | (II-8-1) | 1.0 | (1a-Trans) | 1.0 | — | (5a-Tetra) | 0.14 | — |

TABLE 15

(Positive electrode; NMC Negative electrode; Graphite)

| | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 7-1 | Electrolytic solution No. 7-1 | 133.4 | 136.7 | 119.2 |
| Example 7-2 | Electrolytic solution No. 7-2 | 137.2 | 141.4 | 123.3 |
| Example 7-3 | Electrolytic solution No. 7-3 | 139.5 | 144.6 | 126.5 |
| Example 7-4 | Electrolytic solution No. 7-4 | 141.2 | 146.4 | 126.9 |
| Example 7-5 | Electrolytic solution No. 7-5 | 140.2 | 145.0 | 126.1 |
| Example 7-6 | Electrolytic solution No. 7-6 | 134.4 | 135.2 | 119.0 |
| Example 7-7 | Electrolytic solution No. 7-7 | 135.5 | 136.3 | 119.5 |
| Example 7-8 | Electrolytic solution No. 7-8 | 138.6 | 145.4 | 120.4 |
| Example 7-9 | Electrolytic solution No. 7-9 | 140.2 | 146.3 | 126.8 |
| Example 7-10 | Electrolytic solution No. 7-10 | 140.1 | 144.9 | 126.1 |
| Example 7-11 | Electrolytic solution No. 7-11 | 135.7 | 136.1 | 118.7 |
| Example 7-12 | Electrolytic solution No. 7-12 | 141.4 | 147.0 | 127.5 |
| Example 7-13 | Electrolytic solution No. 7-13 | 143.3 | 147.6 | 127.8 |
| Example 7-14 | Electrolytic solution No. 7-14 | 144.7 | 146.7 | 127.9 |
| Example 7-15 | Electrolytic solution No. 7-15 | 142.3 | 146.5 | 127.7 |
| Example 7-16 | Electrolytic solution No. 7-16 | 143.3 | 147.2 | 128.0 |
| Example 7-17 | Electrolytic solution No. 7-17 | 143.6 | 146.9 | 128.5 |
| Example 7-18 | Electrolytic solution No. 7-18 | 133.5 | 142.9 | 126.4 |
| Example 7-19 | Electrolytic solution No. 7-19 | 139.6 | 144.7 | 126.8 |
| Example 7-20 | Electrolytic solution No. 7-20 | 140.4 | 145.1 | 127.0 |
| Example 7-21 | Electrolytic solution No. 7-21 | 144.8 | 149.2 | 128.5 |
| Example 7-22 | Electrolytic solution No. 7-22 | 140.4 | 146.4 | 127.5 |
| Example 7-23 | Electrolytic solution No. 7-23 | 140.3 | 145.4 | 126.8 |
| Example 7-24 | Electrolytic solution No. 7-24 | 135.1 | 140.7 | 121.9 |
| Example 7-25 | Electrolytic solution No. 7-25 | 143.7 | 149.2 | 127.9 |
| Example 7-26 | Electrolytic solution No. 7-26 | 143.2 | 148.4 | 128.3 |
| Example 7-27 | Electrolytic solution No. 7-27 | 144.3 | 149.8 | 128.5 |
| Example 7-28 | Electrolytic solution No. 7-28 | 143.4 | 149.4 | 127.5 |
| Example 7-29 | Electrolytic solution No. 7-29 | 143.3 | 148.1 | 127.4 |
| Example 7-30 | Electrolytic solution No. 7-30 | 143.3 | 148.3 | 127.8 |
| Example 7-31 | Electrolytic solution No. 7-31 | 143.8 | 148.1 | 126.7 |
| Comparative Example 7-1 | Comparative electrolytic solution No. 7-1 | 126.0 | 127.0 | 110.2 |
| Comparative Example 7-2 | Comparative electrolytic solution No. 7-2 | 131.4 | 131.7 | 118.2 |
| Comparative Example 7-3 | Comparative electrolytic solution No. 7-3 | 132.2 | 132.4 | 119.0 |

TABLE 16

(Positive electrode; NMC Negative electrode; Graphite)

| | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 8-1 | Electrolytic solution No. 8-1 | 138.8 | 140.2 | 127.0 |
| Example 8-2 | Electrolytic solution No. 8-2 | 142.8 | 145.0 | 131.4 |
| Example 8-3 | Electrolytic solution No. 8-3 | 145.2 | 148.3 | 134.9 |
| Example 8-4 | Electrolytic solution No. 8-4 | 147.0 | 150.1 | 135.3 |
| Example 8-5 | Electrolytic solution No. 8-5 | 146.0 | 148.7 | 134.4 |
| Example 8-6 | Electrolytic solution No. 8-6 | 139.9 | 138.7 | 126.8 |
| Example 8-7 | Electrolytic solution No. 8-7 | 141.1 | 139.8 | 127.4 |
| Example 8-8 | Electrolytic solution No. 8-8 | 144.3 | 149.1 | 128.4 |
| Example 8-9 | Electrolytic solution No. 8-9 | 146.0 | 150.1 | 135.2 |
| Example 8-10 | Electrolytic solution No. 8-10 | 145.9 | 148.6 | 134.4 |
| Example 8-11 | Electrolytic solution No. 8-11 | 141.2 | 139.6 | 126.6 |
| Example 8-12 | Electrolytic solution No. 8-12 | 147.3 | 150.7 | 135.9 |
| Example 8-13 | Electrolytic solution No. 8-13 | 149.2 | 151.4 | 136.2 |
| Example 8-14 | Electrolytic solution No. 8-14 | 150.6 | 150.5 | 136.3 |
| Example 8-15 | Electrolytic solution No. 8-15 | 148.1 | 150.3 | 136.2 |
| Example 8-16 | Electrolytic solution No. 8-16 | 149.2 | 151.0 | 136.5 |
| Example 8-17 | Electrolytic solution No. 8-17 | 149.5 | 150.6 | 137.0 |
| Example 8-18 | Electrolytic solution No. 8-18 | 139.0 | 146.6 | 134.7 |
| Example 8-19 | Electrolytic solution No. 8-19 | 145.4 | 148.4 | 135.1 |
| Example 8-20 | Electrolytic solution No. 8-20 | 146.2 | 148.8 | 135.4 |
| Example 8-21 | Electrolytic solution No. 8-21 | 150.8 | 153.1 | 137.0 |
| Example 8-22 | Electrolytic solution No. 8-22 | 146.2 | 150.2 | 135.9 |
| Example 8-23 | Electrolytic solution No. 8-23 | 146.0 | 149.1 | 135.1 |
| Example 8-24 | Electrolytic solution No. 8-24 | 140.7 | 144.3 | 129.9 |

TABLE 16-continued (Positive electrode; NMC Negative electrode; Graphite)

|  | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 8-25 | Electrolytic solution No. 8-25 | 149.6 | 153.0 | 136.3 |
| Example 8-26 | Electrolytic solution No. 8-26 | 149.1 | 152.2 | 136.8 |
| Example 8-27 | Electrolytic solution No. 8-27 | 150.3 | 153.6 | 136.9 |
| Example 8-28 | Electrolytic solution No. 8-28 | 149.3 | 153.2 | 135.9 |
| Example 8-29 | Electrolytic solution No. 8-29 | 149.2 | 151.9 | 135.8 |
| Example 8-30 | Electrolytic solution No. 8-30 | 149.2 | 152.1 | 136.2 |
| Example 8-31 | Electrolytic solution No. 8-31 | 149.8 | 151.9 | 135.1 |
| Comparative Example 8-1 | Comparative electrolytic solution No. 8-1 | 131.2 | 130.2 | 117.5 |
| Comparative Example 8-2 | Comparative electrolytic solution No. 8-2 | 136.8 | 135.1 | 126.0 |
| Comparative Example 8-3 | Comparative electrolytic solution No. 8-3 | 137.6 | 135.8 | 126.8 |

TABLE 17

| Electrolytic solution No, | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 9-1 | (1a-Cis) | 0.05 | Lithium difluorophosphate | 1.0 | — | — | — | — | — | — |
| Electrolytic solution No. 9-2 |  | 0.1 |  | 1.0 | — | — | — | — | — | — |
| Electrolytic solution No. 9-3 |  | 0.8 |  | 1.0 | — | — | — | — | — | — |
| Electrolytic solution No. 9-4 |  | 1.0 |  | 1.0 | — | — | — | — | — | — |
| Electrolytic solution No. 9-5 |  | 3.0 |  | 1.0 | — | — | — | — | — | — |
| Electrolytic solution No. 9-6 |  | 5.0 |  | 1.0 | — | — | — | — | — | — |
| Electrolytic solution No. 9-7 | (1a-Cis) | 1.0 | Lithium difluorophosphate | 0.05 | — | — | — | — | — | — |
| Electrolytic solution No. 9-8 |  | 1.0 |  | 0.1 | — | — | — | — | — | — |
| Electrolytic solution No. 9-9 |  | 1.0 |  | 0.5 | — | — | — | — | — | — |
| Electrolytic solution No. 9-10 |  | 1.0 |  | 2.0 | — | — | — | — | — | — |
| Electrolytic solution No. 9-11 |  | 1.0 |  | 5.0 | — | — | — | — | — | — |
| Electrolytic solution No. 9-12 | (1a-Cis) | 1.0 | Lithium difluorophosphate | 1.0 | (1a-Trans) | 0.002 | 0.002 | — | — | — |
| Electrolytic solution No. 9-13 |  | 1.0 |  | 1.0 |  | 0.004 | 0.004 | — | — | — |
| Electrolytic solution No. 9-14 |  | 1.0 |  | 1.0 |  | 0.01 | 0.01 | — | — | — |
| Electrolytic solution No. 9-15 | (1a-Cis) | 1.0 | Lithium difluorophosphate | 1.0 | — | — | — | (5a-Tetra) | 0.07 | 0.07 |
| Electrolytic solution No. 9-16 |  | 1.0 |  | 1.0 | — | — | — |  | 0.14 | 0.14 |
| Electrolytic solution No. 9-17 |  | 1.0 |  | 1.0 | — | — | — |  | 0.20 | 0.20 |
| Electrolytic solution No. 9-18 | (1a-Cis) | 0.5 | Lithium difluorophosphate | 0.2 | (1a-Trans) | 0.001 | 0.002 | (5a-Tetra) | 0.035 | 0.07 |
| Electrolytic solution No. 9-19 |  | 0.5 |  | 1.0 |  | 0.0025 | 0.005 |  | 0.06 | 0.12 |
| Electrolytic solution No. 9-20 |  | 1.0 |  | 0.2 |  | 0.002 | 0.002 |  | 0.07 | 0.07 |
| Electrolytic solution No. 9-21 |  | 1.0 |  | 1.0 |  | 0.004 | 0.004 |  | 0.14 | 0.14 |
| Electrolytic solution No. 9-22 |  | 1.0 |  | 3.0 |  | 0.01 | 0.01 |  | 0.20 | 0.20 |
| Electrolytic solution No. 9-23 |  | 3.0 |  | 1.0 |  | 0.015 | 0.005 |  | 0.36 | 0.12 |
| Electrolytic solution No. 9-24 |  | 3.0 |  | 3.0 |  | 0.03 | 0.01 |  | 0.60 | 0.20 |
| Electrolytic solution No. 9-25 | (1a-Cis) (1b-Cis) | 0.5 0.5 | Lithium difluorophosphate | 1.0 | (1a-Trans) | 0.004 | 0.004 | (5a-Tetra) | 0.14 | 0.14 |
| Electrolytic solution No. 9-26 | (1a-Cis) | 1.0 | Lithium difluorophosphate (II-2-1) | 0.5 0.5 | (1a-Trans) | 0.004 | 0.004 | (5a-Tetra) | 0.14 | 0.14 |
| Electrolytic solution No. 9-27 | (1a-Cis) | 1.0 | Lithium difluorophosphate | 1.0 | (1a-Trans) (1b-Trans) | 0.002 0.002 | 0.002 0.002 | (5a-Tetra) | 0.14 | 0.14 |
| Electrolytic solution No. 9-28 | (1a-Cis) | 1.0 | Lithium difluorophosphate | 1.0 | (1a-Trans) | 0.004 | 0.004 | (5a-Tetra) (5b-Tetra) | 0.07 0.07 | 0.07 0.07 |
| Electrolytic solution No. 9-29 | (1b-Cis) | 1.0 | Lithium difluorophosphate | 1.0 | (1a-Trans) | 0.004 | 0.004 | (5a-Tetra) | 0.14 | 0.14 |
| Electrolytic solution No. 9-30 | (1a-Cis) | 1.0 | difluorophosphate | 1.0 | (1b-Trans) | 0.004 | 0.004 | (5a-Tetra) | 0.14 | 0.14 |
| Electrolytic solution No. 9-31 | (1a-Cis) | 1.0 |  | 1.0 | (1a-Trans) | 0.004 | 0.004 | (5b-Tetra) | 0.14 | 0.14 |
| Comparative electrolytic solution No. 9-1 | — | — | Lithium difluorophosphate | 1.0 | — | — | — | — | — | — |
| Comparative electrolytic solution No. 9-2 | — | — | Lithium difluorophosphate | 1.0 | (1a-Trans) | 1.0 | — | — | — | — |
| Comparative electrolytic solution No. 9-3 | — | — | Lithium difluorophosphate | 1.0 | (1a-Trans) | 1.0 | — | (5a-Tetra) | 0.14 | — |

TABLE 18

(Positive electrode; NMC Negative electrode; Graphite)

| | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 9-1 | Electrolytic solution No. 9-1 | 133.7 | 139.9 | 115.9 |
| Example 9-2 | Electrolytic solution No. 9-2 | 137.6 | 144.8 | 119.9 |
| Example 9-3 | Electrolytic solution No. 9-3 | 139.9 | 148.1 | 123.0 |
| Example 9-4 | Electrolytic solution No. 9-4 | 141.6 | 149.9 | 123.4 |
| Example 9-5 | Electrolytic solution No. 9-5 | 140.6 | 148.5 | 122.6 |
| Example 9-6 | Electrolytic solution No. 9-6 | 134.8 | 138.4 | 115.7 |
| Example 9-7 | Electrolytic solution No. 9-7 | 135.9 | 139.6 | 116.2 |
| Example 9-8 | Electrolytic solution No. 9-8 | 139.0 | 148.9 | 117.1 |
| Example 9-9 | Electrolytic solution No. 9-9 | 140.6 | 149.8 | 123.3 |
| Example 9-10 | Electrolytic solution No. 9-10 | 140.5 | 148.4 | 122.6 |
| Example 9-11 | Electrolytic solution No. 9-11 | 136.0 | 139.3 | 115.5 |
| Example 9-12 | Electrolytic solution No. 9-12 | 141.9 | 150.5 | 124.0 |
| Example 9-13 | Electrolytic solution No. 9-13 | 143.7 | 151.2 | 124.3 |
| Example 9-14 | Electrolytic solution No. 9-14 | 145.1 | 150.2 | 124.4 |
| Example 9-15 | Electrolytic solution No. 9-15 | 142.7 | 150.0 | 124.2 |
| Example 9-16 | Electrolytic solution No. 9-16 | 143.7 | 150.7 | 124.5 |
| Example 9-17 | Electrolytic solution No. 9-17 | 144.0 | 150.4 | 125.0 |
| Example 9-18 | Electrolytic solution No. 9-18 | 133.9 | 146.3 | 122.9 |
| Example 9-19 | Electrolytic solution No. 9-19 | 140.0 | 148.2 | 123.3 |
| Example 9-20 | Electrolytic solution No. 9-20 | 140.8 | 148.5 | 123.5 |
| Example 9-21 | Electrolytic solution No. 9-21 | 145.2 | 152.8 | 125.0 |
| Example 9-22 | Electrolytic solution No. 9-22 | 140.8 | 149.9 | 124.0 |
| Example 9-23 | Electrolytic solution No. 9-23 | 140.7 | 148.8 | 123.3 |
| Example 9-24 | Electrolytic solution No. 9-24 | 135.5 | 144.1 | 118.5 |
| Example 9-25 | Electrolytic solution No. 9-25 | 144.1 | 152.7 | 124.4 |
| Example 9-26 | Electrolytic solution No. 9-26 | 143.7 | 151.9 | 124.8 |
| Example 9-27 | Electrolytic solution No. 9-27 | 144.8 | 153.3 | 124.9 |
| Example 9-28 | Electrolytic solution No. 9-28 | 143.8 | 152.9 | 124.0 |
| Example 9-29 | Electrolytic solution No. 9-29 | 143.7 | 151.6 | 123.9 |
| Example 9-30 | Electrolytic solution No. 9-30 | 143.7 | 151.9 | 124.3 |
| Example 9-31 | Electrolytic solution No. 9-31 | 144.3 | 151.7 | 123.3 |
| Comparative Example 9-1 | Comparative electrolytic solution No. 9-1 | 126.4 | 130.0 | 107.2 |
| Comparative Example 9-2 | Comparative electrolytic solution No. 9-2 | 131.7 | 134.9 | 114.9 |
| Comparative Example 9-3 | Comparative electrolytic solution No. 9-3 | 132.6 | 135.6 | 115.7 |

TABLE 19

| Electrolytic solution No, | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 10-1 | (1a-Cis) | 0.05 | (II-9-2) | 0.5 | — | — | — | — | — | — |
| Electrolytic solution No. 10-2 | | 0.1 | | 0.5 | — | — | — | — | — | — |
| Electrolytic solution No. 10-3 | | 0.8 | | 0.5 | — | — | — | — | — | — |
| Electrolytic solution No. 10-4 | | 1.0 | | 0.5 | — | — | — | — | — | — |
| Electrolytic solution No. 10-5 | | 3.0 | | 0.5 | — | — | — | — | — | — |
| Electrolytic solution No. 10-6 | | 5.0 | | 0.5 | — | — | — | — | — | — |
| Electrolytic solution No. 10-7 | (1a-Cis) | 1.0 | (II-9-2) | 0.05 | — | — | — | — | — | — |
| Electrolytic solution No. 10-8 | | 1.0 | | 0.1 | — | — | — | — | — | — |
| Electrolytic solution No. 10-9 | | 1.0 | | 0.2 | — | — | — | — | — | — |
| Electrolytic solution No. 10-10 | | 1.0 | | 1.0 | — | — | — | — | — | — |
| Electrolytic solution No. 10-11 | | 1.0 | | 3.0 | — | — | — | — | — | — |
| Electrolytic solution No. 10-12 | (1a-Cis) | 1.0 | (II-9-2) | 0.5 | (1a-Trans) | 0.002 | 0.002 | — | — | — |
| Electrolytic solution No. 10-13 | | 1.0 | | 0.5 | | 0.004 | 0.004 | — | — | — |
| Electrolytic solution No. 10-14 | | 1.0 | | 0.5 | | 0.01 | 0.01 | — | — | — |
| Electrolytic solution No. 10-15 | (1a-Cis) | 1.0 | (II-9-2) | 0.5 | — | — | — | (5a-Tetra) | 0.07 | 0.07 |
| Electrolytic solution No. 10-16 | | 1.0 | | 0.5 | — | — | — | | 0.14 | 0.14 |
| Electrolytic solution No. 10-17 | | 1.0 | | 0.5 | — | — | — | | 0.20 | 0.20 |
| Electrolytic solution No. 10-18 | (1a-Cis) | 0.5 | (II-9-2) | 0.1 | (1a-Trans) | 0.001 | 0.002 | (5a-Tetra) | 0.035 | 0.07 |
| Electrolytic solution No. 10-19 | | 0.5 | | 0.5 | | 0.0025 | 0.005 | | 0.06 | 0.12 |
| Electrolytic solution No. 10-20 | | 1.0 | | 0.1 | | 0.002 | 0.002 | | 0.07 | 0.07 |
| Electrolytic solution No. 10-21 | | 1.0 | | 0.5 | | 0.004 | 0.004 | | 0.14 | 0.14 |
| Electrolytic solution No. 10-22 | | 1.0 | | 1.0 | | 0.01 | 0.01 | | 0.20 | 0.20 |
| Electrolytic solution No. 10-23 | | 3.0 | | 0.5 | | 0.015 | 0.005 | | 0.36 | 0.12 |

TABLE 19-continued

| Electrolytic solution No, | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 10-24 | | 3.0 | | 1.0 | | 0.03 | 0.01 | | 0.60 | 0.20 |
| Electrolytic solution No. 10-25 | (1a-Cis) (1b-Cis) | 0.5 0.5 | (II-9-2) | 0.5 | (1a-Trans) | 0.004 | 0.004 | (5a-Tetra) | 0.14 | 0.14 |
| Electrolytic solution No. 10-26 | (1a-Cis) | 1.0 | (II-9-2) (II-2-1) | 0.25 0.25 | (1a-Trans) | 0.004 | 0.004 | (5a-Tetra) | 0.14 | 0.14 |
| Electrolytic solution No. 10-27 | (1a-Cis) | 1.0 | (II-9-2) | 0.5 | (1a-Trans) (1b-Trans) | 0.002 0.002 | 0.002 0.002 | (5a-Tetra) | 0.14 | 0.14 |
| Electrolytic solution No. 10-28 | (1a-Cis) | 1.0 | (II-9-2) | 0.5 | (1a-Trans) | 0.004 | 0.004 | (5a-Trans) (5b-Trans) | 0.07 0.07 | 0.07 0.07 |
| Electrolytic solution No. 10-29 | (1b-Cis) | 1.0 | (II-9-2) | 0.5 | (1a-Trans) | 0.004 | 0.004 | (5a-Tetra) | 0.14 | 0.14 |
| Electrolytic solution No. 10-30 | (1a-Cis) | 1.0 | | 0.5 | (1b-Trans) | 0.004 | 0.004 | (5a-Tetra) | 0.14 | 0.14 |
| Electrolytic solution No. 10-31 | (1a-Cis) | 1.0 | | 0.5 | (1a-Trans) | 0.004 | 0.004 | (5b-Tetra) | 0.14 | 0.14 |
| Comparative electrolytic solution No. 10-1 | — | — | (II-9-2) | 0.5 | — | — | — | — | — | — |
| Comparative electrolytic solution No. 10-2 | — | — | (II-9-2) | 0.5 | (1a-Trans) | 1.0 | — | — | — | — |
| Comparative electrolytic solution No. 10-3 | — | — | (II-9-2) | 0.5 | (1a-Trans) | 1.0 | — | (5a-Tetra) | 0.14 | — |

TABLE 20

(Positive electrode; NMC Negative electrode; Graphite)

| | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 10-1 | Electrolytic solution No. 10-1 | 136.8 | 143.1 | 118.6 |
| Example 10-2 | Electrolytic solution No. 10-2 | 141.1 | 148.5 | 123.0 |
| Example 10-3 | Electrolytic solution No. 10-3 | 144.2 | 152.7 | 126.8 |
| Example 10-4 | Electrolytic solution No. 10-4 | 146.2 | 154.7 | 127.4 |
| Example 10-5 | Electrolytic solution No. 10-5 | 143.6 | 151.6 | 125.2 |
| Example 10-6 | Electrolytic solution No. 10-6 | 137.5 | 141.2 | 118.0 |
| Example 10-7 | Electrolytic solution No. 10-7 | 137.6 | 141.3 | 117.6 |
| Example 10-8 | Electrolytic solution No. 10-8 | 141.0 | 151.0 | 118.8 |
| Example 10-9 | Electrolytic solution No. 10-9 | 142.9 | 152.2 | 125.3 |
| Example 10-10 | Electrolytic solution No. 10-10 | 143.3 | 151.3 | 125.0 |
| Example 10-11 | Electrolytic solution No. 10-11 | 139.0 | 142.3 | 117.9 |
| Example 10-12 | Electrolytic solution No. 10-12 | 145.4 | 154.3 | 127.2 |
| Example 10-13 | Electrolytic solution No. 10-13 | 148.0 | 155.7 | 128.0 |
| Example 10-14 | Electrolytic solution No. 10-14 | 150.2 | 155.5 | 128.8 |
| Example 10-15 | Electrolytic solution No. 10-15 | 148.2 | 155.9 | 129.0 |
| Example 10-16 | Electrolytic solution No. 10-16 | 148.8 | 156.0 | 128.9 |
| Example 10-17 | Electrolytic solution No. 10-17 | 149.6 | 156.2 | 129.2 |
| Example 10-18 | Electrolytic solution No. 10-18 | 139.7 | 152.6 | 128.2 |
| Example 10-19 | Electrolytic solution No. 10-19 | 146.3 | 154.8 | 128.8 |
| Example 10-20 | Electrolytic solution No. 10-20 | 146.7 | 154.8 | 128.7 |
| Example 10-21 | Electrolytic solution No. 10-21 | 150.7 | 158.6 | 129.7 |
| Example 10-22 | Electrolytic solution No. 10-22 | 146.2 | 155.6 | 128.7 |
| Example 10-23 | Electrolytic solution No. 10-23 | 146.6 | 155.1 | 128.5 |
| Example 10-24 | Electrolytic solution No. 10-24 | 141.1 | 150.0 | 123.4 |
| Example 10-25 | Electrolytic solution No. 10-25 | 150.6 | 159.6 | 130.0 |
| Example 10-26 | Electrolytic solution No. 10-26 | 148.5 | 157.1 | 129.0 |
| Example 10-27 | Electrolytic solution No. 10-27 | 149.4 | 158.2 | 128.9 |
| Example 10-28 | Electrolytic solution No. 10-28 | 148.0 | 157.4 | 127.6 |
| Example 10-29 | Electrolytic solution No. 10-29 | 147.8 | 155.8 | 127.3 |
| Example 10-30 | Electrolytic solution No. 10-30 | 148.7 | 157.2 | 128.6 |
| Example 10-31 | Electrolytic solution No. 10-31 | 149.3 | 157.0 | 127.6 |
| Comparative Example 10-1 | Comparative electrolytic solution No. 10-1 | 131.9 | 135.7 | 111.9 |
| Comparative Example 10-2 | Comparative electrolytic solution No. 10-2 | 137.8 | 141.1 | 120.2 |
| Comparative Example 10-3 | Comparative electrolytic solution No. 10-3 | 138.8 | 141.9 | 121.1 |

Regarding Examples 3 to 10

From the results described above, Examples 3-1 to 3-31, Examples 4-1 to 4-31, Examples 5-1 to 5-31, Examples 6-1 to 6-31, Examples 7-1 to 7-31, Examples 8-1 to 8-31, Examples 9-1 to 9-31, and Examples 10-1 to 10-31 had a similar tendency as in Examples 2-1 to 2-31.

That is, the nonaqueous electrolytic solution batteries including the difluoro ionic complex (1a-Cis) in the cis configuration from Synthesis Example 1 and the group (II) compound were found to improve all of Evaluations 1 to 3 as compared with the nonaqueous electrolytic solution battery including neither the ionic complex nor the group (II) compound (Comparative Example 1-1).

Further, the nonaqueous electrolytic solution battery including (1a-Cis) and the group (II) compound was found to improve all of Evaluations 1 to 3 as compared with the nonaqueous electrolytic solution battery including (1a-Cis) only or the group (II) compound only.

Further, the nonaqueous electrolytic solution battery including the difluoro ionic complex (1a-Cis) in the cis configuration and the group (II) compound was found to improve all of Evaluations 1 to 3 as compared with the nonaqueous electrolytic solution battery including the difluoro ionic complex (1a-Trans) in the trans configuration and the group (II) compound.

TABLE 21

| Electrolytic solution No, | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 11-1 | (1a-Cis) | 1.0 | (II-9-1) | 0.5 | — | — | — | — | — | — |
| Electrolytic solution No. 11-2 | | 1.0 | | 0.5 | (1a-Trans) | 0.004 | 0.004 | (5a-Tetra) | 0.14 | 0.14 |
| Electrolytic solution No. 11-3 | | 1.0 | (II-9-3) | 0.5 | — | — | — | — | — | — |
| Electrolytic solution No. 11-4 | | 1.0 | | 0.5 | (1a-Trans) | 0.004 | 0.004 | (5a-Tetra) | 0.14 | 0.14 |
| Electrolytic solution No. 11-5 | | 1.0 | (II-9-6) | 0.5 | — | — | — | — | — | — |
| Electrolytic solution No. 11-6 | | 1.0 | | 0.5 | (1a-Trans) | 0.004 | 0.004 | (5a-Tetra) | 0.14 | 0.14 |
| Electrolytic solution No. 11-7 | | 1.0 | (II-9-7) | 0.5 | — | — | — | — | — | — |
| Electrolytic solution No. 11-8 | | 1.0 | | 0.5 | (1a-Trans) | 0.004 | 0.004 | (5a-Tetra) | 0.14 | 0.14 |
| Electrolytic solution No. 11-9 | | 1.0 | (II-9-15) | 0.5 | — | — | — | — | — | — |
| Electrolytic solution No. 11-10 | | 1.0 | | 0.5 | (1a-Trans) | 0.004 | 0.004 | (5a-Tetra) | 0.14 | 0.14 |
| Electrolytic solution No. 11-11 | | 1.0 | (II-9-16) | 0.5 | — | — | — | — | — | — |
| Electrolytic solution No. 11-12 | | 1.0 | | 0.5 | (1a-Trans) | 0.004 | 0.004 | (5a-Tetra) | 0.14 | 0.14 |
| Electrolytic solution No. 11-13 | | 1.0 | (II-9-20) | 0.5 | — | — | — | — | — | — |
| Electrolytic solution No. 11-14 | | 1.0 | | 0.5 | (1a-Trans) | 0.004 | 0.004 | (5a-Tetra) | 0.14 | 0.14 |
| Electrolytic solution No. 11-15 | | 1.0 | (II-9-21) | 0.5 | — | — | — | — | — | — |
| Electrolytic solution No. 11-16 | | 1.0 | | 0.5 | (1a-Trans) | 0.004 | 0.004 | (5a-Tetra) | 0.14 | 0.14 |
| Comparative electrolytic solution No. 11-1 | — | — | (II-9-1) | 0.5 | (1a-Trans) | 1.0 | — | — | — | — |
| Comparative electrolytic solution No. 11-2 | — | — | (II-9-3) | 0.5 | (1a-Trans) | 1.0 | — | — | — | — |
| Comparative electrolytic solution No. 11-3 | — | — | (II-9-6) | 0.5 | (1a-Trans) | 1.0 | — | — | — | — |
| Comparative electrolytic solution No. 11-4 | — | — | (II-9-7) | 0.5 | (1a-Trans) | 1.0 | — | — | — | — |
| Comparative electrolytic solution No. 11-5 | — | — | (II-9-15) | 0.5 | (1a-Trans) | 1.0 | — | — | — | — |
| Comparative electrolytic solution No. 11-6 | — | — | (II-9-16) | 0.5 | (1a-Trans) | 1.0 | — | — | — | — |
| Comparative electrolytic solution No. 11-7 | — | — | (II-2-20) | 0.5 | (1a-Trans) | 1.0 | — | — | — | — |
| Comparative electrolytic solution No. 11-8 | — | — | (II-2-21) | 0.5 | (1a-Trans) | 1.0 | — | — | — | — |

TABLE 22

(Positive electrode; NMC Negative electrode; Graphite)

| | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 11-1 | Electrolytic solution No. 11-1 | 136.5 | 144.5 | 119.0 |
| Example 11-2 | Electrolytic solution No. 11-2 | 143.8 | 151.3 | 123.8 |
| Example 11-3 | Electrolytic solution No. 11-3 | 134.9 | 142.8 | 117.6 |
| Example 11-4 | Electrolytic solution No. 11-4 | 142.1 | 149.6 | 122.3 |
| Example 11-5 | Electrolytic solution No. 11-5 | 154.0 | 163.0 | 134.3 |
| Example 11-6 | Electrolytic solution No. 11-6 | 163.2 | 171.8 | 140.5 |
| Example 11-7 | Electrolytic solution No. 11-7 | 138.0 | 146.0 | 120.2 |
| Example 11-8 | Electrolytic solution No. 11-8 | 144.4 | 151.9 | 124.3 |
| Example 11-9 | Electrolytic solution No. 11-9 | 136.1 | 144.0 | 118.6 |

TABLE 22-continued (Positive electrode; NMC Negative electrode; Graphite)

|  | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 11-10 | Electrolytic solution No. 11-10 | 141.7 | 149.1 | 122.0 |
| Example 11-11 | Electrolytic solution No. 11-11 | 144.5 | 153.0 | 126.0 |
| Example 11-12 | Electrolytic solution No. 11-12 | 149.7 | 157.5 | 128.8 |
| Example 11-13 | Electrolytic solution No. 11-13 | 149.4 | 158.1 | 130.2 |
| Example 11-14 | Electrolytic solution No. 11-14 | 164.0 | 172.5 | 141.2 |
| Example 11-15 | Electrolytic solution No. 11-15 | 138.4 | 146.5 | 120.6 |
| Example 11-16 | Electrolytic solution No. 11-16 | 144.4 | 151.9 | 124.3 |
| Comparative Example 11-1 | Comparative electrolytic solution No. 11-1 | 131.5 | 134.6 | 114.7 |
| Comparative Example 11-2 | Comparative electrolytic solution No. 11-2 | 130.6 | 133.8 | 114.0 |
| Comparative Example 11-3 | Comparative electrolytic solution No. 11-3 | 150.2 | 153.8 | 131.0 |
| Comparative Example 11-4 | Comparative electrolytic solution No. 11-4 | 133.1 | 136.3 | 116.1 |
| Comparative Example 11-5 | Comparative electrolytic solution No. 11-5 | 132.0 | 135.2 | 115.2 |
| Comparative Example 11-6 | Comparative electrolytic solution No. 11-6 | 133.3 | 136.4 | 116.3 |
| Comparative Example 11-7 | Comparative electrolytic solution No. 11-7 | 145.2 | 148.7 | 126.7 |
| Comparative Example 11-8 | Comparative electrolytic solution No. 11-8 | 135.6 | 138.8 | 118.3 |

Regarding Examples 11-1 to 11-16

Comparison of Example 11-1 with Comparative Example 11-1 revealed that the nonaqueous electrolytic solution battery including the difluoro ionic complex (1a-Cis) in the cis configuration and the silane compound (11-9-1) demonstrated better results as compared with the nonaqueous electrolytic solution battery including the difluoro ionic complex (1a-Trans) in the trans configuration and (11-9-1). Further, Example 11-2 revealed that the nonaqueous electrolytic solution battery including (1a-Cis), (11-9-1), (1a-Trans), and (5a-Tetra) demonstrated much better results. Also, comparison of Examples 11-3 to 11-16, using various silane compounds belonging to (II-9), with Comparative Examples 11-2 to 11-8, using the respective various silane compounds, revealed that the nonaqueous electrolytic solution batteries including the difluoro ionic complex (1a-Cis) in the cis configuration and the various silane compounds belonging to (II-9) demonstrated better results as compared with the nonaqueous electrolytic solution batteries including the difluoro ionic complex (1a-Trans) in the trans configuration and the corresponding various silane compounds.

Example 12-Positive Electrode:NCA Positive Electrode

With regard to Example 12 and Comparative Example 12, a positive-electrode active material ($LiNi_{0.85}Co_{0.10}Al_{0.05}O_2$ (NCA)) was used place of the positive-electrode active material (NMC) used in Example 1.

<Production of NCA Positive Electrode>

A $LiNi_{0.85}Co_{0.10}Al_{0.05}O_2$(NCA) powder (Todakogyo Corp.) and acetylene black (electrically conductive agent) were dry-mixed, and uniformly dispersed and mixed into NMP where PVDF as a binding agent was pre-dissolved, and NMP for adjusting the viscosity was further added to prepare a NCA mixture paste. The resulting paste was applied to an aluminum foil (current collector), dried, and pressurized. Then the aluminum foil was processed into a predetermined size to obtain a test NCA positive electrode. The ratio of solid contents in the positive electrode was NCA:electrically conductive agent:PVDF=85:5:10 (by the mass ratio).

<Production of Nonaqueous Electrolytic Solution Batteries>

Aluminum laminate housing cells (with a capacity of 30 mAh) including the above test NMC positive electrode, the test graphite negative electrode, and a cellulose separator were respectively impregnated with one of the various nonaqueous electrolytic solutions and the various comparative electrolytic solutions shown in Table 23 to produce the nonaqueous electrolytic solution batteries according to Example 12 and Comparative Example 12. It is noted that Table 23 summarizes the compositions of the above electrolytic solutions.

TABLE 23

| Electrolytic solution No, | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 1-4 | (1a-Cis) | 1.0 | (II-1-1) | 2.0 | — | — | — | — | — | — |
| Electrolytic solution No. 1-13 |  |  |  |  | (1a-Trans) | 0.004 | 0.004 | — | — | — |
| Electrolytic solution No. 1-16 |  |  |  |  | — | — | — | (5a-Tetra) | 0.14 | 0.14 |
| Electrolytic solution No. 1-21 |  |  |  |  | (1a-Trans) | 0.004 | 0.004 |  | 0.14 | 0.14 |

TABLE 23-continued

| Electrolytic solution No, | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 2-4 | (1a-Cis) | 1.0 | (II-2-1) | 1.0 | — | — | — | — | — | — |
| Electrolytic solution No. 2-13 | | | | | (1a-Trans) | 0.004 | 0.004 | — | — | — |
| Electrolytic solution No. 2-16 | | | | | — | — | — | (5a-Tetra) | 0.14 | 0.14 |
| Electrolytic solution No. 2-21 | | | | | (1a-Trans) | 0.004 | 0.004 | | 0.14 | 0.14 |
| Electrolytic solution No. 3-4 | (1a-Cis) | 1.0 | (II-3-1) | 3.0 | — | — | — | — | — | — |
| Electrolytic solution No. 3-13 | | | | | (1a-Trans) | 0.004 | 0.004 | — | — | — |
| Electrolytic solution No. 3-16 | | | | | — | — | — | (5a-Tetra) | 0.14 | 0.14 |
| Electrolytic solution No. 3-21 | | | | | (1a-Trans) | 0.004 | 0.004 | | 0.14 | 0.14 |
| Electrolytic solution No. 5-4 | (1a-Cis) | 1.0 | (II-5-1) | 1.0 | — | — | — | — | — | — |
| Electrolytic solution No. 5-13 | | | | | (1a-Trans) | 0.004 | 0.004 | — | — | — |
| Electrolytic solution No. 5-16 | | | | | — | — | — | (5a-Tetra) | 0.14 | 0.14 |
| Electrolytic solution No. 5-21 | | | | | (1a-Trans) | 0.004 | 0.004 | | 0.14 | 0.14 |
| Electrolytic solution No. 9-4 | (1a-Cis) | 1.0 | Lithium difluorophosphate | 1.0 | — | — | — | — | — | — |
| Electrolytic solution No. 9-13 | | | | | (1a-Trans) | 0.004 | 0.004 | — | — | — |
| Electrolytic solution No. 9-16 | | | | | — | — | — | (5a-Tetra) | 0.14 | 0.14 |
| Electrolytic solution No. 9-21 | | | | | (1a-Trans) | 0.004 | 0.004 | | 0.14 | 0.14 |
| Electrolytic solution No. 10-4 | (1a-Cis) | 1.0 | (II-9-2) | 0.5 | — | — | — | — | — | — |
| Electrolytic solution No. 10-13 | | | | | (1a-Trans) | 0.004 | 0.004 | — | — | — |
| Electrolytic solution No. 10-16 | | | | | — | — | — | (5a-Tetra) | 0.14 | 0.14 |
| Electrolytic solution No. 10-21 | | | | | (1a-Trans) | 0.004 | 0.004 | | 0.14 | 0.14 |
| Comparative electrolytic solution No. 1-1 | — | — | — | — | — | — | — | — | — | — |
| Comparative electrolytic solution No. 1-2 | (1a-Cis) | 1.0 | — | — | — | — | — | — | — | — |
| Comparative electrolytic solution No. 1-4 | — | — | (II-1-1) | 2.0 | — | — | — | — | — | — |
| Comparative electrolytic solution No. 1-6 | | | | | (1a-Trans) | 1.0 | — | (5a-Tetra) | 0.14 | — |
| Comparative electrolytic solution No. 2-1 | | | (II-2-1) | 1.0 | — | — | — | — | — | — |
| Comparative electrolytic solution No. 2-3 | | | | | (1a-Trans) | 1.0 | — | (5a-Tetra) | 0.14 | — |
| Comparative electrolytic solution No. 3-1 | | | (II-3-1) | 3.0 | — | — | — | — | — | — |
| Comparative electrolytic solution No. 3-3 | | | | | (1a-Trans) | 1.0 | — | (5a-Tetra) | 0.14 | — |
| Comparative electrolytic solution No. 5-1 | | | (II-5-1) | 1.0 | — | — | — | — | — | — |
| Comparative electrolytic solution No. 5-3 | | | | | (1a-Trans) | 1.0 | — | (5a-Tetra) | 0.14 | — |
| Comparative electrolytic solution No. 9-1 | | | Lithium difluorophosphate | 1.0 | — | — | — | — | — | — |
| Comparative electrolytic solution No. 9-3 | | | | | (1a-Trans) | 1.0 | — | (5a-Tetra) | 0.14 | — |
| Comparative electrolytic solution No. 10-1 | | | (II-9-2) | 0.5 | — | — | — | — | — | — |
| Comparative electrolytic solution No. 10-3 | | | | | (1a-Trans) | 1.0 | — | (5a-Tetra) | 0.14 | — |

Example 12 and Comparative Example 12: Evaluation of Test Cells

<Evaluation 1> Low-Temperature Property (0° C.) after 500 Cycles at 60° C.

Each of the nonaqueous electrolytic solution batteries according to Example 12 and Comparative Example 12 was evaluated as in Evaluation 1 performed for the nonaqueous electrolytic solution battery according to Example 1-1. However, the charge upper limit voltage was changed from 4.3 V to 4.2 V in the initial charge and discharge as conditioning at an environmental temperature of 25° C. and in the charge-discharge cycle. Furthermore, after this conditioning, the charge upper limit voltage was changed from 4.3 V to 4.2 V when performing 500 cycles at an environmental temperature of 60° C. Moreover, constant-current and constant-voltage charge was performed to 4.2 V instead of 4.3 at 0° C. and a 0.2 C rate. The capacity obtained at that time was considered as the low-temperature property (0° C.) after prolonged cycles at 60° C.

<Evaluation 2> 5 C-Rate Characteristic after 500 Cycles at 60° C.

Each of the nonaqueous electrolytic solution batteries according to Example 12 and Comparative Example 12 was evaluated as in Evaluation 2 preformed for the nonaqueous electrolytic solution battery according to Example 1-1. However, constant-current and constant-voltage charge was performed to 4.2 V instead of 4.3 V at 25° C. and a 5 C rate. The capacity obtained at that time was considered as the 5 C-rate characteristic (25° C.) after prolonged cycles at 60° C.

<Evaluation 3> Low-Temperature Property (0° C.) after Stored at 60° C.

For each of the nonaqueous electrolytic solution batteries according to Example 12 and Comparative Example 12, storage tests were performed at an environmental temperature of 60° C. (stored for 10 days after constant-current and constant-voltage charge to 4.2 V instead of 4.3 V), which was Evaluation 3 performed for the nonaqueous electrolytic solution battery according to Example 1-1. However, constant-current and constant-voltage charge was performed to 4.2 V instead of 4.3 V at 0° C. and a 2 C rate. The capacity obtained at that time was considered as the low-temperature property (0° C.) after stored at 60° C.

Various evaluations of the nonaqueous electrolytic solution batteries according to Example 12 and Comparative Example 12 are shown in Table 24 as relative values when the corresponding evaluations of the nonaqueous electrolytic solution battery according to Comparative Example 12-1 are taken as 100.

Example 13-Positive Electrode:LMO Positive Electrode

With regard to Example 13, a $LiMn_{1.95}Al_{0.05}O_4$(LMO) powder as a lithium-manganese composite oxide having a spinel structure was used as a positive-electrode active material in place of the positive-electrode active material ($LiNi_{0.85}Co_{0.10}Al_{0.05}O_2$(NCA)) used in Example 12.

<Production of LMO Positive Electrode>

A $LiMn_{1.95}Al_{0.05}O_4$(LMO) powder (Todakogyo Corp.) and acetylene black (electrically conductive agent) were dry-mixed, and uniformly dispersed and mixed into NMP where PVDF as a binding agent was pre-dissolved, and NMP for adjusting the viscosity was further added to prepare

TABLE 24

(Positive electrode; NCA Negative electrode; Graphite)

|  | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 12-1 | Electrolytic solution No. 1-4 | 141.1 | 152.3 | 118.9 |
| Example 12-2 | Electrolytic solution No. 1-13 | 143.2 | 153.6 | 119.8 |
| Example 12-3 | Electrolytic solution No. 1-16 | 143.2 | 153.1 | 119.7 |
| Example 12-4 | Electrolytic solution No. 1-21 | 144.7 | 155.2 | 120.4 |
| Example 12-5 | Electrolytic solution No. 2-4 | 153.6 | 165.5 | 131.4 |
| Example 12-6 | Electrolytic solution No. 2-13 | 155.8 | 166.9 | 132.4 |
| Example 12-7 | Electrolytic solution No. 2-16 | 155.9 | 166.4 | 132.3 |
| Example 12-8 | Electrolytic solution No. 2-21 | 157.5 | 168.7 | 133.1 |
| Example 12-9 | Electrolytic solution No. 3-4 | 150.8 | 160.2 | 130.2 |
| Example 12-10 | Electrolytic solution No. 3-13 | 153.0 | 161.6 | 131.2 |
| Example 12-11 | Electrolytic solution No. 3-16 | 153.1 | 161.1 | 131.0 |
| Example 12-12 | Electrolytic solution No. 3-21 | 154.7 | 163.3 | 131.8 |
| Example 12-13 | Electrolytic solution No. 5-4 | 143.3 | 149.7 | 120.2 |
| Example 12-14 | Electrolytic solution No. 5-13 | 145.4 | 150.9 | 121.2 |
| Example 12-15 | Electrolytic solution No. 5-16 | 145.5 | 150.5 | 121.0 |
| Example 12-16 | Electrolytic solution No. 5-21 | 147.0 | 152.4 | 121.8 |
| Example 12-17 | Electrolytic solution No. 9-4 | 142.5 | 152.9 | 122.7 |
| Example 12-18 | Electrolytic solution No. 9-13 | 144.6 | 156.3 | 123.6 |
| Example 12-19 | Electrolytic solution No. 9-16 | 144.6 | 155.8 | 123.5 |
| Example 12-20 | Electrolytic solution No. 9-21 | 146.1 | 157.9 | 124.2 |
| Example 12-21 | Electrolytic solution No. 10-4 | 148.0 | 131.1 | 128.9 |
| Example 12-22 | Electrolytic solution No. 10-13 | 150.5 | 131.7 | 130.2 |
| Example 12-23 | Electrolytic solution No. 10-16 | 151.9 | 132.1 | 132.2 |
| Example 12-24 | Electrolytic solution No. 10-21 | 153.7 | 132.2 | 132.3 |
| Comparative Example 12-1 | Comparative electrolytic solution No. 1-1 | 100.0 | 100.0 | 100.0 |
| Comparative Example 12-2 | Comparative electrolytic solution No. 1-2 | 131.4 | 139.4 | 109.9 |
| Comparative Example 12-3 | Comparative electrolytic solution No. 1-4 | 125.6 | 132.5 | 103.4 |
| Comparative Example 12-4 | Comparative electrolytic solution No. 1-6 | 132.4 | 137.7 | 111.0 |
| Comparative Example 12-5 | Comparative electrolytic solution No. 2-1 | 137.1 | 143.6 | 114.1 |
| Comparative Example 12-6 | Comparative electrolytic solution No. 2-3 | 143.8 | 149.7 | 123.2 |
| Comparative Example 12-7 | Comparative electrolytic solution No. 3-1 | 134.6 | 139.0 | 113.0 |
| Comparative Example 12-8 | Comparative electrolytic solution No. 3-3 | 141.2 | 144.9 | 122.0 |
| Comparative Example 12-9 | Comparative electrolytic solution No. 5-1 | 129.7 | 122.9 | 113.0 |
| Comparative Example 12-10 | Comparative electrolytic solution No. 5-3 | 136.0 | 128.2 | 122.0 |
| Comparative Example 12-11 | Comparative electrolytic solution No. 9-1 | 127.2 | 134.4 | 106.5 |
| Comparative Example 12-12 | Comparative electrolytic solution No. 9-3 | 133.4 | 140.1 | 115.0 |
| Comparative Example 12-13 | Comparative electrolytic solution No. 10-1 | 132.9 | 139.6 | 112.6 |
| Comparative Example 12-14 | Comparative electrolytic solution No. 10-3 | 138.6 | 145.3 | 120.1 | a LMO mixture paste. The resulting paste was applied to an aluminum foil (current collector), dried, and pressurized. Then the aluminum foil was processed into a predetermined size to obtain a test LMO positive electrode. The ratio of solid contents in the positive electrode was LMO:electrically conductive agent:PVDF=85:5:10 (by the mass ratio).

<Production of Nonaqueous Electrolytic Solution Batteries>

Aluminum laminate housing cells (with a capacity of 30 mAh) including the above test LMO positive electrode, the test graphite negative electrode, and a separator consisting of a microporous polypropylene-polyethylene two-layer film in place of a cellulose separator were respectively impregnated with one of the various nonaqueous electrolytic solutions and the various comparative electrolytic solutions shown in Table 23 to produce the nonaqueous electrolytic solution batteries according to Examples 13-1 to 12-24 and Comparative Examples 13-1 to 13-14. It is noted that the production method was the same as that in Example 12-1 except that an electrode group was produced by facing the positive electrode and the negative electrode through the separator consisting of a microporous polypropylene-polyethylene two-layer film whose polypropylene side was arranged on the positive electrode side.

Each of these nonaqueous electrolytic solution electrolytic solution batteries was subjected to the following evaluations as described above as in Example 12 and Comparative Example 12.

<Evaluation 1> Low-temperature property (0° C.) after 500 cycles at 60° C.

<Evaluation 2> 5 C-rate characteristic after 500 cycles at 60° C.

<Evaluation 3> Low-temperature property (0° C.) after stored at 60° C.

Various evaluations of the nonaqueous electrolytic solution batteries according to Example 13 and Comparative Example 13 are shown in Table 25 as relative values when the corresponding evaluation results of the nonaqueous electrolytic solution battery according to Comparative Example 13-1 are taken as 100.

TABLE 25

(Positive electrode; LMO Negative electrode; Graphite)

| | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 13-1 | Electrolytic solution No. 1-4 | 137.0 | 147.8 | 116.3 |
| Example 13-2 | Electrolytic solution No. 1-13 | 139.0 | 149.1 | 117.2 |
| Example 13-3 | Electrolytic solution No. 1-16 | 139.0 | 148.6 | 117.0 |
| Example 13-4 | Electrolytic solution No. 1-21 | 140.5 | 150.7 | 117.8 |
| Example 13-5 | Electrolytic solution No. 2-4 | 149.1 | 160.7 | 128.5 |
| Example 13-6 | Electrolytic solution No. 2-13 | 151.3 | 162.0 | 129.5 |
| Example 13-7 | Electrolytic solution No. 2-16 | 151.3 | 161.6 | 129.4 |
| Example 13-8 | Electrolytic solution No. 2-21 | 152.9 | 163.8 | 130.2 |
| Example 13-9 | Electrolytic solution No. 3-4 | 146.4 | 155.5 | 127.3 |
| Example 13-10 | Electrolytic solution No. 3-13 | 148.5 | 156.9 | 128.3 |
| Example 13-11 | Electrolytic solution No. 3-16 | 148.6 | 156.4 | 128.1 |
| Example 13-12 | Electrolytic solution No. 3-21 | 150.1 | 158.6 | 128.9 |
| Example 13-13 | Electrolytic solution No. 5-4 | 141.0 | 137.5 | 127.3 |
| Example 13-14 | Electrolytic solution No. 5-13 | 143.1 | 138.7 | 128.3 |
| Example 13-15 | Electrolytic solution No. 5-16 | 143.1 | 138.3 | 128.1 |
| Example 13-16 | Electrolytic solution No. 5-21 | 144.6 | 140.2 | 128.9 |
| Example 13-17 | Electrolytic solution No. 9-4 | 138.4 | 150.4 | 120.0 |
| Example 13-18 | Electrolytic solution No. 9-13 | 140.4 | 151.7 | 120.9 |
| Example 13-19 | Electrolytic solution No. 9-16 | 140.4 | 151.2 | 120.7 |
| Example 13-20 | Electrolytic solution No. 9-21 | 141.9 | 153.3 | 121.5 |
| Example 13-21 | Electrolytic solution No. 10-4 | 144.7 | 128.3 | 126.1 |
| Example 13-22 | Electrolytic solution No. 10-13 | 147.5 | 129.0 | 127.6 |
| Example 13-23 | Electrolytic solution No. 10-16 | 149.5 | 130.0 | 130.1 |
| Example 13-24 | Electrolytic solution No. 10-21 | 151.7 | 130.5 | 130.6 |
| Comparative Example 13-1 | Comparative electrolytic solution No. 1-1 | 100.0 | 100.0 | 100.0 |
| Comparative Example 13-2 | Comparative electrolytic solution No. 1-2 | 127.5 | 135.3 | 107.5 |
| Comparative Example 13-3 | Comparative electrolytic solution No. 1-4 | 121.9 | 128.6 | 101.1 |
| Comparative Example 13-4 | Comparative electrolytic solution No. 1-6 | 128.5 | 133.7 | 108.6 |
| Comparative Example 13-5 | Comparative electrolytic solution No. 2-1 | 133.1 | 139.4 | 111.6 |
| Comparative Example 13-6 | Comparative electrolytic solution No. 2-3 | 139.6 | 145.3 | 120.5 |
| Comparative Example 13-7 | Comparative electrolytic solution No. 3-1 | 130.7 | 134.9 | 110.5 |
| Comparative Example 13-8 | Comparative electrolytic solution No. 3-3 | 137.0 | 140.7 | 119.4 |
| Comparative Example 13-9 | Comparative electrolytic solution No. 5-1 | 125.9 | 119.3 | 110.5 |
| Comparative Example 13-10 | Comparative electrolytic solution No. 5-3 | 132.0 | 124.4 | 119.4 |
| Comparative Example 13-11 | Comparative electrolytic solution No. 9-1 | 123.5 | 130.5 | 104.2 |
| Comparative Example 13-12 | Comparative electrolytic solution No. 9-3 | 129.5 | 136.0 | 112.5 |

TABLE 25-continued (Positive electrode; LMO Negative electrode; Graphite)

| | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Comparative Example 13-13 | Comparative electrolytic solution No. 10-1 | 128.6 | 135.1 | 109.0 |
| Comparative Example 13-14 | Comparative electrolytic solution No. 10-3 | 135.0 | 141.5 | 117.0 |

Example 14-Positive Electrode:LFP Positive Electrode

With regard to Example 14, a LiFePO$_4$ (LFP) powder as a lithium-containing olivine-type phosphate salt was used as a positive-electrode active material in place of the positive-electrode active material (LiMn$_{1.93}$Al$_{0.05}$O$_4$(LMO)) used in Example 13.

<Production of LFP Positive Electrode>

A LiFePO$_4$ (LFP) powder, acetylene black (electrically conductive agent 1), and vapor-grown carbon fiber (VGCF®-H, Showa Denko K. K.) (electrically conductive agent 2) were dry-mixed, and uniformly dispersed and mixed into NMP in which PVDF as a binding agent was pre-dissolved, and NMP for adjusting the viscosity was further added to prepare an LFP mixture paste. The resulting paste was applied to an aluminum foil (current collector), dried, and pressurized. Then the aluminum foil was processed into a predetermined size to obtain a test LFP positive electrode. The ratio of solid contents in the negative electrode was LFP:electrically conductive agent 1:electrically conductive agent 2:PVDF=85:4:1:10 (by the mass ratio).

<Production of Nonaqueous Electrolytic Solution Batteries>

Aluminum laminate housing cell (with a capacity of 30 mAh) including the above test LFP positive electrode, the test graphite negative electrode, and a microporous polypropylene-polyethylene double layered separator were respectively impregnated with one of the various nonaqueous electrolytic solutions and the various comparative electrolytic solutions shown in Table 23 to produce the nonaqueous electrolytic solution batteries according to Examples 14-1 to 14-24 and Comparative Examples 14-1 to 14-14 in a similar way as in Example 13-1.

Example 14 and Comparative Example 14: Evaluation of Test Cells

<Evaluation 1> Low-Temperature Property (0° C.) after 500 Cycles at 60° C.

Each of the nonaqueous electrolytic solution batteries according to Example 14 and Comparative Example 14 was evaluated as described below.

First, the cells produced as described above were subjected to conditioning at an environmental temperature of 25° C. under the following conditions. That is, constant-current and constant-voltage charge was performed as the initial charge/discharge to a charge upper limit voltage of 3.6 V at a 0.1 C rate (3 mA), and discharge was then performed to a discharge cutoff voltage of 2.0 V at a constant current of a 0.2 C rate (6 mA), and subsequently the following charge-discharge cycle was repeated for 3 times: constant-current and constant-voltage charge was performed to a charge upper limit voltage of 3.6 V at a 0.2 C rate (6 mA), and discharge was then performed to a discharge cutoff voltage of 2.0 V at a constant current of a 0.2 C rate (6 mA).

After this conditioning, charge and discharge tests were performed at an environmental temperature of 60° C. The following charge-discharge cycle was repeated for 500 times: constant-current and constant-voltage charge was performed at a 3 C rate (90 mA) to a charge upper limit voltage of 3.6 V, and discharge was performed at a constant current of a 3 C rate (90 mA) to a discharge cutoff voltage of 2.0 V.

Next, the nonaqueous electrolytic solution batteries were cooled to 25° C., and again discharged to 2.0 V. Then constant-current and constant-voltage charge was performed to 3.6 V at a 0.2 C rate at 0° C. Further, discharge was performed at a constant current of a 5 C rate (150 mA) to a discharge cutoff voltage of 2.0 V, and the capacity obtained at that time was taken as the low-temperature property (0° C.) after prolonged cycles at 60° C.

<Evaluation 2> 5 C-Rate Characteristic after 500 Cycles at 60° C.

After performing 500 cycles at an environmental temperature of 60° C. in Evaluation 1 as described above, the nonaqueous electrolytic solution batteries were cooled to 25° C., and then again discharged to 2.0 V. Subsequently constant-current and constant-voltage charge was performed to 3.6 V at a 5 C rate at 25° C. Further, discharge was performed at a constant current of a 5 C rate (150 mA) to a discharge cutoff voltage of 2.0 V, and the capacity obtained at that time was taken as the 5 C-rate characteristic (25° C.) after prolonged cycles at 60° C.

<Evaluation 3> Low-Temperature Property (0° C.) after Stored at 60° C.

Each of the nonaqueous electrolytic solution batteries according to Example 14 and Comparative Example 14 was subjected to storage tests (stored for 10 days after charged to 3.6 V) at an environmental temperature of 60° C.

Next, the nonaqueous electrolytic solution batteries were cooled to 25° C., and again discharged to 2.0 V. Then constant-current and constant-voltage charge was performed to 3.6 V at a 0.2 C rate at 0° C. Further, discharge was performed at a constant current of a 5 C rate (150 mA) to a discharge cutoff voltage of 2.0 V while maintaining the temperature at 0° C., and the capacity obtained at that time was taken as the low-temperature property (0° C.) after stored at 60° C.

Various evaluations of the nonaqueous electrolytic solution electrolytic solution batteries according to Example 14 and Comparative Example 14 are shown in Table 26 as relative values when the corresponding evaluations of the nonaqueous electrolytic solution battery according to Comparative Example 12-1 are taken as 100.

TABLE 26

(Positive electrode; LFP Negative electrode; Graphite)

| | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 14-1 | Electrolytic solution No. 1-4 | 137.3 | 148.0 | 115.6 |
| Example 14-2 | Electrolytic solution No. 1-13 | 139.3 | 149.2 | 116.5 |
| Example 14-3 | Electrolytic solution No. 1-16 | 139.3 | 148.8 | 116.3 |
| Example 14-4 | Electrolytic solution No. 1-21 | 140.8 | 150.8 | 117.1 |
| Example 14-5 | Electrolytic solution No. 2-4 | 149.4 | 160.8 | 127.8 |
| Example 14-6 | Electrolytic solution No. 2-13 | 151.6 | 162.2 | 128.7 |
| Example 14-7 | Electrolytic solution No. 2-16 | 151.6 | 161.7 | 128.6 |
| Example 14-8 | Electrolytic solution No. 2-21 | 153.2 | 164.0 | 129.4 |
| Example 14-9 | Electrolytic solution No. 3-4 | 146.7 | 155.7 | 126.5 |
| Example 14-10 | Electrolytic solution No. 3-13 | 148.8 | 157.0 | 127.5 |
| Example 14-11 | Electrolytic solution No. 3-16 | 148.9 | 156.5 | 127.3 |
| Example 14-12 | Electrolytic solution No. 3-21 | 150.4 | 158.7 | 128.2 |
| Example 14-13 | Electrolytic solution No. 5-4 | 141.3 | 137.7 | 126.5 |
| Example 14-14 | Electrolytic solution No. 5-13 | 143.4 | 138.8 | 127.5 |
| Example 14-15 | Electrolytic solution No. 5-16 | 143.4 | 138.4 | 127.3 |
| Example 14-16 | Electrolytic solution No. 5-21 | 144.9 | 140.3 | 128.2 |
| Example 14-17 | Electrolytic solution No. 9-4 | 138.6 | 150.5 | 119.2 |
| Example 14-18 | Electrolytic solution No. 9-13 | 140.6 | 151.8 | 120.2 |
| Example 14-19 | Electrolytic solution No. 9-16 | 140.7 | 151.4 | 120.0 |
| Example 14-20 | Electrolytic solution No. 9-21 | 142.1 | 153.5 | 120.8 |
| Example 14-21 | Electrolytic solution No. 10-4 | 145.4 | 128.9 | 126.7 |
| Example 14-22 | Electrolytic solution No. 10-13 | 148.8 | 130.2 | 128.7 |
| Example 14-23 | Electrolytic solution No. 10-16 | 151.1 | 131.4 | 131.6 |
| Example 14-24 | Electrolytic solution No. 10-21 | 153.7 | 132.2 | 132.3 |
| Comparative Example 14-1 | Comparative electrolytic solution No. 1-1 | 100.0 | 100.0 | 100.0 |
| Comparative Example 14-2 | Comparative electrolytic solution No. 1-2 | 127.8 | 135.4 | 106.8 |
| Comparative Example 14-3 | Comparative electrolytic solution No. 1-4 | 122.1 | 128.8 | 100.5 |
| Comparative Example 14-4 | Comparative electrolytic solution No. 1-6 | 128.7 | 133.8 | 107.9 |
| Comparative Example 14-5 | Comparative electrolytic solution No. 2-1 | 133.3 | 139.5 | 110.9 |
| Comparative Example 14-6 | Comparative electrolytic solution No. 2-3 | 139.8 | 145.5 | 119.8 |
| Comparative Example 14-7 | Comparative electrolytic solution No. 3-1 | 130.9 | 135.1 | 109.9 |
| Comparative Example 14-8 | Comparative electrolytic solution No. 3-3 | 137.3 | 140.8 | 118.6 |
| Comparative Example 14-9 | Comparative electrolytic solution No. 5-1 | 126.1 | 119.4 | 109.9 |
| Comparative Example 14-10 | Comparative electrolytic solution No. 5-3 | 132.3 | 124.5 | 118.6 |
| Comparative Example 14-11 | Comparative electrolytic solution No. 9-1 | 123.7 | 120.5 | 103.5 |
| Comparative Example 14-12 | Comparative electrolytic solution No. 9-3 | 129.8 | 121.9 | 111.8 |
| Comparative Example 14-13 | Comparative electrolytic solution No. 10-1 | 131.3 | 138.0 | 111.3 |
| Comparative Example 14-14 | Comparative electrolytic solution No. 10-3 | 137.4 | 144.1 | 119.1 |

Regarding Examples 6-1 to 6-16

As seen from the results in Tables 24, 25, and 26, even in a case where NCA, LMO, or LFP is used instead of NMC as a positive-electrode active material, the nonaqueous electrolytic solution batteries including the difluoro ionic complex (1a-Cis) in the cis configuration from Synthesis Example 1 as the group (I) compound according to Example and the group (II) compound were found to improve all of Evaluations 1 to 3 as compared with the nonaqueous electrolytic solution batteries including neither the ionic complex nor the group (II) compound (Comparative Examples 12-1, 13-1, and 14-1).

Further, the nonaqueous electrolytic solution batteries including both (1a-Cis) and the group (II) compound were found to improve all of Evaluations 1 to 3 as compared with the nonaqueous electrolytic solution batteries including (1a-Cis) only.

Further, the nonaqueous electrolytic solution batteries including the three compounds of (1a-Cis), the group (II) compound, and the group (IV) compound were found to improve all of Evaluations 1 to 3 as compared with the nonaqueous electrolytic solution batteries including the three compounds of the difluoro ionic complex (1a-Trans) in the trans configuration, the group (II) compound, and the group (IV) compound.

The above results demonstrated that the nonaqueous electrolytic solutions according to the present invention showed good effects in any of the cases where the following oxides were used as a positive electrode: a lithium-transition metal composite oxide containing at least one metal of nickel, manganese, and cobalt and having a layered structure; a lithium-manganese composite oxide having the spinel structure; and a lithium-containing olivine-type iron phosphate.

That is, these results clearly demonstrate that the nonaqueous electrolytic solution according to the present invention, and batteries including the nonaqueous electrolytic solution according to the present invention can show high output characteristics at low temperature even after the batteries are used to some extent, and can also show sufficient performance again at low temperature even after stored at high temperature regardless of types of positive electrodes.

Example 15-Negative Electrode:Amorphous Carbon Negative Electrode

With regard to Example 15, an amorphous carbon powder as a carbon material having a d value in the lattice plane (002) of more than 0.340 nm as determined by X ray diffraction was used as a negative-electrode active material in place of the negative-electrode active material (a graphite powder) used in Example 1.
<Production of Amorphous Carbon Negative Electrode>
Carbotron® P from Kureha Corporation as an amorphous carbon powder was uniformly dispersed and mixed into NMP in which PVDF as a binding agent was pre-dissolved, and NMP for adjusting the viscosity was then further added to prepare an amorphous carbon mixture paste. The above paste was applied to a copper foil (current collector), dried, and pressurized.

Then the copper foil was processed into a predetermined size to obtain a test amorphous carbon negative electrode. The ratio of solid contents in the negative electrode was amorphous carbon powder:PVDF=90:10 (by the mass ratio).
(Preparation of Nonaqueous Electrolytic Solutions)
The nonaqueous electrolytic solutions Nos. 12-1 to 12-12 according to the present invention were prepared in a similar way as in the nonaqueous electrolytic solution No. 1-1 except that FEC was added as a nonaqueous solvent.

That is, $LiPF_6$ as an electrolyte was dissolved and prepared in EC, EMC, and FEC (volume ratio 25:70:5/mass ratio 29.7:63.6:6.7 or volume ratio 20:70:10/mass ratio 23.6:63.1:13.3) as a nonaqueous solvent or a nonaqueous solvent of EC and EMC (volume ratio 30:70/mass ratio 35.9:64.1) to which FEC was not added so that the concentration of $LiPF_6$ was 1.2 mol/L, and then various ionic complex/EMC solutions according to the present invention and the group (II) compounds were added to prepare the nonaqueous electrolytic solutions Nos. 12-1 to 12-12 and comparative electrolytic solutions Nos. 12-1 to 12-17 shown in Table 27 below.
<Production of Nonaqueous Electrolytic Solution Batteries>
Aluminum laminate housing cells (with a capacity of 30 mAh) including the above test NMC positive electrode, the test amorphous carbon negative electrode, and a microporous polypropylene-polyethylene double layered separator were respectively impregnated with one of the various nonaqueous electrolytic solutions and the various comparative electrolytic solutions shown in Table 27 to produce the nonaqueous electrolytic solution batteries according to Example 15 and Comparative Example 15.

TABLE 27

| Electrolytic solution No, | Li salt $LiPF_6$ (mol/liter) | Nonaqueous solvent EC (mass %) | EMC (mass %) | FEC (mass %) | Group (II) compound Cis isomer | Content (mass %) | Group (II) compound | Content (mass %) | Group (III) compound Trans isomer | Content (mass %) | Trans isomer/Cis isomer (mass ratio) | Group (IV) compound Tetrafluoro complex | Content (mass %) | Tetrafluoro complex/Cis isomer (mass ratio) |
|---|---|---|---|---|---|---|---|---|---|---|---|---|---|---|
| Electrolytic solution No. 12-1 | 1.2 | 29.7 | 63.6 | 6.7 | (1a-Cis) | 1.2 | (II-1-1) | 2.4 | (1a Trans) | 0.006 | 0.005 | (5a-Tetra) | 0.144 | 0.12 |
| Electrolytic solution No. 12-2 | | | | | | | (II-2-1) | 1.2 | | | | | | |
| Electrolytic solution No. 12-3 | | | | | | | (II-3-1) | 3.6 | | | | | | |
| Electrolytic solution No. 12-4 | | | | | | | (II-5-1) | 1.2 | | | | | | |
| Electrolytic solution No. 12-5 | | | | | | | Lithium difluorophosphate | 1.2 | | | | | | |
| Electrolytic solution No. 12-6 | | | | | | | (II-9-2) | 0.5 | | | | | | |
| Electrolytic solution No. 12-7 | 1.2 | 23.6 | 63.1 | 13.3 | (1a-Cis) | 1.2 | (II-1-1) | 2.4 | (1a Trans) | 0.006 | 0.005 | (5a-Tetra) | 0.144 | 0.12 |
| Electrolytic solution No. 12-8 | | | | | | | (II-2-1) | 1.2 | | | | | | |
| Electrolytic solution No. 12-9 | | | | | | | (II-3-1) | 3.6 | | | | | | |
| Electrolytic solution No. 12-10 | | | | | | | (II-5-1) | 1.2 | | | | | | |
| Electrolytic solution No. 12-11 | | | | | | | Lithium difluorophosphate | 1.2 | | | | | | |
| Electrolytic solution No. 12-12 | | | | | | | (II-9-2) | 0.5 | | | | | | |
| Comparative electrolytic solution No. 12-1 | 1.2 | 35.9 | 64.1 | — | — | — | — | — | — | — | — | — | — | — |
| Comparative electrolytic solution No. 12-2 | 1.2 | 29.7 | 63.6 | 6.7 | — | — | — | — | — | — | — | — | — | — |

TABLE 27-continued

| Electrolytic solution No, | Li salt LiPF₆ (mol/liter) | Nonaqueous solvent EC (mass %) | Nonaqueous solvent EMC (mass %) | Nonaqueous solvent FEC (mass %) | Group (II) compound Cis isomer | Content (mass %) | Group (II) compound | Content (mass %) | Group (III) compound Trans isomer | Content (mass %) | Trans isomer/Cis isomer (mass ratio) | Group (IV) compound Tetrafluoro complex | Content (mass %) | Tetrafluoro complex/Cis isomer (mass ratio) |
|---|---|---|---|---|---|---|---|---|---|---|---|---|---|---|
| Comparative electrolytic solution No. 12-3 | | | | | (1a-Cis) | 1.2 | — | — | — | — | — | — | — | — |
| Comparative electrolytic solution No. 12-4 | | | | | — | — | (II-1-1) | 2.4 | (1a Trans) | 1.2 | — | (5a-Tetra) | 0.144 | — |
| Comparative electrolytic solution No. 12-5 | | | | | — | — | (II-2-1) | 1.2 | | | | | | |
| Comparative electrolytic solution No. 12-6 | | | | | — | — | (II-3-1) | 3.6 | | | | | | |
| Comparative electrolytic solution No. 12-7 | | | | | — | — | (II-5-1) | 1.2 | | | | | | |
| Comparative electrolytic solution No. 12-8 | | | | | — | — | Lithium difluorophosphate | 1.2 | | | | | | |
| Comparative electrolytic solution No. 12-9 | | | | | — | — | (II-9-2) | 0.5 | | | | | | |
| Comparative electrolytic solution No. 12-10 | 1.2 | 23.6 | 63.1 | 13.3 | — | — | — | — | — | — | — | — | — | — |
| Comparative electrolytic solution No. 12-11 | | | | | (1a-Cis) | 1.2 | — | — | — | — | — | — | — | — |
| Comparative electrolytic solution No. 12-12 | | | | | — | — | (II-1-1) | 2.4 | (1a Trans) | 1.2 | — | (5a-Tetra) | 0.144 | — |
| Comparative electrolytic solution No. 12-13 | | | | | — | — | (II-2-1) | 1.2 | | | | | | |
| Comparative electrolytic solution No. 12-14 | | | | | — | — | (II-3-1) | 3.6 | | | | | | |
| Comparative electrolytic solution No. 12-15 | | | | | — | — | (II-5-1) | 1.2 | | | | | | |
| Comparative electrolytic solution No. 12-16 | | | | | — | — | Lithium difluorophosphate | 1.2 | | | | | | |
| Comparative electrolytic solution No. 12-17 | | | | | — | — | (II-9-2) | 0.5 | | | | | | |

Example 15 and Comparative Example 15: Evaluation of Test Cells

<Evaluation 1> Low-temperature property (0° C.) after 500 cycles at 60° C.

For each of the nonaqueous electrolytic solution batteries according to Example 15 and Comparative Example 15, conditioning and evaluation were performed as in Evaluation 1 performed for the nonaqueous electrolytic solution batteries according to Example 12.

That is, constant-current and constant-voltage charge was performed as the initial charge/discharge at an environmental temperature of 25° C. using the produced cells to a charge upper limit voltage of 4.2 V at a 0.1 C rate (3 mA), and discharge was performed at a constant current of a 0.2 C rate (6 mA) to a discharge cutoff voltage of 2.7 V. Subsequently, the following charge-discharge cycle was repeated for 3 times: constant-current and constant-voltage charge was performed to a charge upper limit voltage of 4.2 V at a 0.2 C rate (6 mA), and discharge was performed at a constant current of a 0.2 C rate (6 mA) to a discharge cutoff voltage of 2.7 V. After this conditioning, similar evaluation was performed except that when 500 cycles at an environmental temperature of 60° C. were performed, the discharge cutoff voltage was changed from 3.0 V to 2.7 V, and when constant-current and constant-voltage charge was performed to 4.2 V at a 0.2 C rate at 0° C., and then discharge was performed while maintaining the temperature at 0° C., the discharge cutoff voltage was changed from 3.0 V to 2.7 V, and discharge was performed at a constant current of a 5 C rate (150 mA). The capacity obtained at that time was considered as the low-temperature property (0° C.) after prolonged cycles at 60° C.

<Evaluation 2> 5 C-Rate Characteristic after 500 Cycles at 60° C.

Each of the nonaqueous electrolytic solution batteries according to Example 15 and Comparative Example 15 was evaluated as in Evaluation 2 performed for the nonaqueous electrolytic solution batteries according to Example 12. However, the discharge cutoff voltage was changed from 3.0 V to 2.7 V upon discharge at a 5 C rate at 25° C. The capacity obtained at that time was considered as the 5 C-rate characteristic (25° C.) after prolonged cycles at 60° C.

<Evaluation 3> Low-Temperature Property (0° C.) after Stored at 60° C.

Each of the nonaqueous electrolytic solution batteries according to Example 15 and Comparative Example 15 was subjected to storage tests (stored for 10 days after charged to 4.2 V at a constant current and a constant voltage) at an environmental temperature of 60° C. as in Evaluation 3 performed for the nonaqueous electrolytic solution batteries according to Example 12. However, the discharge cutoff voltage was changed from 3.0 V to 2.7 V upon discharge at a 5 C rate at 0° C. The capacity obtained at that time was considered as the low-temperature property (0° C.) after stored at 60° C.

Various evaluations of the nonaqueous electrolytic solution batteries according to Example 15 and Comparative Example 15 are shown in Table 28 as relative values when the corresponding evaluations of the nonaqueous electrolytic solution battery according to Comparative Example 15-1 are taken as 100.

TABLE 28

(Positive electrode: NMC Negative electrode: Amorphous carbon)

| | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 15-1 | Electrolytic solution No. 12-1 | 120.2 | 131.3 | 101.4 |
| Example 15-2 | Electrolytic solution No. 12-2 | 130.8 | 142.7 | 112.1 |
| Example 15-3 | Electrolytic solution No. 12-3 | 128.4 | 138.1 | 111.0 |
| Example 15-4 | Electrolytic solution No. 12-4 | 123.7 | 122.2 | 111.0 |
| Example 15-5 | Electrolytic solution No. 12-5 | 121.4 | 133.6 | 104.6 |
| Example 15-6 | Electrolytic solution No. 12-6 | 125.6 | 129.5 | 114.0 |
| Example 15-7 | Electrolytic solution No. 12-7 | 129.6 | 135.9 | 113.1 |
| Example 15-8 | Electrolytic solution No. 12-8 | 123.1 | 129.2 | 108.4 |
| Example 15-9 | Electrolytic solution No. 12-9 | 128.2 | 132.6 | 115.6 |
| Example 15-10 | Electrolytic solution No. 12-10 | 124.1 | 135.1 | 105.6 |
| Example 15-11 | Electrolytic solution No. 12-11 | 126.3 | 136.2 | 107.7 |
| Example 15-12 | Electrolytic solution No. 12-12 | 128.4 | 134.5 | 117.6 |
| Comparative Example 15-1 | Comparative electrolytic solution No. 12-1 | 100.0 | 100.0 | 100.0 |
| Comparative Example 15-2 | Comparative electrolytic solution No. 12-2 | 106.9 | 102.3 | 97.8 |
| Comparative Example 15-3 | Comparative electrolytic solution No. 12-3 | 124.7 | 134.2 | 105.1 |
| Comparative Example 15-4 | Comparative electrolytic solution No. 12-4 | 119.0 | 130.0 | 100.4 |
| Comparative Example 15-5 | Comparative electrolytic solution No. 12-5 | 128.9 | 140.6 | 110.4 |
| Comparative Example 15-6 | Comparative electrolytic solution No. 12-6 | 126.7 | 136.3 | 109.5 |
| Comparative Example 15-7 | Comparative electrolytic solution No. 12-7 | 122.2 | 120.7 | 109.6 |
| Comparative Example 15-8 | Comparative electrolytic solution No. 12-8 | 120.3 | 132.4 | 103.7 |
| Comparative Example 15-9 | Comparative electrolytic solution No. 12-9 | 123.1 | 113.6 | 110.2 |
| Comparative Example 15-10 | Comparative electrolytic solution No. 12-10 | 128.9 | 135.1 | 112.5 |
| Comparative Example 15-11 | Comparative electrolytic solution No. 12-11 | 121.2 | 127.2 | 106.7 |
| Comparative Example 15-12 | Comparative electrolytic solution No. 12-12 | 125.1 | 129.3 | 112.8 |
| Comparative Example 15-13 | Comparative electrolytic solution No. 12-13 | 109.4 | 104.6 | 100.0 |
| Comparative Example 15-14 | Comparative electrolytic solution No. 12-14 | 127.0 | 136.8 | 107.1 |
| Comparative Example 15-15 | Comparative electrolytic solution No. 12-15 | 122.9 | 133.8 | 104.6 |
| Comparative Example 15-16 | Comparative electrolytic solution No. 12-16 | 122.3 | 131.0 | 103.6 |
| Comparative Example 15-17 | Comparative electrolytic solution No. 12-17 | 125.3 | 115.7 | 112.5 |

Example 16-Negative Electrode: (Mixture of Artificial Graphite+ Natural Graphite) Negative Electrode With regard to Example 16, a negative-electrode active material in which an artificial graphite and natural graphite are mixed with each other was used in place of the negative-electrode active material (an amorphous carbon powder) used in Example 15.

<Production of Test (Mixture of Artificial Graphite+ Natural Graphite) Negative Electrode>

An SCMG®-AR powder from Showa Denko K. K. as artificial graphite and natural graphite particles (the mean particle size: 25 μm) from Kansai Coke and Chemicals Company, Limited. as natural graphite were uniformly dispersed and mixed into NMP in which PVDF as a binding agent was pre-dissolved, and NMP for adjusting the viscosity was then further added to prepare a mixture paste of (artificial graphite+ natural graphite) mixture. The above paste was applied to a copper foil (current collector), dried, and pressurized. Then the copper foil was processed into a predetermined size to obtain a test (mixture of artificial graphite+ natural graphite) negative electrode. The ratio of solid contents in the negative electrode was artificial graphite powder:natural graphite powder:PVDF=72:18:10 (by the mass ratio).

<Production of Nonaqueous Electrolytic Solution Batteries>

Aluminum laminate housing cells (with a capacity of 30 mAh) including the above test NMC positive electrode, the test (mixture of artificial graphite+ natural graphite) negative electrode, and a microporous polypropylene-polyethylene double layered separator were respectively impregnated with one of the various nonaqueous electrolytic solutions and the various comparative electrolytic solutions shown in Table 27 to produce the nonaqueous electrolytic solution batteries according to Examples 16-1 to 16-12 and Comparative Examples 16-1 to 16-17 as in Example 15 as described above.

<Production of Nonaqueous Electrolytic Solution Batteries>

Each of these nonaqueous electrolytic solution batteries was subjected to the following evaluations as described above as in Example 1 described above.

<Evaluation 1> Low-temperature property (0° C.) after 500 cycles at 60° C.
<Evaluation 2> 5 C-rate characteristic after 500 cycles at 60° C.
<Evaluation 3> Low-temperature property (0° C.) after stored at 60° C.

Various evaluations of the nonaqueous electrolytic solution batteries according to Example 16 and Comparative Example 16 are shown in Table 29 as relative values when the corresponding evaluation results of the nonaqueous electrolytic solution battery according to Comparative Example 16-1 are taken as 100.

an artificial graphite and natural graphite) used in the nonaqueous electrolytic solution batteries according to Example 16.

Production of $SiO_x$ Negative Electrode

A powder mixture of a silicon oxide powder disproportioned by heat treatment ($SiO_x$ wherein x is 0.3 to 1.6, the mean particle size: 5 μm, Sigma Aldrich Japan, Co. LLC.) as a silicon oxide powder and MAG-D (the particle size: 20 μm or less) from Hitachi Chemical Co., Ltd. as an aggregated artificial graphite powder was uniformly dispersed and

TABLE 29

(Positive electrode; NMC Negative electrode; Mixture of artificial graphite + natural graphite)

| | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 16-1 | Electrolytic solution No. 12-1 | 116.4 | 129.4 | 100.2 |
| Example 16-2 | Electrolytic solution No. 12-2 | 126.7 | 140.6 | 110.8 |
| Example 16-3 | Electrolytic solution No. 12-3 | 124.4 | 136.1 | 109.7 |
| Example 16-4 | Electrolytic solution No. 12-4 | 119.8 | 120.4 | 109.7 |
| Example 16-5 | Electrolytic solution No. 12-5 | 117.5 | 131.6 | 103.4 |
| Example 16-6 | Electrolytic solution No. 12-6 | 122.8 | 126.7 | 111.5 |
| Example 16-7 | Electrolytic solution No. 12-7 | 125.5 | 133.9 | 111.8 |
| Example 16-8 | Electrolytic solution No. 12-8 | 119.3 | 127.3 | 107.2 |
| Example 16-9 | Electrolytic solution No. 12-9 | 124.2 | 130.6 | 114.2 |
| Example 16-10 | Electrolytic solution No. 12-10 | 120.2 | 133.1 | 104.4 |
| Example 16-11 | Electrolytic solution No. 12-11 | 121.2 | 129.9 | 102.7 |
| Example 16-12 | Electrolytic solution No. 12-12 | 126.1 | 132.1 | 115.5 |
| Comparative Example 16-1 | Comparative electrolytic solution No. 12-1 | 100.0 | 100.0 | 100.0 |
| Comparative Example 16-2 | Comparative electrolytic solution No. 12-2 | 103.5 | 100.7 | 96.6 |
| Comparative Example 16-3 | Comparative electrolytic solution No. 12-3 | 120.7 | 132.2 | 103.9 |
| Comparative Example 16-4 | Comparative electrolytic solution No. 12-4 | 115.2 | 128.1 | 99.2 |
| Comparative Example 16-5 | Comparative electrolytic solution No. 12-5 | 124.8 | 138.6 | 109.1 |
| Comparative Example 16-6 | Comparative electrolytic solution No. 12-6 | 122.7 | 134.3 | 108.2 |
| Comparative Example 16-7 | Comparative electrolytic solution No. 12-7 | 118.4 | 118.9 | 108.4 |
| Comparative Example 16-8 | Comparative electrolytic solution No. 12-8 | 116.5 | 130.5 | 102.5 |
| Comparative Example 16-9 | Comparative electrolytic solution No. 12-9 | 121.1 | 111.8 | 108.4 |
| Comparative Example 16-10 | Comparative electrolytic solution No. 12-10 | 124.8 | 133.1 | 111.2 |
| Comparative Example 16-11 | Comparative electrolytic solution No. 12-11 | 117.4 | 125.3 | 105.5 |
| Comparative Example 16-12 | Comparative electrolytic solution No. 12-12 | 121.1 | 127.4 | 111.4 |
| Comparative Example 16-13 | Comparative electrolytic solution No. 12-13 | 105.9 | 103.1 | 98.8 |
| Comparative Example 16-14 | Comparative electrolytic solution No. 12-14 | 123.0 | 134.7 | 105.8 |
| Comparative Example 16-15 | Comparative electrolytic solution No. 12-15 | 119.0 | 131.8 | 103.4 |
| Comparative Example 16-16 | Comparative electrolytic solution No. 12-16 | 118.3 | 125.6 | 99.5 |
| Comparative Example 16-17 | Comparative electrolytic solution No. 12-17 | 123.5 | 114.1 | 110.9 |

Example 17-Negative Electrode:$SiO_x$ Negative Electrode

With regard to Example 17, a powder mixture of a silicon oxide powder and an aggregated artificial graphite powder was used as a negative-electrode active material in place of the negative-electrode active material (a powder mixture of mixed into NMP in which PVDF as a binding agent was pre-dissolved, and Ketjen black (electrically conductive agent) was further added and mixed, and NMP for adjusting the viscosity was then further added to prepare an $SiO_x$ mixture paste.

The above paste was applied to a copper foil (current collector), dried, and pressurized. Then the copper foil was processed into a predetermined size to obtain a test $SiO_x$ negative electrode. The ratio of solid contents in the negative electrode was $SiO_x$:MAG-D:electrically conductive agent: PVDF=35:47:8:10 (by the mass ratio).

It is noted that the amounts of the NMC positive-electrode active material and the $SiO_x$ powder were adjusted so that the charging capacity of the $SiO_x$ negative electrode is larger than that of the NMC positive electrode, and the applied amount was also adjusted so that a lithium metal does not deposit on the $SiO_x$ negative electrode during charging.

(Preparation of Nonaqueous Electrolytic Solutions)

The nonaqueous electrolytic solutions Nos. 13-1 to 13-5 according to the present invention and the comparative electrolytic solutions Nos. 13-1 to 13-8 were prepared in a similar way as in the nonaqueous electrolytic solution No. 1-1 and the comparative electrolytic solutions Nos. 13-1 to 13-8 except that FEC was added as a nonaqueous solvent.

That is, $LiPF_6$ as an electrolyte was dissolved and prepared in EC, EMC, and FEC (volume ratio 15:70:15/mass ratio 17.5:62.6:19.9) as a nonaqueous solvent so that the concentration of $LiPF_6$ was 1.2 mol/L, and then various ionic complex/EMC solutions according to the present invention and the group (II) compounds above were added to prepare the nonaqueous electrolytic solutions Nos. 13-1 to 13-5 and comparative electrolytic solutions Nos. 13-1 to 13-8 shown in Table 30 below.

lytic solutions shown in Tables 27 and 30 to produce the nonaqueous electrolytic solution batteries according to Example 16 and Comparative Example 16 as in Example 16 and Comparative Example 16 described above.

<Evaluation of Nonaqueous Electrolytic Solution Batteries>
<Evaluation 1> Low-temperature property (0° C.) after 200 cycles at 60° C.

Each of the nonaqueous electrolytic solution batteries according to Example 17 and Comparative Example 17 was subjected to the following evaluation.

First, constant-current and constant-voltage charge was performed as the initial charge/discharge at an environmental temperature of 25° C. using the produced cells to a charge upper limit voltage of 4.2 V at a 0.05 C rate (1.5 mA), and discharge was performed at a constant current of a 0.1 C rate (3 mA) to a discharge cutoff voltage of 2.5 V. Subsequently, the following charge-discharge cycle was repeated for 5 times to perform conditioning: constant-current and constant-voltage charge was performed at a 0.1 C rate (3 mA) to a charge upper limit voltage of 4.2 V, and discharge was performed at a constant current of a 0.1 C rate (3 mA) to a discharge cutoff voltage of 2.5 V.

After this conditioning, the following charge-discharge cycle was repeated for 3 times at an environmental tem-

TABLE 30

| Electrolytic solution No. | Li salt $LiPF_6$ (mol/liter) | Nonaqueous solvent EC (mass %) | Nonaqueous solvent EMC (mass %) | Nonaqueous solvent FEC (mass %) | Group (II) compound Cis isomer | Content (mass %) | Group (II) compound | Content (mass %) | Group (III) compound Trans isomer | Content (mass %) | Trans isomer/Cis isomer (mass ratio) | Group (IV) compound Tetra-fluoro complex | Content (mass %) | Tetra-fluoro complex/Cis isomer (mass ratio) |
|---|---|---|---|---|---|---|---|---|---|---|---|---|---|---|
| Electrolytic solution No. 13-1 | 1.2 | 17.5 | 62.6 | 19.9 | (1a-Cis) | 1.2 | (II-1-1) | 2.4 | (1a Trans) | 0.006 | 0.005 | (5a-Tetra) | 0.144 | 0.12 |
| Electrolytic solution No. 13-2 | | | | | | | (II-2-1) | 1.2 | | | | | | |
| Electrolytic solution No. 13-3 | | | | | | | (II-3-1) | 3.6 | | | | | | |
| Electrolytic solution No. 13-4 | | | | | | | (II-5-1) | 1.2 | | | | | | |
| Electrolytic solution No. 13-5 | | | | | | | Lithium difluoro-phosphate | 1.2 | | | | | | |
| Electrolytic solution No. 13-6 | | | | | | | (II-9-2) | 0.5 | | | | | | |
| Comparative electrolytic solution No. 13-1 | 1.2 | 17.5 | 62.6 | 19.9 | — | — | — | — | — | — | — | — | — | — |
| Comparative electrolytic solution No. 13-2 | | 21.8 | 78.2 | — | (1a-Cis) | 1.2 | — | — | — | — | — | — | — | — |
| Comparative electrolytic solution No. 13-3 | | 17.5 | 62.6 | 19.9 | — | — | (II-1-1) | 2.4 | (1a Trans) | 1.2 | — | (5a-Tetra) | 0.144 | — |
| Comparative electrolytic solution No. 13-4 | | | | | — | — | (II-2-1) | 1.2 | | | | | | |
| Comparative electrolytic solution No. 13-5 | | | | | — | — | (II-3-1) | 3.6 | | | | | | |
| Comparative electrolytic solution No. 13-6 | | | | | — | — | (II-5-1) | 1.2 | | | | | | |
| Comparative electrolytic solution No. 13-7 | | | | | — | — | Lithium difluoro-phosphate | | | | | | | |
| Comparative electrolytic solution No. 13-8 | | | | | — | — | (II-9-2) | 0.5 | | | | | | |

<Production of Nonaqueous Electrolytic Solution Batteries>

Aluminum laminate housing cells (with a capacity of 30 mAh) including the above test NMC positive electrode, the test $SiO_x$ negative electrode, and a microporous polypropylene-polyethylene double layered separator were respectively impregnated with one of the various nonaqueous electrolytic solutions and the various comparative nonaqueous electroperature of 25° C.: constant-current and constant-voltage charge was performed at 0.2 C rate (6 mA) to a charge upper limit voltage of 4.2 V, and discharge was then performed at a constant current of a 0.2 C rate (6 mA) to a discharge cutoff voltage of 2.5 V.

Then, charge/discharge tests were performed at an environmental temperature of 60° C. The following charge-discharge cycle was repeated for 200 times: constant-current and constant-voltage charge was performed at a 1 C rate (30 mA) to a charge upper limit voltage of 4.2 V, and discharge was performed at a constant current of a 2 C rate (60 mA) to a discharge cutoff voltage of 2.5 V.

Next, the nonaqueous electrolytic solution batteries were cooled to 25° C., and again discharged to 2.5 V. Then constant-current and constant-voltage charge was performed to 4.2 V at a 0.2 C rate at 0° C. Further, discharge was performed at a constant current of a 3 C rate (90 mA) to a discharge cutoff voltage of 2.5 V, and the capacity obtained at that time was taken as the low-temperature property (0° C.) after prolonged cycles at 60° C.

<Evaluation 2> 3 C-Rate Characteristic after 200 Cycles at 60° C.

After performing 200 cycles at an environmental temperature of 60° C. in Evaluation 1 as described above, the nonaqueous electrolytic solution batteries were cooled to 25° C., and then again discharged to 2.5 V. Subsequently, constant-current and constant-voltage charge was performed to 4.2 V at a 0.1 C rate at 25° C. Further, discharge was performed at a constant current of a 3 C rate (90 mA) to a discharge cutoff voltage of 2.5 V, and the capacity obtained at that time was taken as the 3 C-rate characteristic (25° C.) after prolonged cycles at 60° C.

<Evaluation 3> Low-Temperature Property (0° C.) after Stored at 60° C.

Each of the nonaqueous electrolytic solution batteries according to Example 17 and Comparative Example 17 was subjected to storage tests (stored for 10 days after changed to 4.2 V) at an environmental temperature of 60° C.

Next, the nonaqueous electrolytic solution batteries were cooled to 25° C., and again discharged to 2.5 V. Then constant-current and constant-voltage charge was performed to 4.2 V at a 0.2 C rate at 0° C. Further, discharge was performed at a constant current of a 3 C rate (900 mA) to a discharge cutoff voltage of 2.5 V while maintaining the temperature at 0° C., and the capacity obtained at that time was taken as the low-temperature property (0° C.) after stored at 60° C.

Various evaluations of the nonaqueous electrolytic solution batteries according to Example 17 and Comparative Example 17 are shown in Table 31 as relative values when the corresponding evaluations of the nonaqueous electrolytic solution battery according to Comparative Example 17-1 are taken as 100.

TABLE 31

(Positive electrode; NMC Negative electrode; SiO$_x$ negative electrode)

| | Electrolytic solution No, | Low-temperature property (0° C.) after prolonged cycles at 60° C. | 3 C-rate characteristic (25° C.) after prolonged cycles at 60° C. | Low-temperature property (0° C.) after stored at 60° C. |
|---|---|---|---|---|
| Example 17-1 | Electrolytic solution No. 12-7 | 115.5 | 125.1 | 111.0 |
| Example 17-2 | Electrolytic solution No. 12-8 | 123.6 | 132.7 | 106.9 |
| Example 17-3 | Electrolytic solution No. 12-9 | 121.3 | 132.0 | 106.4 |
| Example 17-4 | Electrolytic solution No. 12-10 | 120.1 | 127.6 | 108.0 |
| Example 17-5 | Electrolytic solution No. 12-11 | 119.8 | 126.3 | 105.9 |
| Example 17-6 | Electrolytic solution No. 12-12 | 121.8 | 119.6 | 109.6 |
| Example 17-7 | Electrolytic solution No. 13-1 | 115.9 | 126.3 | 114.3 |
| Example 17-8 | Electrolytic solution No. 13-2 | 125.6 | 134.4 | 108.2 |
| Example 17-9 | Electrolytic solution No. 13-3 | 124.7 | 135.0 | 110.3 |
| Example 17-10 | Electrolytic solution No. 13-4 | 124.5 | 118.9 | 109.9 |
| Example 17-11 | Electrolytic solution No. 13-5 | 118.9 | 130.3 | 108.7 |
| Example 17-12 | Electrolytic solution No. 13-6 | 122.8 | 120.5 | 110.4 |
| Comparative Example 17-1 | Comparative electrolytic solution No. 12-10 | 100.0 | 100.0 | 100.0 |
| Comparative Example 17-2 | Comparative electrolytic solution No. 12-11 | 114.2 | 125.3 | 108.5 |
| Comparative Example 17-3 | Comparative electrolytic solution No. 12-12 | 111.5 | 119.9 | 110.5 |
| Comparative Example 17-4 | Comparative electrolytic solution No. 12-13 | 117.8 | 127.6 | 105.7 |
| Comparative Example 17-5 | Comparative electrolytic solution No. 12-14 | 120.3 | 130.1 | 107.8 |
| Comparative Example 17-6 | Comparative electrolytic solution No. 12-15 | 118.6 | 115.2 | 106.6 |
| Comparative Example 17-7 | Comparative electrolytic solution No. 12-16 | 114.4 | 126.4 | 105.8 |
| Comparative Example 17-8 | Comparative electrolytic solution No. 12-17 | 117.3 | 113.5 | 106.9 |
| Comparative Example 17-9 | Comparative electrolytic solution No. 13-1 | 102.3 | 100.5 | 103.4 |
| Comparative Example 17-10 | Comparative electrolytic solution No. 13-2 | 119.7 | 127.7 | 109.0 |
| Comparative Example 17-11 | Comparative electrolytic solution No. 13-3 | 112.1 | 122.4 | 111.3 |
| Comparative Example 17-12 | Comparative electrolytic solution No. 13-4 | 120.3 | 131.4 | 106.5 |
| Comparative Example 17-13 | Comparative electrolytic solution No. 13-5 | 123.0 | 131.7 | 109.8 |
| Comparative Example 17-14 | Comparative electrolytic solution No. 13-6 | 120.2 | 116.6 | 107.6 |
| Comparative Example 17-15 | Comparative electrolytic solution No. 13-7 | 116.0 | 127.5 | 106.4 |
| Comparative Example 17-16 | Comparative electrolytic solution No. 13-8 | 118.5 | 115.2 | 107.9 |

Example 18-Negative Electrode:Si Negative Electrode

With regard to Example 18, an Si powder was used as a negative-electrode active material in place of the negative-electrode active material (a powder mixture of a silicon oxide powder and an aggregated artificial graphite powder) used in the nonaqueous electrolytic solution batteries according to Example 17.

<Production of Test Si Negative Electrode>

An Si powder (a powder mixture with the mean particle size: 10 μm/6 μm=9/1 by the mass ratio) as an Si powder was uniformly dispersed and mixed into NMP in which PVDF as a binding agent was pre-dissolved, and Ketjen black (electrically conductive agent 1) and vapor-grown carbon fiber (VGCF®-H, Showa Denko K. K.) (electrically conductive agent 2) were further added and mixed, and NMP for adjusting the viscosity was then further added to prepare an Si mixture paste.

The above paste was applied to a copper foil (current collector), dried, and pressurized.

Then the copper foil was processed into a predetermined size to obtain a test Si negative electrode.

The ratio of solid contents in the negative electrode was Si powder:electrically conductive agent 1:electrically conductive agent 2:PVDF=78:7:3:12 (by the mass ratio).

It is noted that the amounts of the NMC positive-electrode active material and the Si powder were adjusted so that the charging capacity of the Si negative electrode is larger than that of the NMC positive electrode, and the applied amount was adjusted so that a lithium metal does not deposit on the Si negative electrode during charging.

<Production of Nonaqueous Electrolytic Solution Batteries>

Aluminum laminate housing cells (with a capacity of 30 mAh) including the above test NMC positive electrode, the test Si negative electrode, and a microporous polypropylene-polyethylene double layered separator were respectively impregnated with one of the various nonaqueous electrolytic solutions and the various comparative nonaqueous electrolytic solutions shown in Tables 27 and 30 to produce the nonaqueous electrolytic solution batteries according to Example 18 and Comparative Example 18 as in Example 17 described above.

Example 18 and Comparative Example 18: Evaluation of Nonaqueous Electrolytic Solution Batteries The evaluations described above were performed as the following as in the nonaqueous electrolytic solution batteries according to Example 17 described above.

<Evaluation 1> Low-temperature property (0° C.) after 200 cycles at 60° C.

<Evaluation 2> 3 C-rate characteristic after 200 cycles at 60° C.

<Evaluation 3> Low-temperature property (0° C.) after stored at 60° C.

Various evaluations of the nonaqueous electrolytic solution batteries according to Example 18 and Comparative Example 18 are shown in Table 32 as relative values when the corresponding evaluation results of the nonaqueous electrolytic solution battery according to Comparative Example 18-1 are taken as 100.

TABLE 32

(Positive electrode; NMC Negative electrode; Si negative electrode)

| | Electrolytic solution No, | Low-temperature property (0° C.) after prolonged cycles at 60° C. | 3 C-rate characteristic (25° C.) after prolonged cycles at 60° C. | Low-temperature property (0° C.) after stored at 60° C. |
|---|---|---|---|---|
| Example 18-1 | Electrolytic solution No. 12-7 | 113.6 | 125.0 | 110.7 |
| Example 18-2 | Electrolytic solution No. 12-8 | 122.6 | 134.5 | 106.3 |
| Example 18-3 | Electrolytic solution No. 12-9 | 120.6 | 130.9 | 106.7 |
| Example 18-4 | Electrolytic solution No. 12-10 | 117.0 | 115.0 | 105.4 |
| Example 18-5 | Electrolytic solution No. 12-11 | 114.2 | 127.2 | 105.6 |
| Example 18-6 | Electrolytic solution No. 12-12 | 119.7 | 117.6 | 107.7 |
| Example 18-7 | Electrolytic solution No. 13-1 | 114.0 | 126.2 | 112.0 |
| Example 18-8 | Electrolytic solution No. 13-2 | 124.1 | 137.1 | 108.1 |
| Example 18-9 | Electrolytic solution No. 13-3 | 121.8 | 132.8 | 107.1 |
| Example 18-10 | Electrolytic solution No. 13-4 | 117.4 | 117.4 | 107.0 |
| Example 18-11 | Electrolytic solution No. 13-5 | 115.1 | 128.4 | 101.6 |
| Example 18-12 | Electrolytic solution No. 13-6 | 120.8 | 118.6 | 108.6 |
| Comparative Example 18-1 | Comparative electrolytic solution No. 12-10 | 100.0 | 100.0 | 100.0 |
| Comparative Example 18-2 | Comparative electrolytic solution No. 12-11 | 115.2 | 124.3 | 109.7 |
| Comparative Example 18-3 | Comparative electrolytic solution No. 12-12 | 111.2 | 122.5 | 106.6 |
| Comparative Example 18-4 | Comparative electrolytic solution No. 12-13 | 120.0 | 130.2 | 104.5 |
| Comparative Example 18-5 | Comparative electrolytic solution No. 12-14 | 118.6 | 128.6 | 103.9 |
| Comparative Example 18-6 | Comparative electrolytic solution No. 12-15 | 114.2 | 112.3 | 103.2 |
| Comparative Example 18-7 | Comparative electrolytic solution No. 12-16 | 112.6 | 121.9 | 102.2 |
| Comparative Example 18-8 | Comparative electrolytic solution No. 12-17 | 115.0 | 111.2 | 104.8 |
| Comparative Example 18-9 | Comparative electrolytic solution No. 13-1 | 103.6 | 101.2 | 104.3 |
| Comparative Example 18-10 | Comparative electrolytic solution No. 13-2 | 119.7 | 127.7 | 109.0 |

TABLE 32-continued (Positive electrode; NMC Negative electrode; Si negative electrode)

| | Electrolytic solution No, | Low-temperature property (0° C.) after prolonged cycles at 60° C. | 3 C-rate characteristic (25° C.) after prolonged cycles at 60° C. | Low-temperature property (0° C.) after stored at 60° C. |
|---|---|---|---|---|
| Comparative Example 18-11 | Comparative electrolytic solution No. 13-3 | 112.3 | 124.3 | 108.9 |
| Comparative Example 18-12 | Comparative electrolytic solution No. 13-4 | 121.2 | 133.2 | 105.5 |
| Comparative Example 18-13 | Comparative electrolytic solution No. 13-5 | 119.7 | 128.9 | 104.9 |
| Comparative Example 18-14 | Comparative electrolytic solution No. 13-6 | 115.4 | 114.2 | 104.3 |
| Comparative Example 18-15 | Comparative electrolytic solution No. 13-7 | 113.6 | 125.7 | 104.0 |
| Comparative Example 18-16 | Comparative electrolytic solution No. 13-8 | 117.2 | 113.9 | 106.7 |

Example 19 and Comparative Example 19—Negative Electrode:LTO Negative Electrode

In Example 19, a $Li_4Ti_5O_{12}$ (LTO) powder was used as a negative-electrode active material in place of the negative-electrode active material (an Si powder) used in Example 18.

<Production of Test LTO Negative Electrode>

An LTO powder (a powder mixture with the mean particle size: 0.90 μm/3.40 μm=9/1 by the mass ratio) as an $Li_4Ti_5O_{12}$ (LTO) powder was uniformly dispersed and mixed into NMP in which PVDF as a binding agent was pre-dissolved, and Ketjen black (electrically conductive agent 1) and vapor-grown carbon fiber (VGCF®-H, Showa Denko K. K.) (electrically conductive agent 2) were further added and mixed, and NMP for adjusting the viscosity was then further added to prepare an LTO mixture paste.

The resulting paste was applied to an aluminum foil (current collector), dried, and pressurized. Then the aluminum foil was processed into a predetermined size to obtain a test LTO negative electrode.

The ratio of solid contents in the negative electrode was LTO powder:electrically conductive agent 1:electrically conductive agent 2:PVDF=83:5:2:10 (by the mass ratio).

(Preparation of Nonaqueous Electrolytic Solutions)
[Preparation of Nonaqueous Electrolytic Solutions Nos. 12-1 to 12-20 and Comparative Electrolytic Solutions Nos. 12-1 to 12-12]

In a dry box under a nitrogen atmosphere of a dew point of −50° C. or less, $LiPF_6$ and $LiBF_4$ as electrolytes were dissolved and prepared in a nonaqueous solvent of PC and EMC (volume ratio 30:70/mass ratio 33.8:66.2) so that the concentrations of $LiPF_6$ and $LiBF_4$ were 1.1 mol/liter and 0.4 mol/liter, respectively, and then various ionic complex/EMC solutions according to the present invention and the group (II) compounds as described above were added to prepare the nonaqueous electrolytic solutions Nos. 14-1 to 14-24 and the comparative electrolytic solutions Nos. 14-1 to 14-14 shown in Table 33.

It is noted that these preparations were performed in accordance with the following procedure while cooling so that the liquid temperature would not exceed 40° C.: first, 30 mass % of the total $LiPF_6$ was added to and dissolved in a predetermined amount of EMC; then, a manipulation was subsequently repeated twice in which 30 mass % of the total $LiPF_6$ was added thereto and dissolved therein; a manipulation was performed in which the remaining 10 mass % of $LiPF_6$ was added thereto and dissolved therein; then, $LiBF_4$ was finally added thereto and dissolved therein; PC and EMC in predetermined amounts were added thereto and mixed; then, the various ionic complex/EMC solutions described in Table 33 below and/or the group (II) compounds as described above were added thereto; the volume ratio of PC and EMC was subjected to a final adjustment to be the predetermined ratio as described above; and stirring was performed for an hour.

TABLE 33

| Electrolytic solution No, | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 14-1 | (1a-Cis) | 1.2 | (II-1-1) | 2.4 | — | — | — | — | — | — |
| Electrolytic solution No. 14-2 | | | | | (1a-Trans) | 0.006 | 0.005 | — | — | — |
| Electrolytic solution No. 14-3 | | | | | — | — | — | (5a-Tetra) | 0.144 | 0.12 |
| Electrolytic solution No. 14-4 | | | | | (1a-Trans) | 0.006 | 0.005 | | 0.144 | 0.12 |
| Electrolytic solution No. 14-5 | (1a-Cis) | 1.2 | (II-2-1) | 1.2 | — | — | — | — | — | — |
| Electrolytic solution No. 14-6 | | | | | (1a-Trans) | 0.006 | 0.005 | — | — | — |
| Electrolytic solution No. 14-7 | | | | | — | — | — | (5a-Tetra) | 0.144 | 0.12 |
| Electrolytic solution No. 14-8 | | | | | (1a-Trans) | 0.006 | 0.005 | | 0.144 | 0.12 |
| Electrolytic solution No. 14-9 | (1a-Cis) | 1.2 | (II-3-1) | 3.6 | — | — | — | — | — | — |
| Electrolytic solution No. 14-10 | | | | | (1a-Trans) | 0.006 | 0.005 | — | — | — |
| Electrolytic solution No. 14-11 | | | | | — | — | — | (5a-Tetra) | 0.144 | 0.12 |
| Electrolytic solution No. 14-12 | | | | | (1a-Trans) | 0.006 | 0.005 | | 0.144 | 0.12 |
| Electrolytic solution No. 14-13 | (1a-Cis) | 1.2 | (II-5-1) | 1.2 | — | — | — | — | — | — |
| Electrolytic solution No. 14-14 | | | | | (1a-Trans) | 0.006 | 0.005 | — | — | — |

TABLE 33-continued

| Electrolytic solution No, | Group (I) compound (Cis isomer) | Content (mass %) | Group (II) compound | Content (mass %) | Group (III) compound Trans isomer | Content (mass %) | Trans isomer/ Cis isomer (mass ratio) | Group (IV) compound Tetrafluoro complex | Content (mass %) | Tetrafluoro complex/ Cis isomer (mass ratio) |
|---|---|---|---|---|---|---|---|---|---|---|
| Electrolytic solution No. 14-15 | — | — | — | — | — | — | — | (5a-Tetra) | 0.144 | 0.12 |
| Electrolytic solution No. 14-16 | — | — | — | — | (1a-Trans) | 0.006 | 0.005 | — | 0.144 | 0.12 |
| Electrolytic solution No. 14-17 | (1a-Cis) | 1.2 | Lithium difluorophosphate | 1.2 | — | — | — | — | — | — |
| Electrolytic solution No. 14-18 | | | | | (1a-Trans) | 0.006 | 0.005 | — | — | — |
| Electrolytic solution No. 14-19 | | | | | — | — | — | (5a-Tetra) | 0.144 | 0.12 |
| Electrolytic solution No. 14-20 | | | | | (1a-Trans) | 0.006 | 0.005 | | 0.144 | 0.12 |
| Electrolytic solution No. 14-21 | (1a-Cis) | 1.2 | (II-9-2) | 0.5 | — | — | — | — | — | — |
| Electrolytic solution No. 14-22 | | | | | (1a-Trans) | 0.006 | 0.005 | — | — | — |
| Electrolytic solution No. 14-23 | | | | | — | — | — | (5a-Tetra) | 0.144 | 0.12 |
| Electrolytic solution No. 14-24 | | | | | (1a-Trans) | 0.006 | 0.005 | | 0.144 | 0.12 |
| Comparative electrolytic solution No. 14-1 | — | — | — | — | — | — | — | — | — | — |
| Comparative electrolytic solution No. 14-2 | (1a-Cis) | 1.2 | — | — | — | — | — | — | — | — |
| Comparative electrolytic solution No. 14-3 | — | — | (II-1-1) | 2.4 | — | — | — | — | — | — |
| Comparative electrolytic solution No. 14-4 | — | — | | | (1a-Trans) | 1.2 | — | (5a-Tetra) | 0.144 | — |
| Comparative electrolytic solution No. 14-5 | — | — | (II-2-1) | 1.2 | — | — | — | — | — | — |
| Comparative electrolytic solution No. 14-6 | — | — | | | (1a-Trans) | 1.2 | — | (5a-Tetra) | 0.144 | — |
| Comparative electrolytic solution No. 14-7 | — | — | (II-3-1) | 3.6 | — | — | — | — | — | — |
| Comparative electrolytic solution No. 14-8 | — | — | | | (1a-Trans) | 1.2 | — | (5a-Tetra) | 0.144 | — |
| Comparative electrolytic solution No. 14-9 | — | — | (II-5-1) | 1.2 | — | — | — | — | — | — |
| Comparative electrolytic solution No. 14-10 | — | — | | | (1a-Trans) | 1.2 | — | (5a-Tetra) | 0.144 | — |
| Comparative electrolytic solution No. 14-11 | — | — | Lithium difluorophosphate | 1.2 | — | — | — | — | — | — |
| Comparative electrolytic solution No. 14-12 | — | — | | | (1a-Trans) | 1.2 | — | (5a-Tetra) | 0.144 | — |
| Comparative electrolytic solution No. 14-13 | — | — | (II-9-2) | 0.5 | — | — | — | — | — | — |
| Comparative electrolytic solution No. 14-14 | — | — | | | (1a-Trans) | 1.2 | — | (5a-Tetra) | 0.144 | — |

<Production of Nonaqueous Electrolytic Solution Batteries>

Aluminum laminate housing cell (with a capacity of 30 mAh) including the above test NMC positive electrode, the test LTO negative electrode, and a cellulose separator were respectively impregnated with one of the various nonaqueous electrolytic solutions and the various comparative nonaqueous electrolytic solutions shown in Table 33 to produce the nonaqueous electrolytic solution batteries according to Examples 19-1 to 19-24 and Comparative Examples 19-1 to 19-14 as in Example 18 described above.

<Evaluation of Nonaqueous Electrolytic Solution Batteries>
<Evaluation 1> Low-Temperature Property (0° C.) after 500 Cycles at 60° C.

Each of the nonaqueous electrolytic solution batteries according to Example 19 and Comparative Example 19 was subjected to the following evaluation.

First, conditioning was performed at an environmental temperature of 25° C. under the following conditions.

That is, constant-current and constant-voltage charge was performed as the initial charge/discharge at an environmental temperature of 25° C. using the produced cells to a charge upper limit voltage of 2.8 V at a 0.1 C rate (3 mA), and discharge was performed at a constant current of a 0.1 C rate (3 mA) to a discharge cutoff voltage of 1.5 V. Subsequently, the following charge-discharge cycle was repeated for 3 times: constant-current and constant-voltage charge was performed to a charge upper limit voltage of 2.8 V at a 0.1 C rate (3 mA), and discharge was performed at a constant current of a 0.1 C rate (3 mA) to a discharge cutoff voltage of 1.5 V.

After this conditioning, the following charge-discharge cycle was repeated for 3 times at an environmental temperature of 25° C.: constant-current and constant-voltage charge was performed at 0.2 C rate (6 mA) to a charge upper limit voltage of 2.8 V, and discharge was then performed at a constant current of a 0.2 C rate (6 mA) to a discharge cutoff voltage of 1.5 V.

Then, charge/discharge tests were performed at an environmental temperature of 60° C. The following charge-discharge cycle was repeated for 500 times: constant-current and constant-voltage charge was performed at a 2 C rate (30 mA) to a charge upper limit voltage of 2.8 V, and discharge was performed at a constant current of a 2 C rate (60 mA) to a discharge cutoff voltage of 1.5 V.

Next, the nonaqueous electrolytic solution batteries were cooled to 25° C., and again discharged to 1.5 V. Then constant-current and constant-voltage charge was performed to 2.8 V at a 0.2 C rate at 0° C. Further, discharge was performed at a constant current of a 5 C rate (150 mA) to a discharge cutoff voltage of 1.5 V, and the capacity obtained at that time was taken as the low-temperature property (0° C.) after prolonged cycles at 60° C.

<Evaluation 2> 5 C-Rate Characteristic after 500 Cycles at 60° C.

After performing 500 cycles at an environmental temperature of 60° C. in Evaluation 1 as described above, the nonaqueous electrolytic solution batteries were cooled to 25° C., and then again discharged to 1.5 V. Subsequently constant-current and constant-voltage charge was performed to 2.8 V at a 0.1 C rate at 25° C. Further, discharge was performed at a constant current of a 5 C rate (150 mA) to a discharge cutoff voltage of 1.5 V while maintaining the temperature at 25° C., and the capacity obtained at that time was taken as the 5 C-rate characteristic (25° C.) after prolonged cycles at 60° C.

<Evaluation 3> Low-Temperature Property (0° C.) after Stored at 60° C.

Each of the nonaqueous electrolytic solution batteries according to Example 19 and Comparative Example 19 was subjected to storage tests (stored for 10 days after charged to 2.8 V) at an environmental temperature of 60° C.

Next, the nonaqueous electrolytic solution batteries were cooled to 25° C., and again discharged to 1.5 V. Then constant-current and constant-voltage charge was performed to 2.8 V at a 0.2 C rate at 0° C. Further, discharge was performed at a constant current of a 5 C rate (150 mA) to a discharge cutoff voltage of 1.5 V while maintaining the temperature at 0° C., and the capacity obtained at that time was taken as the low-temperature property (0° C.) after stored at 60° C.

Various evaluations of the nonaqueous electrolytic solution batteries according to Example 19 and Comparative Example 19 are shown in Table 34 as relative values when the corresponding evaluations of the nonaqueous electrolytic solution battery according to Comparative Example 19-1 are taken as 100.

TABLE 34

(Positive electrode; NMC Negative electrode; LTO negative electrode)

| | Electrolytic solution No, | Low-temperature property (0° C.) after prolonged cycles at 60° C. | 5 C-rate characteristic (25° C.) after prolonged cycles at 60° C. | Low-temperature property (0° C.) after stored at 60° C. |
|---|---|---|---|---|
| Example 19-1 | Electrolytic solution No. 14-1 | 137.2 | 148.6 | 119.7 |
| Example 19-2 | Electrolytic solution No. 14-2 | 139.1 | 149.8 | 120.7 |
| Example 19-3 | Electrolytic solution No. 14-3 | 139.2 | 149.4 | 120.5 |
| Example 19-4 | Electrolytic solution No. 14-4 | 140.6 | 151.4 | 121.3 |
| Example 19-5 | Electrolytic solution No. 14-5 | 149.3 | 161.5 | 132.3 |
| Example 19-6 | Electrolytic solution No. 14-6 | 151.4 | 162.9 | 133.4 |
| Example 19-7 | Electrolytic solution No. 14-7 | 151.5 | 162.4 | 133.2 |
| Example 19-8 | Electrolytic solution No. 14-8 | 153.0 | 164.6 | 134.0 |
| Example 19-9 | Electrolytic solution No. 14-9 | 146.6 | 156.3 | 131.1 |
| Example 19-10 | Electrolytic solution No. 14-10 | 148.7 | 157.6 | 132.1 |
| Example 19-11 | Electrolytic solution No. 14-11 | 148.7 | 157.2 | 131.9 |
| Example 19-12 | Electrolytic solution No. 14-12 | 150.3 | 159.4 | 132.8 |
| Example 19-13 | Electrolytic solution No. 14-13 | 141.2 | 138.2 | 131.1 |
| Example 19-14 | Electrolytic solution No. 14-14 | 143.2 | 139.4 | 132.1 |
| Example 19-15 | Electrolytic solution No. 14-15 | 143.3 | 139.0 | 131.9 |
| Example 19-16 | Electrolytic solution No. 14-16 | 144.8 | 140.9 | 132.8 |
| Example 19-17 | Electrolytic solution No. 14-17 | 138.5 | 151.1 | 123.5 |
| Example 19-18 | Electrolytic solution No. 14-18 | 140.5 | 152.4 | 124.5 |
| Example 19-19 | Electrolytic solution No. 14-19 | 140.5 | 152.0 | 124.3 |
| Example 19-20 | Electrolytic solution No. 14-20 | 142.0 | 154.1 | 125.1 |
| Example 19-21 | Electrolytic solution No. 14-21 | 146.1 | 129.5 | 127.4 |
| Example 19-22 | Electrolytic solution No. 14-22 | 150.6 | 131.8 | 130.3 |
| Example 19-23 | Electrolytic solution No. 14-23 | 153.7 | 133.6 | 133.8 |
| Example 19-24 | Electrolytic solution No. 14-24 | 157.2 | 135.2 | 135.3 |
| Comparative Example 19-1 | Comparative electrolytic solution No. 14-1 | 100.0 | 100.0 | 100.0 |
| Comparative Example 19-2 | Comparative electrolytic solution No. 14-2 | 127.7 | 136.0 | 110.7 |
| Comparative Example 19-3 | Comparative electrolytic solution No. 14-3 | 122.0 | 129.3 | 104.1 |
| Comparative Example 19-4 | Comparative electrolytic solution No. 14-4 | 128.6 | 134.4 | 111.8 |
| Comparative Example 19-5 | Comparative electrolytic solution No. 14-5 | 133.2 | 140.1 | 114.9 |
| Comparative Example 19-6 | Comparative electrolytic solution No. 14-6 | 139.7 | 146.1 | 124.1 |
| Comparative Example 19-7 | Comparative electrolytic solution No. 14-7 | 130.8 | 135.6 | 113.8 |
| Comparative Example 19-8 | Comparative electrolytic solution No. 14-8 | 137.2 | 141.4 | 122.9 |
| Comparative Example 19-9 | Comparative electrolytic solution No. 14-9 | 126.0 | 119.9 | 113.8 |
| Comparative Example 19-10 | Comparative electrolytic solution No. 14-10 | 132.1 | 125.0 | 122.9 |
| Comparative Example 19-11 | Comparative electrolytic solution No. 14-11 | 123.6 | 131.1 | 107.3 |
| Comparative Example 19-12 | Comparative electrolytic solution No. 14-12 | 129.6 | 136.7 | 115.8 |
| Comparative Example 19-13 | Comparative electrolytic solution No. 14-13 | 132.5 | 139.2 | 112.3 |
| Comparative Example 19-14 | Comparative electrolytic solution No. 14-14 | 139.5 | 146.2 | 120.9 |

Regarding Examples 15 to 19

Examples 15-1 to 15-12, Examples 16-1 to 16-12, Examples 17-1 to 17-12, Examples 18-1 to 18-12, and Examples 19-1 to 19-12 were found to improve all of Evaluations 1 to 3 as compared with the corresponding Comparative Examples (Comparative Example 15-1, Comparative Example 16-1, Comparative Example 17-1, Comparative Example 18-1, and Comparative Example 19-1), by using the nonaqueous electrolytic solution that uses a combination of (1a-Cis) from Synthesis Example 1 as the group (I) compound according to Example and the group (II) compound and that may include the group (III) compound and the group (IV) compound, even in a case where an amorphous carbon powder (Carbotron® P), a powder mixture of an artificial graphite and natural graphite, a powder mixture of a silicon oxide powder and an aggregated artificial graphite powder, an Si powder, or LTO is used instead of a graphite powder as a negative-electrode active material.

Further, the nonaqueous electrolytic solution batteries including the three compounds of (1a-Cis), the group (II) compound, and the group (IV) compound were found to improve all of Evaluations 1 to 3 as compared with the nonaqueous electrolytic solution batteries including the three compounds of the difluoro ionic complex (1a-Trans) in the trans configuration, the group (II) compound, and the group (IV) compound.

As described above, it is found that the nonaqueous electrolytic solutions according to the present invention can show similar effects as Example 1-1 to 1-41 in any of the cases where the following materials were used as a negative electrode: a carbon material having a d value in the lattice plane (002) of more than 0.340 nm as determined by X ray diffraction; a carbon material having a d value in the lattice plane (002) of 0.340 nm or less as determined by X ray diffraction; an oxide of one or more metals selected from Si, Sn, and Al; one or more metals selected from Si, Sn, and Al; and an alloy comprising the one or more metals and further comprising or not comprising lithium; and a lithium titanium oxide.

That is, it is clear that the nonaqueous electrolytic solution according to the present invention and a battery using this have effects of improving cycle characteristics regardless of the types of negative electrodes as in the case of the positive electrode described above.

The invention claimed is:

1. A nonaqueous electrolytic solution for nonaqueous electrolytic solution secondary batteries, the nonaqueous electrolytic solution comprising:
   a nonaqueous solvent,
   an electrolyte dissolved in the nonaqueous solvent,
   (I) a difluoro ionic complex (1) represented by the general formula (1), and
   (II) at least one compound selected from the group consisting of a difluorophosphate salt, a monofluorophosphate salt, a salt having an imide anion represented by each of the general formulas (II-1) to (II-8) below, and a silane compound represented by the general formula (II-9) below,
   wherein 95 mol % or more of the difluoro ionic complex (1) is a difluoro ionic complex (1-Cis) in a cis configuration represented by the general formula (1-Cis),

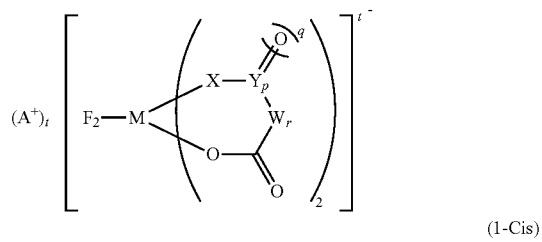
(1)

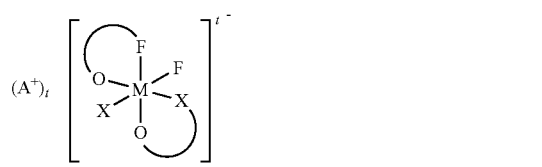
(1-Cis)

wherein in (1-Cis),

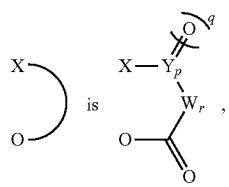

wherein in the general formula (1) and the general formula (1-Cis), $A^+$ is any one selected from the group consisting of a metal ion, a proton, and an onium ion, and M is any one selected from the group consisting of Si, P, As, and Sb;

F is a fluorine atom; 0 is an oxygen atom;

t is 2 when M is Si, and t is 1 when M is P, As, or Sb;

X is an oxygen atom or $-N(R^1)-$; N is a nitrogen atom; and $R^1$ is a hydrocarbon group having 1 to 10 carbon atoms and optionally having a hetero atom and/or a halogen atom (the hydrocarbon group optionally having a branched-chain or ring structure when the number of carbon atoms is 3 or more);

when X is $-N(R^1)-$, and p is 0, X and W are bonded directly and optionally form a structure as shown in at least one selected from the general formulas (1-Cis-1) to (1-Cis-3) below; in the case of the general formula (1-Cis-2) below where the direct bond is a double bond, $R^1$ is not present, Y is a carbon atom or a sulfur atom; q is 1 when Y is a carbon atom; q is 1 or 2 when Y is a sulfur atom;

W represents a hydrocarbon group having 1 to 10 carbon atoms and optionally having a hetero atom and/or a halogen atom (the hydrocarbon group optionally having a branched-chain or ring structure when the number of carbon atoms is 3 or more), or $-N(R^2)-$; wherein, $R^2$ represents a hydrogen atom, an alkaline metal, or a hydrocarbon group having 1 to 10 carbon atoms and optionally having a hetero atom and/or a halogen atom; when the number of carbon atoms is 3 or more, $R^2$ optionally has a branched-chain or ring structure;

p is 0 or 1, q is an integer of 0 to 2, r is an integer of 0 to 2, and further, $p+r \geq 1$,

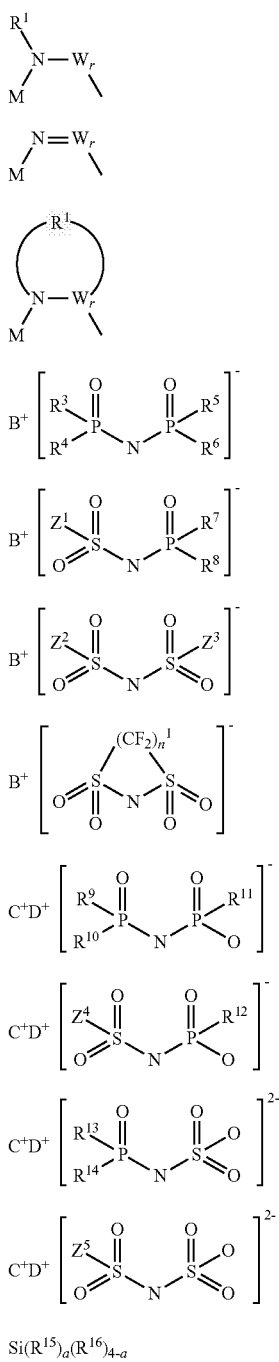

wherein in the general formulas (II-1) to (II-8), $R^3$ and $R^{14}$ are each independently a fluorine atom or an organic group selected from a straight chain or branched alkoxy group having 1 to 10 carbon atoms, an alkenyloxy group, an alkynyloxy group, a cycloalkoxy group having 3 to 10 carbon atoms, a cycloalkenyloxy group, and an aryloxy group having 6 to 10 carbon atoms, and at least one of a fluorine atom, an oxygen atom, and an unsaturated bond is optionally present in the organic group; $Z^1$ and $Z^5$ are each independently a fluorine atom or an organic group selected from a straight chain or branched alkyl group having 1 to 10 carbon atoms, an alkenyl group, an alkynyl group, a cycloalkyl group having 3 to 10 carbon atoms, a cycloalkenyl group, an aryl group having 6 to 10 carbon atoms, a straight chain or branched alkoxy group having 1 to 10 carbon atoms, an alkenyloxy group, an alkynyloxy group, a cycloalkoxy group having 3 to 10 carbon atoms, a cycloalkenyloxy group, and an aryloxy group having 6 to 10 carbon atoms, and at least one of a fluorine atom, an oxygen atom, and an unsaturated bond is optionally present in the organic group; $n^1$ represents an integer of 1 to 8; and $B^+$, $C^+$, and $D^+$ each independently represent any one selected from the group consisting of a metal ion, a proton, and an onium ion, and $C^+$ and $D^+$ are optionally identical; and in the general formula (II-9), $R^{15}$ each independently represent a group having a carbon-carbon unsaturated bond; $R^{16}$ are each independently selected from a fluorine atom and a straight chain or branched alkyl group having 1 to 10 carbon atoms, and the alkyl group optionally has a fluorine atom and/or an oxygen atom; and a is 2 to 4.

2. The nonaqueous electrolytic solution according to claim 1, wherein a combination of M, X, Y, W, p, q, r, and t in an anion moiety of the difluoro ionic complex (1) and in an anion moiety of the difluoro ionic complex (1-Cis) is at least one combination selected from (Cis-a), (Cis-b), (Cis-c), and (Cis-d):

(Cis-a) M=P; X=O; Y=C; p=q=t=1; and r=0;
(Cis-b) M=P; X=O; W=C(CF$_3$)$_2$; p=q=0; and r=t=1;
(Cis-c) M=Si; X=O; Y=C; p=q=1; t=2; and r=0; and
(Cis-d) M=P; X=N(R$^1$); Y=C; R$^1$=CH$_3$; p=q=t=1; and r=0.

3. The nonaqueous electrolytic solution according to claim 1, wherein the A$^+$ in the difluoro ionic complex (1-Cis) comprises at least one selected from the group consisting of a lithium ion, a sodium ion, a potassium ion, and a quaternary alkylammonium ion.

4. The nonaqueous electrolytic solution according to claim 1, wherein the content of the difluoro ionic complex (1-Cis) is in the range of 0.001 mass % or more and 20 mass % or less relative to the nonaqueous electrolytic solution, the content of the compound shown in the (II) above is in the range of 0.01 mass % or more and 25 mass % or less relative to the nonaqueous electrolytic solution, in the case where the compound shown in the (II) above comprises the difluorophosphate salt, the content of the difluorophosphate salt is in the range of 0.01 mass % or more and 3 mass % or less relative to the nonaqueous electrolytic solution, in the case where the compound shown in the (II) above comprises the monofluorophosphate salt, the content of the monofluorophosphate salt is in the range of 0.01 mass % or more and 3 mass % or less relative to the nonaqueous electrolytic solution, in the case where the compound shown in the (II) above comprises the salt having the imide anion represented by each of the general formulas (II-1) to (II-8) above, the content of the salt having the imide anion represented by each of the general formulas (II-1) to (II-8) above is in the range of 0.01 mass % or more and 10 mass % or less relative to the nonaqueous electrolytic solution, in the case where the compound shown in the (II) above comprises the silane compound represented by the general formula (II-9) above, the content of the silane compound represented by the general formula (II-9) above is in the range of 0.001 mass % or more and 10 mass % or less relative to the nonaqueous electrolytic solution.

5. The nonaqueous electrolytic solution according to claim 1, wherein a counter cation of the difluorophosphate salt and the monofluorophosphate salt is a lithium cation or a sodium cation.

6. The nonaqueous electrolytic solution according to claim 1, wherein the difluoro ionic complex (1) further comprises (III) a difluoro ionic complex (1-Trans) in a trans configuration represented by the general formula (1-Trans), (1-trans)

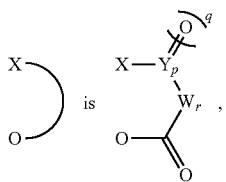

wherein in (1-Trans)

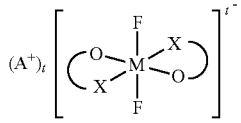

wherein in the general formula (1-Trans), $A^+$ is any one selected from the group consisting of a metal ion, a proton, and an onium ion, and M is any one selected from the group consisting of Si, P, As, and Sb;

F is a fluorine atom; 0 is an oxygen atom;

t is 2 when M is Si, and t is 1 when M is P, As, or Sb;

X is an oxygen atom or —N($R^1$)—; N is a nitrogen atom; and $R^1$ is a hydrocarbon group having 1 to 10 carbon atoms and optionally having a hetero atom and/or a halogen atom (the hydrocarbon group optionally having a branched-chain or ring structure when the number of carbon atoms is 3 or more);

when X is —N($R^1$)—, and p is 0, X and W are bonded directly and optionally form at least one structure selected from the general formulas (1-Trans-1) to (1-Trans-3) below; in the case of the general formula (1-Trans-2) below where the direct bond is a double bond, $R^1$ is not present, Y is a carbon atom or a sulfur atom; q is 1 when Y is a carbon atom; q is 1 or 2 when Y is a sulfur ato;

W represents a hydrocarbon group having 1 to 10 carbon atoms and optionally having a hetero atom and/or a halogen atom (the hydrocarbon group optionally having a branched-chain or ring structure when the number of carbon atoms is 3 or more), or —N($R^2$)—; wherein $R^2$ represents a hydrogen atom, an alkaline metal, or a hydrocarbon group having 1 to 10 carbon atoms and optionally having a hetero atom and/or a halogen atom; when the number of carbon atoms is 3 or more, $R^2$ optionally has a branched-chain or ring structure;

p is 0 or 1, q is an integer of 0 to 2, r is an integer of 0 to 2, and further, p+r≥1,

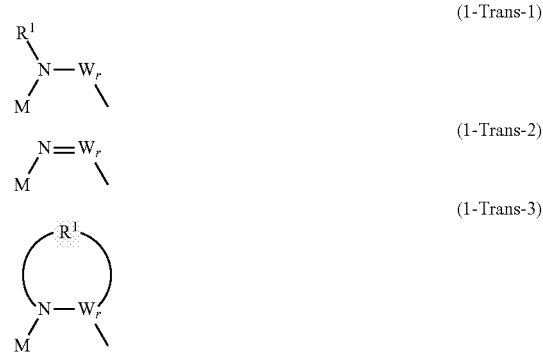

7. The nonaqueous electrolytic solution according to claim 6, wherein a combination of M, X, Y, W, p, q, r, and t in an anion moiety of the difluoro ionic complex (1-Trans) is at least one combination selected from (Trans-a), (Trans-b), (Trans-c), and (Trans-d) below:

(Trans-a) M=P; X=O; Y=C; p=q=t=1; and r=0,
(Trans-b) M=P; X=O; W=C($CF_3$)$_2$; p=q=0; and r=t=1,
(Trans-c) M=Si; X=O; Y=C; p=q=1; t=2; and r=0; and
(Trans-d) M=P; X=N($R^1$); Y=C; $R^1$=$CH_3$; p=q=t=1; and r=0.

8. The nonaqueous electrolytic solution according to claim 6, wherein the $A^+$ in the difluoro ionic complex (1-Trans) comprises at least one selected from the group consisting of a lithium ion, a sodium ion, a potassium ion, and a quaternary alkylammonium ion.

9. The nonaqueous electrolytic solution according to claim 6, wherein the mass ratio (1-Trans)/(1-Cis) of the difluoro ionic complex (1-Trans) to the difluoro ionic complex (1-Cis) is 0.0001 or more and 0.05 or less.

10. The nonaqueous electrolytic solution according to claim 1, further comprising (IV) a tetrafluoro ionic complex represented by the general formula (1-Tetra):

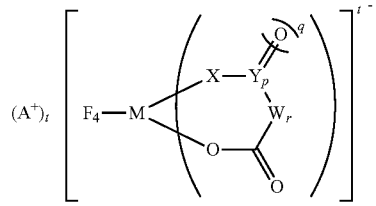

wherein in the general formula (1-Tetra), $A^+$ is any one selected from the group consisting of a metal ion, a proton, and an onium ion, and M is any one selected from the group consisting of Si, P, As, and Sb;

F is a fluorine atom; 0 is an oxygen atom;

t is 2 when M is Si, and t is 1 when M is P, As, or Sb;

X is an oxygen atom or —N($R^1$)—; N is a nitrogen atom; and $R^1$ is a hydrocarbon group having 1 to 10 carbon atoms and optionally having a hetero atom and/or a halogen atom (the hydrocarbon group optionally having a branched-chain or ring structure when the number of carbon atoms is 3 or more);

when X is —N($R^1$)—, and p is 0, X and W are bonded directly and optionally form at least one structure selected from the general formulas (1-Tetra-1) to (1-Tetra-3) below; in the case of the general formula (1-Tetra-2) below where the direct bond is a double bond, $R^1$ is not present, Y is a carbon atom or a sulfur atom, q is 1 when Y is a carbon atom, q is 1 or 2 when Y is a sulfur atom;

W represents a hydrocarbon group having 1 to 10 carbon atoms and optionally having a hetero atom and/or a halogen atom (the hydrocarbon group optionally having a branched-chain or ring structure when the number of carbon atoms is 3 or more), or —N($R^2$)—; wherein $R^2$ represents a hydrogen atom, an alkaline metal, or a hydrocarbon group having 1 or more and 10 or less carbon atoms and optionally having a hetero atom and/or a halogen atom;

when the number of carbon atoms is 3 or more, $R^2$ optionally has a branched-chain or ring structure;

p is 0 or 1, q is an integer of 0 to 2, r is an integer of 0 to 2, and further, p+r≥1

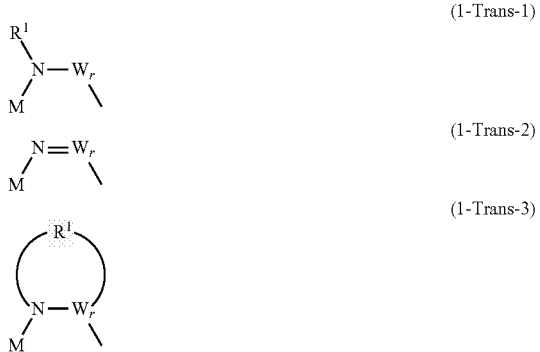

11. The nonaqueous electrolytic solution according to claim 10, wherein a combination of M, X, Y, W, p, q, r, and t in an anion moiety of the tetrafluoro ionic complex is at least one combination selected from (Tetra-a), (Tetra-b), (Tetra-c), and (Tetra-d):

(Tetra-a) M=P; X=O; Y=C; p=q=t=1; and r=0,
(Tetra-b) M=P; X=O; W=C(CF$_3$)$_2$; p=q=0; and r=t=1,
(Tetra-c) M=Si; X=O; Y=C; p=q=1; t=2; and r=0; and
(Tetra-d) M=P; X=N($R^1$); Y=C; $R^1$=CH$_3$; p=q=t=1; and r=0.

12. The nonaqueous electrolytic solution according to claim 10, wherein the A$^+$ in the tetrafluoro ionic complex (1-Tetra) comprises at least one selected from the group consisting of a lithium ion, a sodium ion, a potassium ion, and a quaternary alkylammonium ion.

13. The nonaqueous electrolytic solution according to claim 10, wherein the mass ratio (1-Tetra)/(1-Cis) of the tetrafluoro ionic complex (1-Tetra) to the difluoro ionic complex (1-Cis) is 0.02 or more and 0.25 or less.

14. The nonaqueous electrolytic solution according to claim 1, wherein the nonaqueous solvent comprises at least one selected from the group consisting of a cyclic carbonate and a chain carbonate.

15. The nonaqueous electrolytic solution according to claim 14, wherein the cyclic carbonate comprises at least one selected from the group consisting of ethylene carbonate and propylene carbonate, and the chain carbonate comprises at least one selected from the group consisting of ethylmethyl carbonate, dimethyl carbonate, diethyl carbonate, and methylpropyl carbonate.

16. The nonaqueous electrolytic solution according to claim 14, wherein the nonaqueous solvent further comprises at least one selected from the group consisting of esters, ethers, lactones, nitriles, amides, and sulfones.

17. The nonaqueous electrolytic solution according to claim 14, wherein the nonaqueous solvent further comprises at least one compound selected from the group consisting of vinylene carbonate, vinylethylene carbonate, ethynylethylene carbonate, and fluoroethylene carbonate.

18. The nonaqueous electrolytic solution according to claim 1, wherein the electrolyte comprises a salt comprising a pair of a cation and an anion, the cation being at least one selected from the group consisting of lithium, sodium, potassium, and quaternary ammonium, and the anion being at least one selected from the group consisting of hexafluorophosphoric acid, tetrafluoroboric acid, perchloric acid, hexafluoroarsenic acid, hexafluoroantimonic acid, trifluoromethanesulfonic acid, bis(trifluoromethanesulfonyl)imide, bis(pentafluoroethanesulfonyl)imide, (trifluoromethanesulfonyl)(pentafluoroethanesulfonyl)imide, bis(fluorosulfonyl)imide, (trifluoromethanesulfonyl)(fluorosulfonyl)imide, (pentafluoroethanesulfonyl)(fluorosulfonyl)imide, tris(trifluoromethanesulfonyl)methide, and bis(difluorophosphonyl)imide.

19. A nonaqueous electrolytic solution secondary battery comprising the nonaqueous electrolytic solution according to claim 1, a positive electrode, a negative electrode, and a separator.

20. A nonaqueous electrolytic solution secondary battery, comprising: (a) the nonaqueous electrolytic solution according to claim 1;
(b) a positive electrode including at least one of oxide and a polyanion compound as a positive-electrode active material;
(c) a negative electrode including a negative-electrode active material; and
(d) a separator including polyolefin or cellulose as a main component,
wherein the positive-electrode active material is at least one selected from the group consisting of (A) a lithium-transition metal composite oxide containing at least one metal of nickel, manganese, and cobalt, and having a layered structure, (B) a lithium-manganese composite oxide having a spinel structure, (C) a lithium-containing olivine-type phosphate salt, and (D) a lithium-rich layered transition-metal oxide having a stratified rock-salt structure, and
the negative-electrode active material is at least one selected from the group consisting of (E) a carbon material having a d value in a lattice plane (002) of 0.340 nm or less as determined by X ray diffraction, (F) a carbon material having a d value in the lattice plane (002) of more than 0.340 nm as determined by X ray diffraction, (G) an oxide of one or more metals selected from Si, Sn, and Al, (H) one or more metals selected from Si, Sn, and Al, and an alloy comprising the one or more metals and further comprising or not comprising lithium, and (I) a lithium titanium oxide.

* * * * *